US012434503B2

(12) United States Patent
Nishizawa et al.

(10) Patent No.: US 12,434,503 B2
(45) Date of Patent: Oct. 7, 2025

(54) LAMINATE, CARD, METHOD OF MANUFACTURING CARD, METHOD OF PRODUCING CARD, CARD INFORMATION RECORDING SHEET AND CARD INCLUDING THE SAME

(71) Applicant: TOPPAN INC., Tokyo (JP)

(72) Inventors: Tomo Nishizawa, Tokyo (JP); Yasushi Ooba, Tokyo (JP); Naoki Minamikawa, Tokyo (JP); Tomoko Kotegawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 326 days.

(21) Appl. No.: 17/944,499

(22) Filed: Sep. 14, 2022

(65) Prior Publication Data

US 2023/0021631 A1    Jan. 26, 2023

Related U.S. Application Data

(63) Continuation of application No. PCT/JP2021/029029, filed on Aug. 4, 2021.

(30) Foreign Application Priority Data

Aug. 4, 2020 (JP) ................................. 2020-132592
Apr. 12, 2021 (JP) ................................. 2021-067112
Jun. 7, 2021 (JP) ................................. 2021-095146

(51) Int. Cl.
*B42D 25/324* (2014.01)
*B32B 7/12* (2006.01)
(Continued)

(52) U.S. Cl.
CPC .............. *B42D 25/324* (2014.10); *B32B 7/12* (2013.01); *B32B 27/08* (2013.01); *B32B 27/20* (2013.01);
(Continued)

(58) Field of Classification Search
CPC .... B42D 25/324; B42D 25/445; B42D 25/45; B42D 25/23; B42D 25/24; B42D 25/328;
(Continued)

(56) References Cited

U.S. PATENT DOCUMENTS

2019/0039401 A1* 2/2019 Minamikawa ....... B42D 25/351
2019/0084337 A1   3/2019 Umeda et al.

FOREIGN PATENT DOCUMENTS

EP    3 306 362 A1   4/2018
JP    08-152842 A    6/1996
(Continued)

OTHER PUBLICATIONS

Koike et al. "Multilayer high reflectance coating on polyethylene terephthalate film consisting of layers that are not quarter-wave thickness" JVSTA vol. 28, Issue Jan. 1, 2010 (Year: 2009).*
(Continued)

*Primary Examiner* — Alicia J Weydemeyer
*Assistant Examiner* — Laura B Figg
(74) *Attorney, Agent, or Firm* — Foley & Lardner LLP

(57) ABSTRACT

A laminate of the present invention includes, in a thickness direction of the laminate, a transfer foil in which at least a patch substrate, a relief forming layer, a reflective layer, and an adhesive layer are sequentially laminated, a protective sheet that is provided on a first side of the transfer foil in the thickness direction, and an information recording sheet that is provided on a second side of the transfer foil facing away from the protective sheet in the thickness direction.

12 Claims, 22 Drawing Sheets

(51) Int. Cl.
| | |
|---|---|
| *B32B 27/08* | (2006.01) |
| *B32B 27/20* | (2006.01) |
| *B32B 27/30* | (2006.01) |
| *B32B 27/36* | (2006.01) |
| *B32B 37/12* | (2006.01) |
| *B42D 25/23* | (2014.01) |
| *B42D 25/24* | (2014.01) |
| *B42D 25/328* | (2014.01) |
| *B42D 25/445* | (2014.01) |
| *B42D 25/45* | (2014.01) |
| *G02B 5/02* | (2006.01) |

(52) U.S. Cl.
CPC ............ *B32B 27/36* (2013.01); *B32B 27/365* (2013.01); *B32B 37/12* (2013.01); *B42D 25/445* (2014.10); *B42D 25/45* (2014.10); *G02B 5/021* (2013.01); *B32B 27/304* (2013.01); *B32B 2255/10* (2013.01); *B32B 2255/26* (2013.01); *B32B 2255/28* (2013.01); *B32B 2264/10* (2013.01); *B32B 2264/302* (2020.08); *B32B 2270/00* (2013.01); *B32B 2307/412* (2013.01); *B32B 2367/00* (2013.01); *B32B 2369/00* (2013.01); *B32B 2425/00* (2013.01); *B42D 25/23* (2014.10); *B42D 25/24* (2014.10); *B42D 25/328* (2014.10)

(58) Field of Classification Search
CPC ........... B32B 7/12; B32B 27/08; B32B 27/20; B32B 27/36; B32B 27/365; B32B 37/12; B32B 2264/302; B32B 27/304; B32B 2255/10; B32B 2255/26; B32B 2255/28; B32B 2264/10; B32B 2270/00; B32B 2307/412; B32B 2367/00; B32B 2369/00; B32B 2425/00; G02B 5/021
See application file for complete search history.

(56) References Cited

FOREIGN PATENT DOCUMENTS

| | | |
|---|---|---|
| JP | 2524092 Y2 | 1/1997 |
| JP | 2003-326824 A | 11/2003 |
| JP | 2005-271561 A | 10/2005 |
| JP | 4088884 B2 | 5/2008 |
| JP | 4194073 B2 | 12/2008 |
| JP | 2012-173430 A | 9/2012 |
| JP | 6107137 B2 | 4/2017 |
| WO | WO-2011/090030 A1 | 7/2011 |
| WO | WO-2017/200030 A1 | 11/2017 |

OTHER PUBLICATIONS

International Searching Authority, "International Search Report," issued in connection with International Patent Application No. PCT/JP2021/029029, dated Oct. 26, 2021.

International Searching Authority, "Written Opinion," issued in connection with International Patent Application No. PCT/JP2021/029029, dated Oct. 26, 2021.

European Extended Search Report issued in corresponding European Patent Application No. 21854065.6 dated Nov. 23, 2023 (13 pages).

* cited by examiner

LAMINATE, CARD, METHOD OF MANUFACTURING CARD, METHOD OF PRODUCING CARD, CARD INFORMATION RECORDING SHEET AND CARD INCLUDING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/029029, filed on Aug. 4, 2021, which in turn claims the benefit of Japanese Patent Application No. 2020-132592 filed on Aug. 4, 2020, Japanese Patent Application No. 2021-067112 filed on Apr. 12, 2021, and Japanese Patent Application No. 2021-095146 filed in Japan on Jun. 7, 2021, the disclosures of which are incorporated herein by reference in their entirety.

TECHNICAL FIELD

Embodiments of the present invention relate to a laminate and a card including a relief structure, a method of manufacturing the card, a method of producing the card, and a card information recording sheet and a card including the same.

BACKGROUND

Known relief structures include relief structures that are enclosed within cards in which authentication information is recorded such as identification cards (ID cards), passports, or driver's licenses and that have properties such as diffraction properties, scattering properties, and reflection properties. Relief structures are composed of a periodic or random concavo-convex structure of a micrometer to nanometer size. A configuration in which such a relief structure is enclosed within a card has higher resistance to chemicals, abrasion, and tampering (see Patent Literature 1, for example) than a configuration in which a relief structure is disposed on the outer surface of a card.

A relief structure enclosed in a card may be configured such that an anti-counterfeiting transfer foil including a relief structure is sandwiched between two sheets and located inside the outer edges of the sheets in a card.

When a relief structure is used as an element for authenticity confirmation, identification articles and valuables including such a relief structure can improve the effect of preventing counterfeiting and tampering and show the value of the articles. Thus, the value of the articles is guaranteed.

As a conventional mass production method for continuously replicating a relief structure, a "press method" (see Patent Literature 2) and a "casting method" (see Patent Literature 3) using a thermoplastic resin, and a "photopolymerization method" (see Patent Literature 4) have been disclosed. As disclosed in Patent Literature 4, the photopolymerization method is a method in which a radiation curable resin to be cured by exposure to radiation in a broad sense, such as ultraviolet light (UV) or electron beams (EB), is poured into the space between a relief structure replication mold and a flat substrate such as a plastic film, and the radiation curable resin is cured by radiation exposure to produce a cured film, followed by separation of the cured film together with the flat substrate such as a plastic film from the replication mold. Relief structures produced by the photopolymerization method have higher mechanical strength and better heat resistance and chemical resistance, and achieve higher accuracy in formation of a concavo-convex shape of the relief structures than relief structures produced by the press method or the casting method.

Furthermore, a laser engraving method is known as a method for preventing counterfeiting and tampering with ID cards by laser engraving individual information on each ID card including a substrate that is mainly composed of polycarbonate and contains a pigment or an additive that develops color by irradiation with a laser beam (YAG, $CO_2$, etc.). Laser engraving is said to be more resistant to tampering than inkjet use, because color development occurs inside the card substrate (Patent Literature 5).

CITATION LIST

[Patent Literature] [PTL 1] JP 6107137 B; [PTL 2] JP 4194073 B; [PTL 3] JP 2524092 Y2; [PTL 4] JP 4088884 B; [PTL 5] JP 2005-271561 A.

SUMMARY OF THE INVENTION

Technical Problem

Although relief structures produced by the photopolymerization method using a radiation curable resin have high strength, such relief structures can be extracted from the cards while maintaining the shape of the relief structures. In many cases, cards of the same type include transfer foils displaying the same image. If such cards allow extraction, from genuine cards, of the entire transfer foil or at least a laminate including a relief structure maintaining the shape, the extracted transfer foil or laminate may be reused to produce counterfeit cards including tampered authentication information. When the authenticity of such counterfeits cards is determined based on the reused transfer foil, it is difficult to identify counterfeit cards because the transfer foil is derived from a genuine card. Therefore, there is a possibility that the authentication information may be falsified, and the relief structure returned to the medium again for forgery.

Such circumstances require a card with measures to prevent counterfeiting and tampering with a relief structure.

Patent Literature 5 describes tampering in which a card substrate surface is scraped to remove individual information, and different information is printed on the card. Tampering may be performed by overwriting the image with a different image using a laser engraving device, or by overwriting the information by gravure printing, inkjet printing, a laser printer, or the like.

In a known method for detecting and preventing tampering, personal information and the like displayed on an ID card are stored in an IC chip and the digital data in the IC chip is encrypted, and a reader device is used to read the data and analyze and verify the information. However, this method requires a reader device and processing time, thus requiring time and effort for determination.

Another widely used anti-counterfeiting means uses foils or seals of a surface-relief-type diffraction grating or hologram having a relief structure attached to articles. When a foil of a surface-relief-type diffraction grating or hologram is transferred to a card or a transparent substrate inside a card and laminated, the foil is located inside the card and is thus less likely to be tampered with.

When a relief layer located inside the transparent substrate of the card is irradiated with light, concavities and convexities of the relief layer cause interference of incident light through the transparent substrate, enabling reconstruction of image information at a certain angle or an angle in a certain range with respect to the incident light.

Such relief-type diffraction grating structures and holograms can be mass produced by preparing an original plate in which image information is recorded using concavities and convexities, and performing an embossing process using the original plate. Thus, seals and foils including relief-type diffraction grating structures and holograms are used for various purposes.

However, such relief-type diffraction structures and holograms have not yet reached the point of completely eliminating tampering, for example, which uses a foil or seal portion cut off from the substrate.

In view of the above circumstances, an object of the embodiments of the present invention is to provide a medium including a relief structure that is difficult to reuse in an unauthorized manner, a laminate and a card including a transfer foil that includes a relief structure and is difficult to reuse in an unauthorized manner, and a method of manufacturing the card.

Another object of the embodiments of the present invention is to provide an information recording sheet in which high adhesion between a relief-type diffraction grating or hologram structure and a card substrate makes it more difficult to peel or separate a security patch including a relief structure and the like.

Solution to Problem

According to a first aspect of the present invention, a laminate includes, in a thickness direction of the laminate,
a transfer foil in which at least a patch substrate, a relief forming layer, a reflective layer, and an adhesive layer are sequentially laminated, a protective sheet that is provided on a first side of the transfer foil in the thickness direction, and
an information recording sheet that is provided on a second side of the transfer foil facing away from the protective sheet in the thickness direction, wherein the relief forming layer includes a relief structure having a concavo-convex shape composed of concavities and convexities on at least part of a first surface of the relief forming layer in contact with the reflective layer, a second surface of the reflective layer in contact with the first surface has a shape corresponding to the concavo-convex shape of the relief structure, the relief forming layer is composed of one or a combination of a thermoplastic resin, a thermosetting resin, and an ultraviolet curable resin, the relief structure has a plurality of island regions that are arranged in a predetermined pattern and a sea region on the first surface as viewed in the thickness direction, in the island regions, the relief forming layer has one or a combination of functional groups including a hydroxyl group, a carboxyl group, and a carbonyl group and a rough surface, and in the sea region, the relief forming layer has neither the functional group nor the rough surface, or a content of the functional group is smaller than in the island regions, or a roughness degree and an area of the rough surface are smaller than in the island regions.

The laminate may be configured such that the relief forming layer has a first relief region having a first relief structure in which each of the concavities and the convexities extends in a first direction along the thickness direction and the concavities and the convexities are alternately arranged in a second direction perpendicular to the first direction, and a second relief region having a second relief structure that has a directivity in a direction different by at least 30 degrees or more from the first direction as viewed in a direction perpendicular to a plane including the first direction and the second direction or in which the concavities and the convexities are irregularly arranged, and the first relief region is disposed to overlap with the sea region and the second relief region is disposed to overlap with the island regions as viewed in the thickness direction.

According to a second aspect of the present invention, a laminate includes, in a thickness direction of the laminate,
a transfer foil in which at least a patch substrate, a relief forming layer, a reflective layer, and an adhesive layer are sequentially laminated, a protective sheet that is provided on a first side of the transfer foil in the thickness direction, and an information recording sheet that is provided on a second side of the transfer foil facing away from the protective sheet in the thickness direction, wherein the relief forming layer includes a relief structure having a concavo-convex shape composed of concavities and convexities on at least part of a first surface of the relief forming layer in contact with the reflective layer, a second surface of the reflective layer in contact with the first surface has a shape corresponding to the concavo-convex shape of the relief structure, the relief structure is composed of one or a combination of a thermoplastic resin, a thermosetting resin, and an ultraviolet curable resin, the relief structure has a plurality of island regions that are arranged in a predetermined pattern and a sea region on the first surface as viewed in the thickness direction, a contact angle of a coating liquid of the adhesive layer with the reflective layer in the island regions is smaller than a contact angle of the coating liquid of the adhesive layer with the reflective layer in the sea region, and a breaking strength of the adhesive layer is higher than an interfacial adhesion strength and a breaking strength of the patch substrate and the relief forming layer.

The laminate may be configured such that the relief forming layer has a first relief region having a first relief structure in which each of the concavities and the convexities extends in a first direction along the thickness direction and the concavities and the convexities are alternately arranged in a second direction perpendicular to the first direction, and a second relief region having a second relief structure that has a directivity in a direction different by at least 30 degrees or more from the first direction as viewed in a direction perpendicular to a plane including the first direction and the second direction or in which the concavities and the convexities are irregularly arranged, and the first relief region is disposed to overlap with the sea region and the second relief region is disposed to overlap with the island regions as viewed in the thickness direction.

The laminate may be configured such that a ratio of an area of the island regions to a total area of an entire region including the island regions and the sea region is 50% or more and 80% or less.

The laminate may be configured such that the island regions have the same shape and are regularly arranged, and a distance between centers of adjacent ones of the island regions is 40 μm or more and 400 μm or less.

According to a third aspect of the present invention, a laminate includes, in a thickness direction of the laminate,
a transfer foil in which at least a patch substrate, a relief forming layer, a first reflective layer, a second reflective layer, and an adhesive layer are sequentially laminated, a protective sheet that is provided on a first side of the transfer foil in the thickness direction, and an information recording sheet that is provided on a second side of the transfer foil facing away from the first side in the thickness direction, wherein at least one of the first reflective layer and the second reflective layer is composed of a light transmissive material having a higher refractive index than the relief forming layer and the adhesive layer, the relief forming layer includes a relief structure having a concavo-convex shape composed of concavities and convexities on at least part of a first surface of the relief forming layer in contact with the first reflective layer, a second surface of the first reflective layer in contact with the first surface has a shape corresponding to the concavo-convex shape of the relief structure, the first reflective layer has a surface shape corresponding to a surface shape of the second reflective layer at an interface at which the first reflective layer is in contact with the second reflective layer, the transfer foil has a plurality of regions that are arranged in a predetermined pattern as viewed in the thickness direction and include a first region and a second region, the first region includes the first reflective layer and the second reflective layer, the second region includes only the first reflective layer, an interfacial adhesion strength between the first reflective layer and the adhesive layer is different from an interfacial adhesion strength between the second reflective layer and the adhesive layer, and the first region or the second region, whichever has a relatively high interfacial adhesion strength at an interface with the adhesive layer, is island regions scattered in the other region, and the first region or the second region, whichever has a relatively low interfacial adhesion strength at an interface with the adhesive layer, is a sea region that surrounds the region having a relatively high interfacial adhesion strength at the interface with the adhesive layer.

The laminate may be configured such that an interfacial adhesion strength at an interface between the layers of the transfer foil is lower than an interfacial adhesion strength between the transfer foil and the protective sheet or the information recording sheet, and an interfacial adhesion strength between the patch substrate and the relief forming layer and a breaking strength of the relief forming layer are lower than an interfacial adhesion strength between the first reflective layer and the second reflective layer and also lower than an interfacial adhesion strength between the relief forming layer and the first reflective layer.

The laminate may be configured such that in the island regions, the first reflective layer or the second reflective layer and the adhesive layer both have hydrophilic surface properties, or both have hydrophobic surface properties, and in the sea region, the first reflective layer or the second reflective layer and the adhesive layer have different surface properties, or have the same surface properties as in the island regions, and a contact angle of a coating liquid of the adhesive layer with the first reflective layer or the second reflective layer is lower in the island regions than in the sea regions.

The laminate may be configured such that in the island regions, the first reflective layer or the second reflective layer is adhered to the adhesive layer by at least one chemical interaction of an ionic bond, a covalent bond, and a hydrogen bond, and in the sea region, the first reflective layer or the second reflective layer is adhered to the adhesive layer by a physical interaction due to an intermolecular force.

The laminate may be configured such that a ratio of an area of the island regions to a total area of an entire region including the island regions and the sea region is 50% or more and 80% or less.

The laminate may be configured such that the island regions have the same shape and are regularly arranged, and a distance between centers of adjacent ones of the island regions is 40 µm or more and 400 µm or less.

According to a fourth aspect of the present invention, a card includes the above-described laminate, and a support layer that is provided on the first side of the transfer foil.

According to a fifth aspect of the present invention, a card manufacturing method is a method of manufacturing a card including, in a thickness direction of the card, a transfer foil including at least a patch substrate, a relief forming layer, a first reflective layer, a second reflective layer, and an adhesive layer, a protective sheet and a support layer that are provided on a first side of the transfer foil in the thickness direction, and an information recording sheet that is provided on a second side of the transfer foil facing away from the protective sheet in the thickness direction. The method includes a step of producing the transfer foil in which the patch substrate, the relief forming layer, the first reflective layer, the second reflective layer, and the adhesive layer are sequentially laminated, a step of transferring the transfer foil to the protective sheet or the information recording sheet, and an adhesion step of laminating, between the protective sheet and the support layer, an object to which the transfer foil is transferred including the information recording sheet, wherein the step of producing the transfer foil includes forming a relief structure having concavities and convexities on at least part of a surface of the relief forming layer in contact with the first reflective layer, forming the first reflective layer having a concavo-convex shape conforming to the relief structure and the second reflective layer having a concavo-convex shape corresponding to a surface shape of the first reflective layer, and in a plurality of regions of the transfer foil that are arranged in a predetermined pattern as viewed in the thickness direction and include a first region and a second region, removing the second reflective layer in the second region so that the first region includes the first reflective layer and the second reflective layer and that the second region includes only the first reflective layer.

The method of manufacturing a card may be configured such that the step of producing the transfer foil includes forming an etching mask layer in the first region after formation of the second reflective layer, and removing the etching mask layer after removal of the second reflective layer in the second region.

According to a sixth aspect of the present invention, a medium includes, in a thickness direction of the medium, a security patch in which an adhesive layer, a breaking layer, and a verification layer are sequentially laminated and a relief structure is provided between the breaking layer and the verification layer, a protective sheet that is adhered to the adhesive layer of the security patch in the thickness direction, and an information recording sheet that is provided on a side of the security patch facing away from the adhesive layer in the thickness direction and is adhered to the verification layer of the security patch, wherein the security patch is enclosed by the protective sheet and the information recording sheet, the breaking layer has a breaking strength of 15 N/25 mm or more and less than 45 N/25 mm in a 90-degree peel adhesion strength test, and an adhesion strength between the security patch and the information recording sheet and an adhesion strength between the security patch and the protective sheet are higher than the breaking strength of the breaking layer by 5 N/25 mm or more and are five times or less the breaking strength of the breaking layer.

The medium may be configured such that the breaking layer contains a resin having optical transparency, and a filler composed of particles having an average particle size of 1 μm or less.

According to a seventh aspect of the present invention, a card includes the above-described medium, and a layer that is composed of another material and provided to store information.

According to an eighth aspect of the present invention, a method of producing a medium is a method of producing the above-described medium. The method includes a step of transferring and adhering the security patch to a surface of one of the information recording sheet and the protective sheet, and a step of adhering the security patch to the surface of the one of the information recording sheet and the protective sheet by applying an external force to the other of the information recording sheet and the protective sheet and the security patch so that the other of the information recording sheet and the protective sheet covers the security patch.

According to a ninth aspect of the present invention, a card information recording sheet is a card information recording sheet included in the above-described laminate or the above-described medium, and the information recording sheet is composed of polycarbonate blended with polyester.

The card information recording sheet may be configured such that the polyester has a glass transition temperature Tg of −20° C. to 110° C.

According to a tenth aspect of the present invention, a card includes the above-described card information recording sheet.

Advantageous Effects of the Invention

The above aspects provide a laminate and a card including a transfer foil that includes a relief structure and is difficult to reuse in an unauthorized manner, and a method of manufacturing the card. Furthermore, a medium and a card including a relief structure that is difficult to reuse in an unauthorized manner are provided. Furthermore, a method of producing such a medium is provided. A card including an anti-counterfeiting/tampering security patch that is difficult to detach and reuse is provided without a complicated or troublesome manufacturing process.

DETAILED DESCRIPTION

Figure 1:
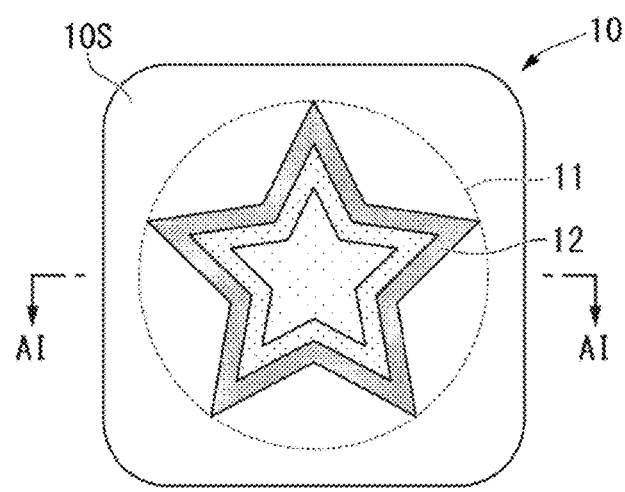
FIG. 1 is a schematic plan view illustrating a laminate of the present invention.

The embodiments of the present invention are a group of embodiments based on a single unique invention from the background. The aspects of the present invention are those of the group of embodiments based on a single invention. Configurations of the present invention can have the aspects of the present invention. Features of the invention can be combined to form the configurations. Therefore, the features of the present invention, the configurations of the present invention, the aspects of the present invention, and the embodiments of the present invention can be combined, and the combinations can have synergistic functions and exhibit synergistic effects.

Herein, the drawings are used to illustrate the configuration of the present invention. The dimensions shown in the drawings, such as the thickness of the layers and the thickness ratio, may be different from those of the actual configuration. The dimensional ratios in the drawings should not be construed as being limited to those shown in the drawings. For convenience of description, the same components in the embodiments are denoted by the same reference signs, and redundant description will be omitted. Furthermore, first to seventh embodiments are separately described to clearly describe some embodiments of the present invention, but these embodiments do not describe separate inventions. For the sake of the description, physical elements and means such as media, layers, members, structures, and shapes may be named differently.

First Embodiment

A laminate and a card of an embodiment of the present invention will be described below as the first embodiment with reference to FIGS. 1 to 7. The embodiment described herein is one preferred embodiment of the present invention, and the embodiment of the present invention is not limited to such a configuration unless stated otherwise in the following description. The design of the embodiment described below can be appropriately modified by those skilled in the art.

(Laminate)

FIG. 1 is a schematic plan view illustrating a configuration of a laminate 10. As shown in FIG. 1, the laminate 10 has a sheet shape. FIG. 1 shows an example in which the laminate 10 has a rectangular outline with rounded corners, but the laminate 10 may have an outline other than a rectangular outline, such as a circular or elliptical outline. The laminate 10 includes a transfer foil 11 inside the outer edge of the laminate 10 as viewed perpendicular to a surface 10S of the laminate 10, i.e., as viewed in the thickness direction of the laminate 10. In the transfer foil 11, an image 12 is recorded as authentication information. FIG. 1 shows an example in which the transfer foil 11 has a circular outer shape, but the transfer foil 11 may have an outer shape other than a circular outer shape, such as a rectangular or elliptical outer shape.

Figure 2A:
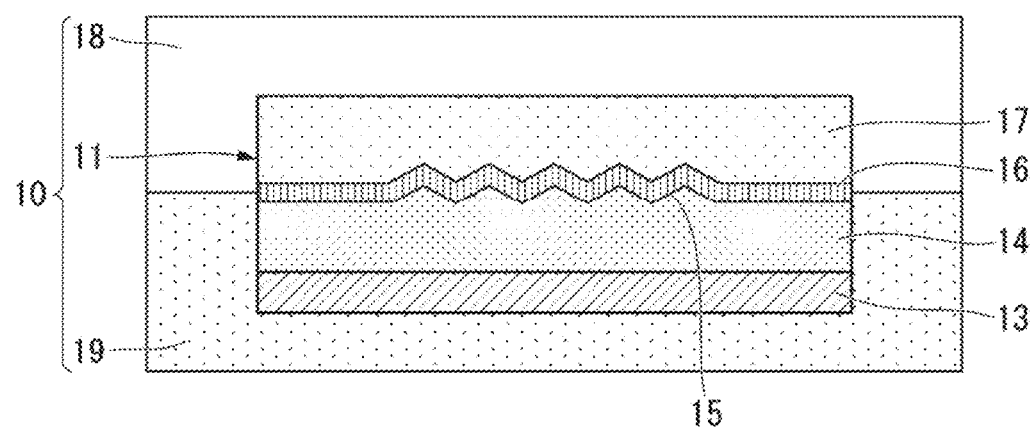
FIG. 2A is a cross-sectional view illustrating a configuration of the laminate taken along line AI-AI of FIG. 1.
Figure 2B:
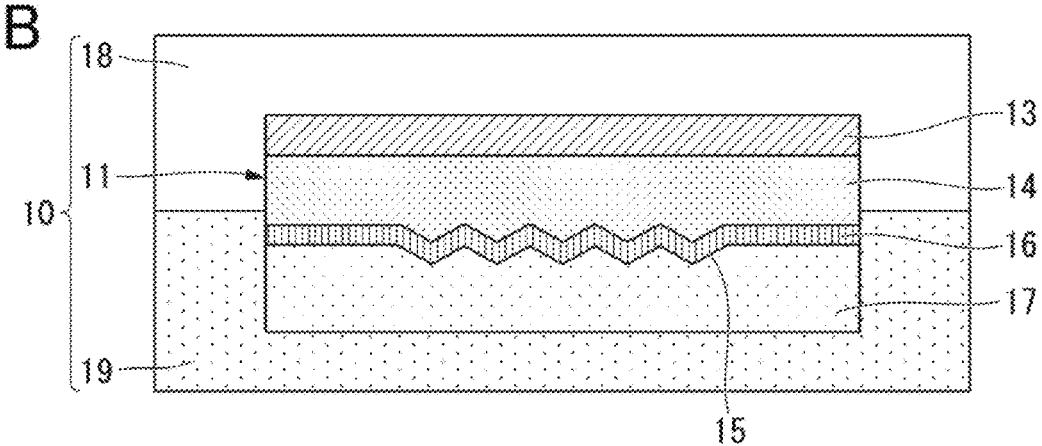
FIG. 2B is a cross-sectional view illustrating a configuration of the laminate taken along line AI-AI of FIG. 1.

FIG. 2 is a cross-sectional view of the laminate 10 taken along line AI-AI of FIG. 1. In the transfer foil 11, a patch substrate 13, a relief forming layer 14, a reflective layer 16, and an adhesive layer 17 are sequentially laminated. A relief structure 15 is provided on a surface of the relief forming layer 14, and the reflective layer 16 is provided conforming to a concavo-convex shape of the relief structure 15. The transfer foil 11 includes at least the above layers in the order described above, and may include other layers between these layers. The transfer foil 11 is laminated and enclosed by a protective sheet 18 and an information recording sheet 19 so as not to be exposed to the outside of the laminate 10. FIGS. 2A and 2B show layer configurations of the transfer foil 11 enclosed in the laminate 10, and FIG. 2B shows the layer configuration of the transfer foil 11 obtained by reversing the layer configuration of the transfer foil 11 shown in FIG. 2A. The transfer foil 11 may have either the configuration shown in FIG. 2A or the configuration shown in FIG. 2B. In the case of the configuration shown in FIG. 2A, the transfer foil 11 is transferred to the protective sheet 18 via the adhesive layer 17, and then laminated. On the other hand, in the case of the configuration shown in FIG. 2B, the transfer foil 11 is transferred to the information recording sheet 19 via the adhesive layer 17, and then laminated.

The transfer foil 11 may include a breaking layer 108 or 202 between the adhesive layer and the relief forming layer 14.

Thereby, it can be provided to adjust the adhesive strength between the transfer foil 11 and the protective sheet 18 and the information recording sheet 19. A security patch 102 described later may be the transfer foil 11. The protective sheet 18 is described as the protective substrate layer 18 in Japanese Patent Application No. 2021-095146. The patch substrate 13 is described as the release layer 13 in Japanese Patent Application No. 2021-095146.

An optical effect of the relief structure 15 allows display of an image 12 that can be visually recognized by an observer of the laminate 10. FIG. 1 shows an example in which the image 12 has a star shape, but the image 12 may be a portrait, a landmark motif, a natural motif, calligraphy, a geometric pattern, a character, a number, a signal, a sign, a symbol, an emblem, a coat of arms, a code, or a combination thereof. Examples of the symbol include a flag, a shield, a sword, a spear, a crown, a flower, a leaf, a plant, a bird, a fish, an arthropod, a mammal, a reptile, an amphibian, a legendary creature, a mythical god, and a mythical goddess. Examples of the natural motif include motifs of a living thing, a star, the moon, the sky, a mountain, a valley, and a rock. Examples of motifs of a living thing include motifs of a flower, a leaf, a cereal, a fruit, a bird, a wing, a fish, an arthropod, a mammal, a reptile, and an amphibian.

The code may be a one-dimensional code or a two-dimensional code. Examples of the one-dimensional code include a barcode, a serial number, and a combination thereof. Examples of the two-dimensional code include a QR code (registered trademark). Examples of the geometric pattern include a guilloche pattern. Examples of the legendary creature include a unicorn, a dragon, and a phoenix. Examples of the symbol include symbols representing a country, a region, a state, a group, an assembly, a treaty, an alliance, a union, and an axis.

(Island Region and Sea Region)

Island regions R1, a sea region R2, and the relief structure 15 that constitute the laminate 10 will be described below.

Figure 3:
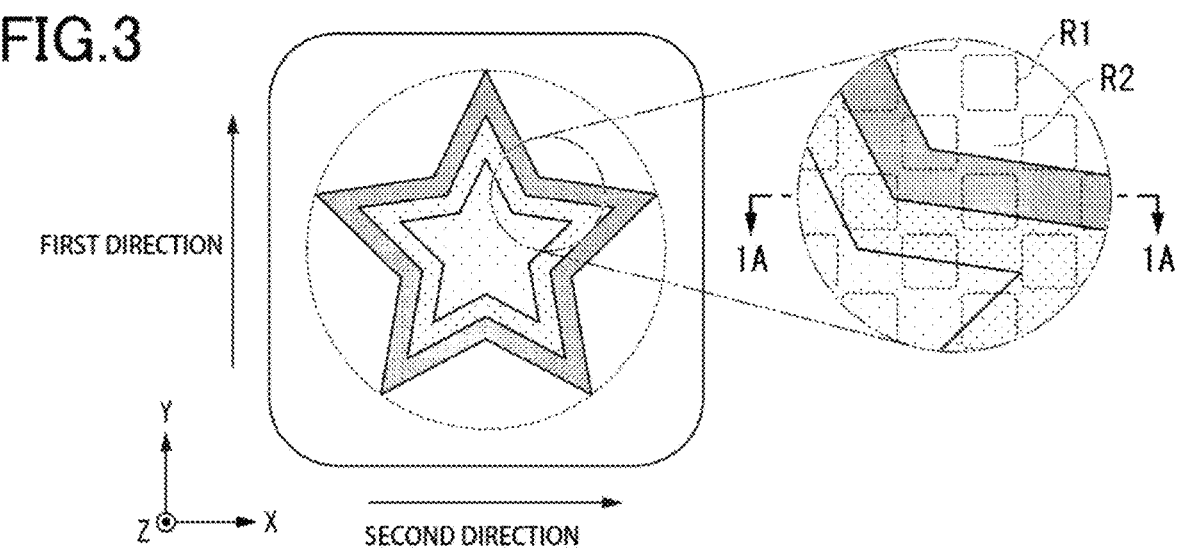
FIG. 3 is a schematic plan view illustrating a configuration of a transfer foil.

FIG. 3 is a plan view showing a configuration of the transfer foil 11. The transfer foil 11 has the island regions R1 and the sea region R2. FIG. 3 shows an example in which the island regions R1 and the sea region R2 extend over the entire surface of the transfer foil, but the island regions R1 and the sea region R2 may be provided on only part of the transfer foil 11.

Figure 4:
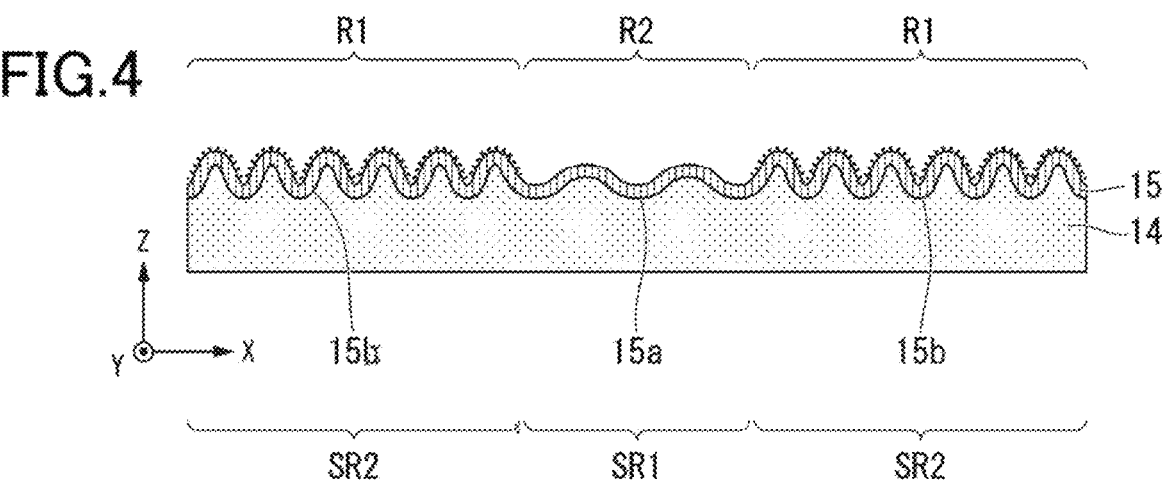
FIG. 4 is a cross-sectional view illustrating a configuration of the laminate taken along line 1A-1A of FIG. 3.

FIG. 4 is a partial cross-sectional view taken along line 1A-1A of FIG. 3, and shows a state of the relief forming layer 14 and the relief structure 15 corresponding to the island regions R1 and the sea region R2. In the island regions R1, the surface of the relief forming layer 14 on which the relief structure 15 is provided is composed of a thermoplastic resin or an ultraviolet curable resin having at least one functional group of a hydroxyl group (—OH), a carboxyl group (—COOH), or a carbonyl group (C=O) in a side chain. Alternatively, the surface of the relief forming layer 14 may be rough. On the other hand, in the sea region R2, the surface of the relief forming layer 14 has neither the functional group nor the rough surface, or the content of the functional group on the surface of the relief forming layer 14 is smaller than in the island regions R1, or the roughness degree and the area of the rough surface of the relief forming layer 14 are smaller than in the island regions R1.

It is known that in general, many resins, particularly polyolefin synthetic resins such as a polypropylene resin and a polyethylene resin, have no polar groups on the surface and are hydrophobic, and have no affinity for an adhesive, an ink, or the like. Thus, in secondary processing of a resin, the resin is subjected to surface modification by corona treatment, plasma treatment, or the like to increase the hydrophilicity by introducing polar functional groups as described above to the resin surface. In corona treatment or plasma treatment, oxygen molecules in the air are dissociated and oxygen atoms are excited by discharge in the air, leading to generation of a plasma containing oxygen ions and free electrons. Electrons, ions, and radicals of the generated plasma break the chemical bond between the molecules on the resin surface, generating a hydrophilic functional group such as a hydroxyl group, a carboxyl group, or a carbonyl group according to the type of resin. This allows the resin to be easily bonded to another material, and thus the adhesion of the resin is expected to be improved. The adhesion of the resin to an adhesive, an ink, or the like can also be improved by physical roughening of the resin surface by discharge to secure a sufficient surface area of the resin. As another effect of corona treatment and plasma treatment, organic contaminants are washed away from the resin surface. In the transfer foil 11 according to the first embodiment, when the resin constituting the relief forming layer 14 has no polar functional groups, the adhesion between the relief forming layer 14 and the reflective layer 16 can be improved by generating polar functional groups on the surface by surface modification through corona treatment, plasma treatment, or the like.

On the surface of the relief forming layer 14, only the island regions R1 are subjected to addition of functional groups or roughening treatment, and the sea region R2 is not subjected to such treatment. This can allow an interfacial adhesion strength between the relief forming layer 14 and the reflective layer 16 to be different between the island regions R1 and the sea region R2. The "interfacial adhesion strength" can be defined as the strength of the bond at the interface between two layers. An object of the present invention is to prevent unauthorized reuse of the transfer foil 11. When a counterfeiter attempts to extract the transfer foil 11, the counterfeiter is assumed to cut the surface of the laminate 10 and separate the region including the entire image 12 of the transfer foil 11 from the laminate 10 using a cellophane tape or a tool such as tweezers. A 90-degree peel adhesion strength test method defined by JIS K6854-1 (ISO8510-1) is an example of a test method for measuring the adhesion strength (including interfacial failure and cohesive failure) under application of a force similar to the force applied to the transfer foil 11 during separation of the transfer foil 11 from the laminate 10. The interfacial adhesion strength can be measured by a method according to this method.

By merely causing the interfacial adhesion strength between the relief forming layer 14 and the reflective layer 16 to be different between the island regions R1 and the sea region R2 as described above, it is possible to prevent separation of the transfer foil 11 in which the shape of the relief structure 15 is maintained when unauthorized extraction of the transfer foil 11 from the laminate 10 is attempted. This can achieve the effect described above even when the relief structure 15 has the same shape and is disposed in the same direction in the island regions R1 and in the sea region R2.

Figure 5A:
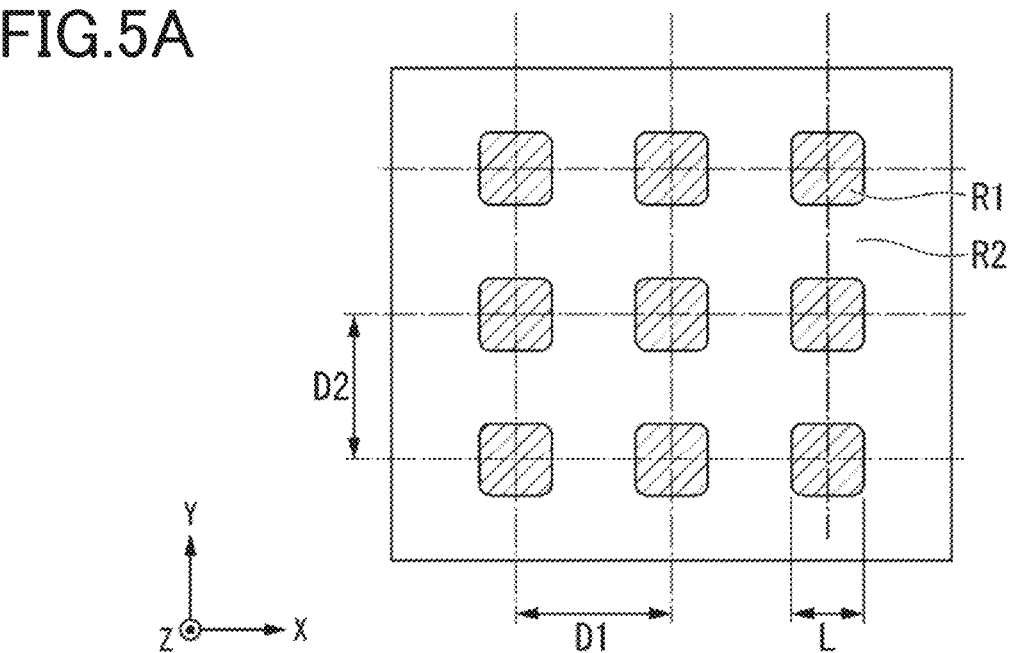
FIG. 5A is a schematic plan view illustrating an example of a shape and arrangement of island regions.
Figure 5B:
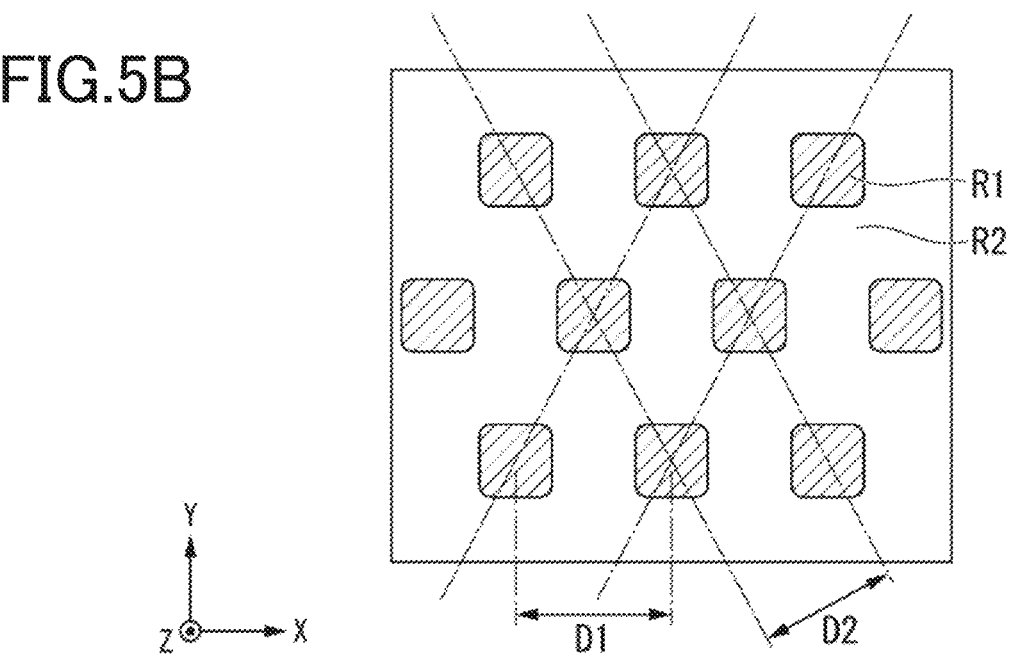
FIG. 5B is a schematic plan view illustrating one example of the shape and arrangement of the island regions.
Figure 5C:
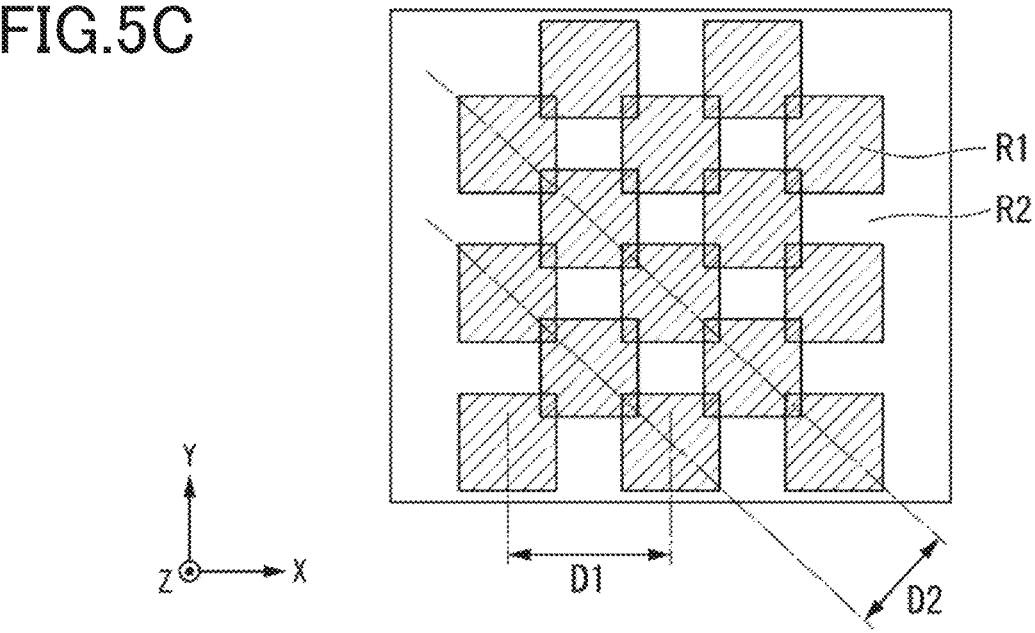
FIG. 5C is a schematic plan view illustrating another example of the shape and arrangement of the island regions.
Figure 5D:
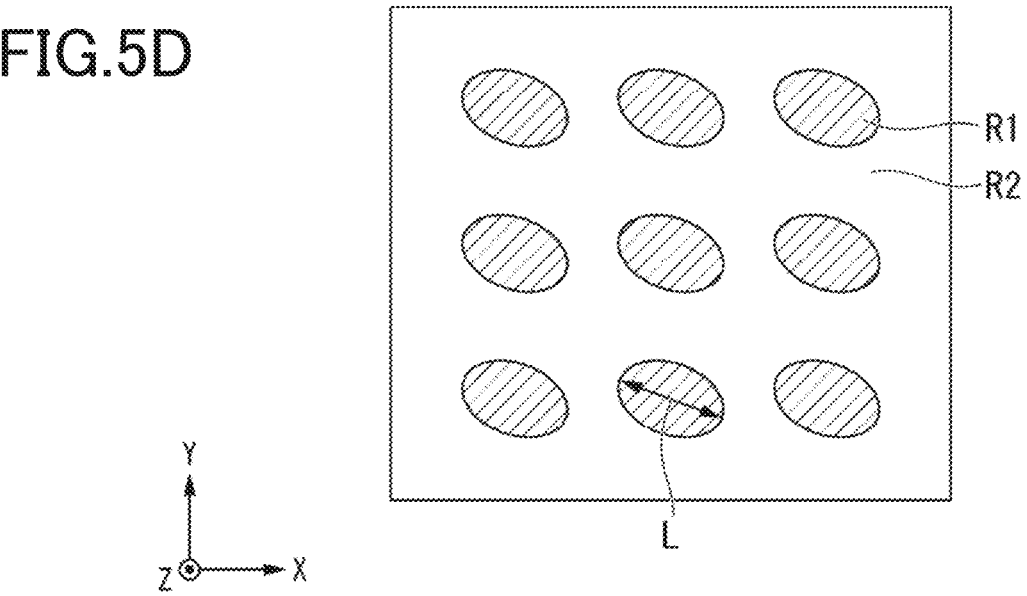
FIG. 5D is a schematic plan view illustrating another example of the shape and arrangement of the island regions.
Figure 5E:
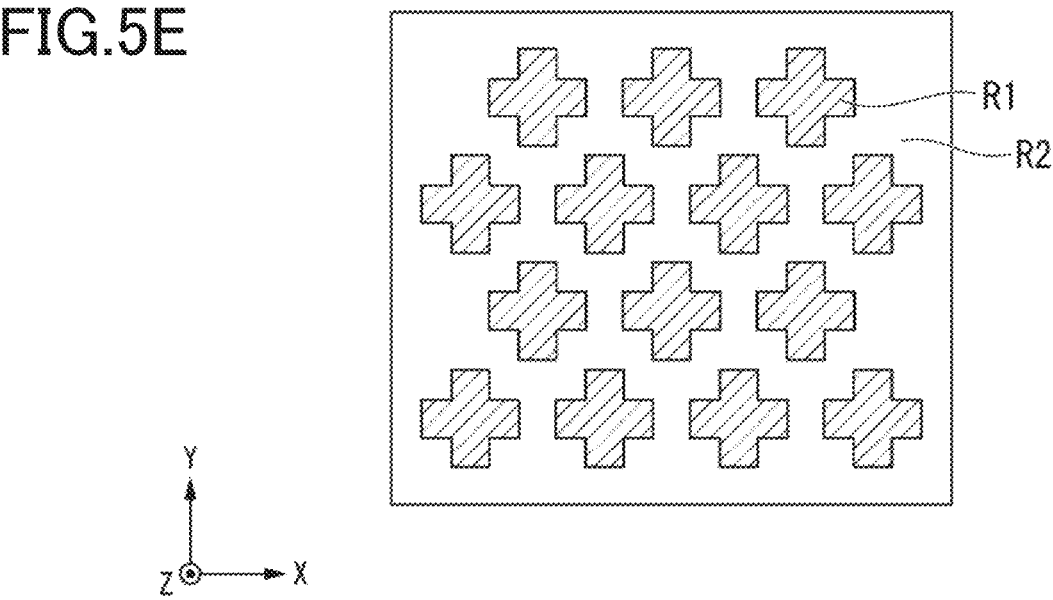
FIG. 5E is a schematic plan view illustrating another example of the shape and arrangement of the island regions.
Figure 5F:
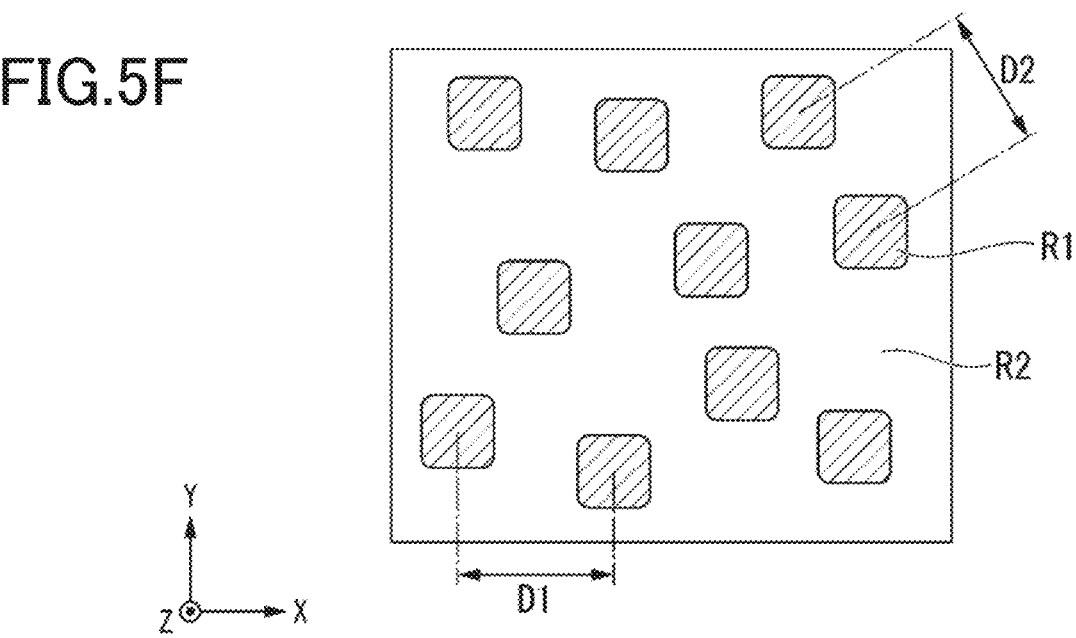
FIG. 5F is a schematic plan view illustrating another example of the shape and arrangement of the island regions.

FIGS. 5A to 5F show an example of the shape and arrangement of the island regions R1. More specifically, FIGS. 5A to 5E show an example in which the island regions R1 are regularly arranged. FIG. 5F shows an example in which the island regions R1 are irregularly arranged. The island regions R1 may be arranged so that regions in which the island regions R1 are irregularly arranged are regularly arranged. In FIG. 5A, the island regions R1 are arranged so that a center-to-center distance D1 is the distance between the centers of adjacent island regions R1 in an X direction and a center-to-center distance D2 is the distance between the centers of adjacent island regions R1 in a Y direction. The center-to-center distance D1 between adjacent island regions R1 may be equal to or different from the center-to-center distance D2 between adjacent island regions R1. FIGS. 5B and 5C show modifications of the configuration shown in FIG. 5A. In FIGS. 5B and 5C, two axes along which the island regions R1 are regularly arranged are indicated by dash-dot lines. FIGS. 5B and 5C show the center-to-center distances D1 and D2 in the direction of the two axes along which adjacent island regions R1 are arranged. In FIGS. 5B and 5C, the center-to-center distances D1 and D2 are the minimum distance between adjacent island regions R1. In FIG. 5B, the island regions R1 are adjacent to each other via the sea region R2, and in FIG. 5C, portions of the island regions R1 are in contact with each other on the two axes. The island regions R1 are discretely arranged in the sea region R2. The island regions R1 may be separated from each other or partially in contact with each other. The transfer foil 11 may have both island regions R1 separated from each other and island regions R1 partially in contact with each other.

FIGS. 5A to 5C show the island regions R1 having a rectangular shape with rounded corners, but the shape of the island regions R1 is not limited to this. The island regions R1 may have an elliptical shape as shown in FIG. 5D, a circular shape, or a polygonal shape as shown in FIG. 5E.

As shown in FIG. 5F, the island regions R1 may be randomly arranged. The random arrangement refers to an arrangement that does not have two axes along which the island regions R1 are regularly arranged as shown in FIGS. 5A to 5E. Thus, although FIG. 5F shows only the two center-to-center distances D1 and D2 as examples of the center-to-center distance between adjacent island regions R1, there are more than two types of center-to-center distances between adjacent island regions R1.

The island regions R1 preferably have center-to-center distances D1 and D2 of 40 μm to 400 μm, and have a size of 20 μm to 300 μm. The "size" is defined as the length between two sides farthest from each other on the outer periphery of the island regions R1 when the island regions R1 have a shape that has sides extending in the X direction and the Y direction, and is defined as the length between two points farthest from each other on the outer periphery of the island regions R1 when the island regions R1 have a shape that does not have sides extending in the X direction and the Y direction. Thus, when the island regions R1 have a rectangular shape that has sides extending in the X direction and the Y direction as shown in FIG. 5A, a size L is the length of the side extending in the X direction (or the Y direction, whichever is longer), and when the island regions R1 have an elliptical shape that does not have sides extending in the X direction and the Y direction as shown in FIG. 5D, the size L is the length between two points farthest from each other.

The average area ratio of the island regions R1 to the total area of the entire region including the island regions R1 and the sea region R2 is preferably 50% to 80%. When the ratio of the area of the island regions R1 is set in this range, the separation state of the transfer foil 11 in the island regions R1 is reflected in half or more of the surface of the transfer foil 11 separated from the laminate 10. Thus, when unauthorized extraction of the transfer foil 11 is attempted, the optical effect derived from the relief structure 15 is reduced, improving the effect of preventing reuse of the transfer foil 11.

The ratio of the area of the island regions R1 is determined by the size L of the island regions R1 and the center-to-center distance between adjacent island regions R1. In addition to these two parameters, the area of a portion of the sea region R2 located between adjacent island regions R1 or whether the island regions R1 are arranged regularly or randomly also affect the surface state of the separated transfer foil 11.

(Relief Structure)

The relief structure 15 has a plurality of fine concavities and convexities that have a height difference of 0.02 μm to 5 μm between the bottom surface of the concavities and the upper surface of the convexities in the thickness direction of the transfer foil 11 and that are arranged at intervals of 0.1 μm to 20 μm in a width direction of the transfer foil 11 (a direction perpendicular to the thickness direction). Hereinafter, the distance between the centers of adjacent concavities and the distance between the centers of adjacent convexities are referred to as a "period".

As shown in FIG. 4, a first relief structure 15a provided in a first relief region SR1 extends in a first direction (Y direction) shown in FIG. 3, and has a shape in which concavities and convexities are alternately arranged in a second direction (X direction) perpendicular to the first direction. On the other hand, a second relief structure 15b provided in a second relief region SR2 extends in a third direction different from the first direction, and has a shape in which concavities and convexities are alternately arranged in a fourth direction perpendicular to the third direction. Although, since FIG. 4 is a cross-sectional view, it is difficult to visually recognize that the first relief structure 15a and the second relief structure 15b extend in different directions, the third direction in which the second relief structure 15b extends is different by 30 degrees or more from the first direction (Y direction).

In FIG. 4, the first relief region SR1 is disposed corresponding to the sea region R2, and the second relief region SR2 is disposed corresponding to the island regions R1. That is, the first relief region SR1 can be the sea region R2, and the second relief region SR2 can be the island regions R1. When the first relief region SR1 does not correspond to the sea region R2 and the second relief region SR2 does not correspond to the island regions R1, the transfer foil 11 is preferably configured such that the first relief region SR1 is included in the sea region R2 and the second relief region SR2 is included in the island regions R1, and is particularly preferably configured such that the sea region R2 is framed by the first relief region SR1 and the island region R1 is framed by the second relief region SR2. In this configuration, when extraction of the transfer foil 11 from the laminate 10 in the first direction is attempted, in the island regions R1, due to the high interfacial adhesion strength between the relief forming layer 14 and the reflective layer 16, and the resistance (anchor effect) provided by the second relief structure 15b extending in a direction (third direction) different from the direction in which a force is applied (first direction), the interfacial adhesion strength between the two layers is further increased, and the transfer foil 11 is less likely to be separated at the interface between the two layers. On the other hand, in the sea region R2, due to the lower interfacial adhesion strength between the relief forming layer 14 and the reflective layer 16 than in the island regions R1, and the first relief structure 15a extending in the first direction, which is the direction in which a force is applied, the anchor effect of the first relief structure 15a is low, and the transfer foil 11 is more likely to be separated at the interface between the relief forming layer 14 and the reflective layer 16. Therefore, when extraction of the transfer foil 11 from the laminate 10 is attempted, different layers are separated or broken in the island regions R1 and in the sea region R2, and the shape of the relief structure 15 is not maintained; thus, the optical effect of the image 12 in appearance is reduced, making reuse of the transfer foil 11 difficult.

The relief structure 15 does not need to be provided in all of the island regions R1 and the sea region R2, and a part of each of the island regions R1 and the sea region R2 may have a flat surface on which the relief structure 15 is not provided. The region in which the relief structure 15 is provided may be determined according to the design of the image 12.

The relief structure 15 provided in the island regions R1 and the sea region R2 has been described with reference to FIG. 4. In the present invention, the relief structure 15 may be composed of one or a combination of a plurality of optical structures such as an optical diffraction structure, a non-reflective structure, an isotropic or anisotropic scattering structure, a lens structure, and a polarization selective reflection structure, and the relief structure 15 may be composed of structures shown in FIGS. 6A to 6F.

Figure 6A:
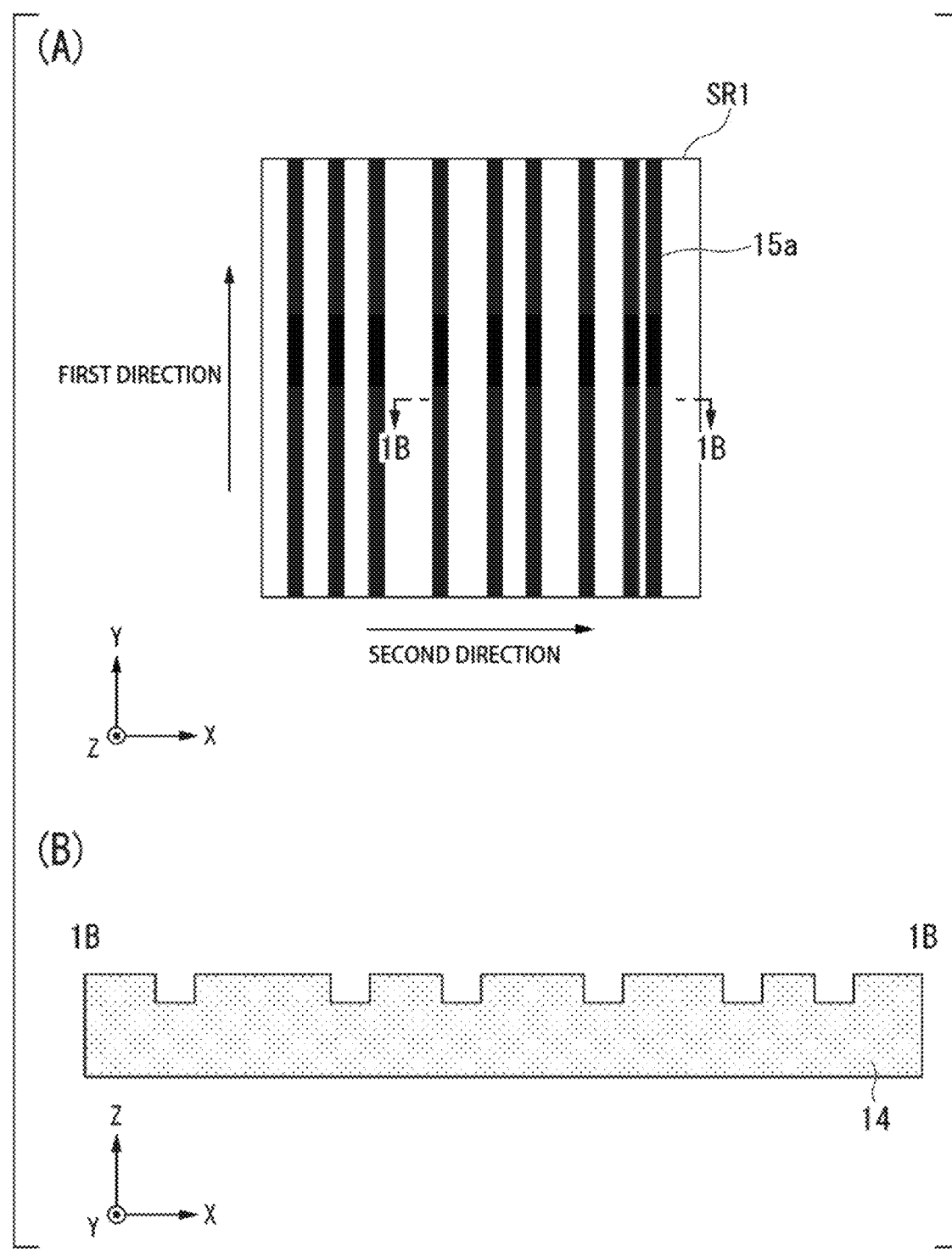
FIG. 6A includes a schematic plan view and a schematic cross-sectional view illustrating one example of a relief structure.
Figure 6B:
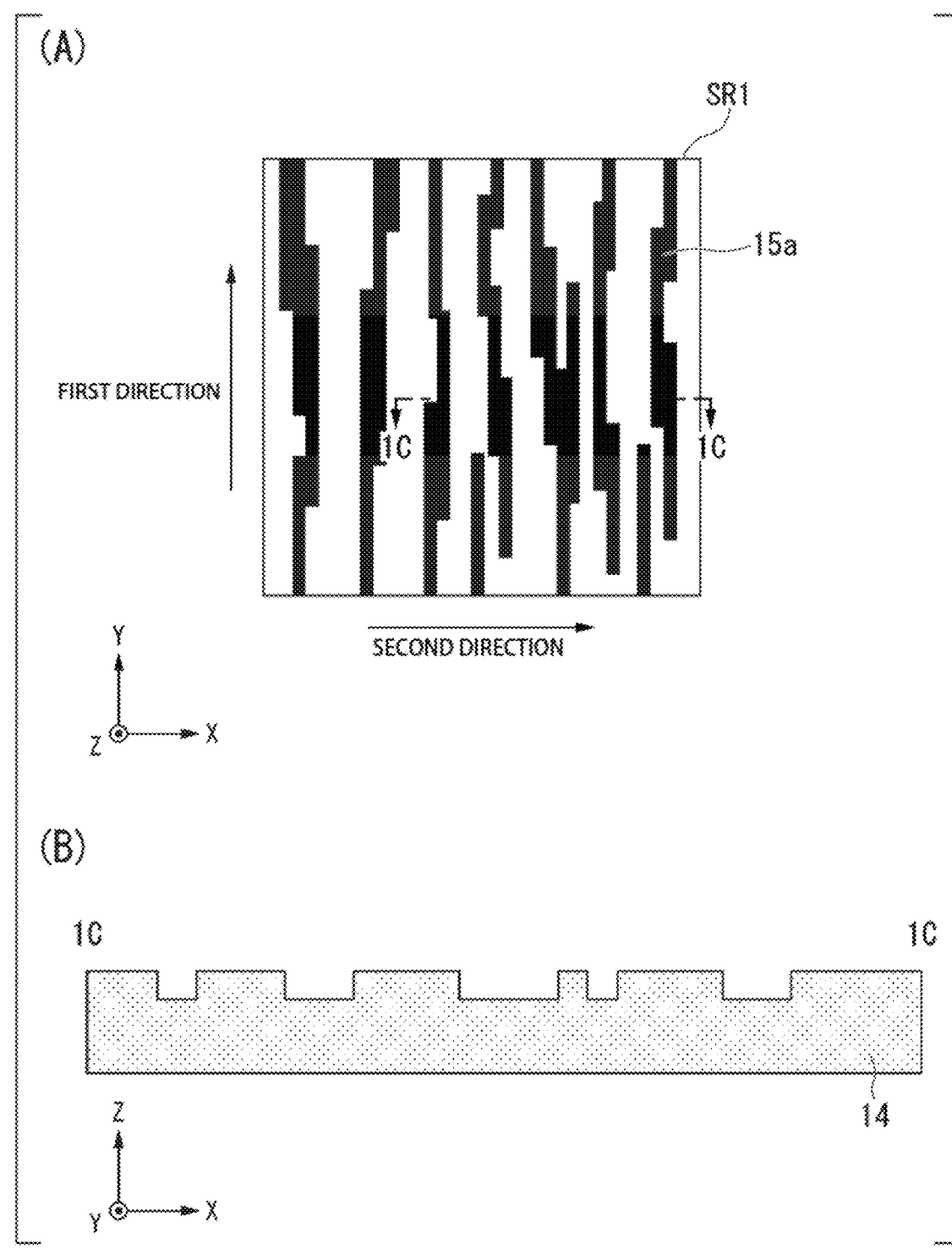
FIG. 6B includes a schematic plan view and a schematic cross-sectional view illustrating another example of the relief structure.

FIGS. 6A to 6F show examples of the relief structure 15. More specifically, FIGS. 6A to 6F each include a plan view and a cross-sectional view. FIGS. 6A and 6B show an example of the first relief structure 15a, and FIG. 6C to 6F show an example of the second relief structure 15b. In FIGS. 6A to 6F, the concavities are shown in black, and the convexities are shown in white. The cross-sectional view shows the concavities and the convexities having a rectangular shape or a pyramid shape for convenience, but the shape of the concavities and the convexities is not limited to this, and may be a wave shape, a sawtooth shape, or a tapered shape such as a trapezoidal shape.

The first relief structure 15a only needs to be configured such that the concavities and the convexities extend in the first direction. FIG. 6A shows an example in which the concavities having a constant width in the second direction and the convexities are alternately arranged at irregular intervals. The width of the concavities may not necessarily be constant. The concavities and the convexities arranged in the second direction may be arranged so that specific regions in each of which the concavities and the convexities are alternately arranged at irregular intervals are arranged at a constant period. As in the example shown in FIG. 6B, when the first relief structure 15a is configured to have a directivity in the first direction, rectangular concavities may be partially connected together to form polygonal concavities in plan view. Furthermore, the concavities and the convexities may extend discontinuously (intermittently). The ratio of the length of the concavities extending in the first direction to the width of the concavities is preferably 2 or more.

Figure 6C:
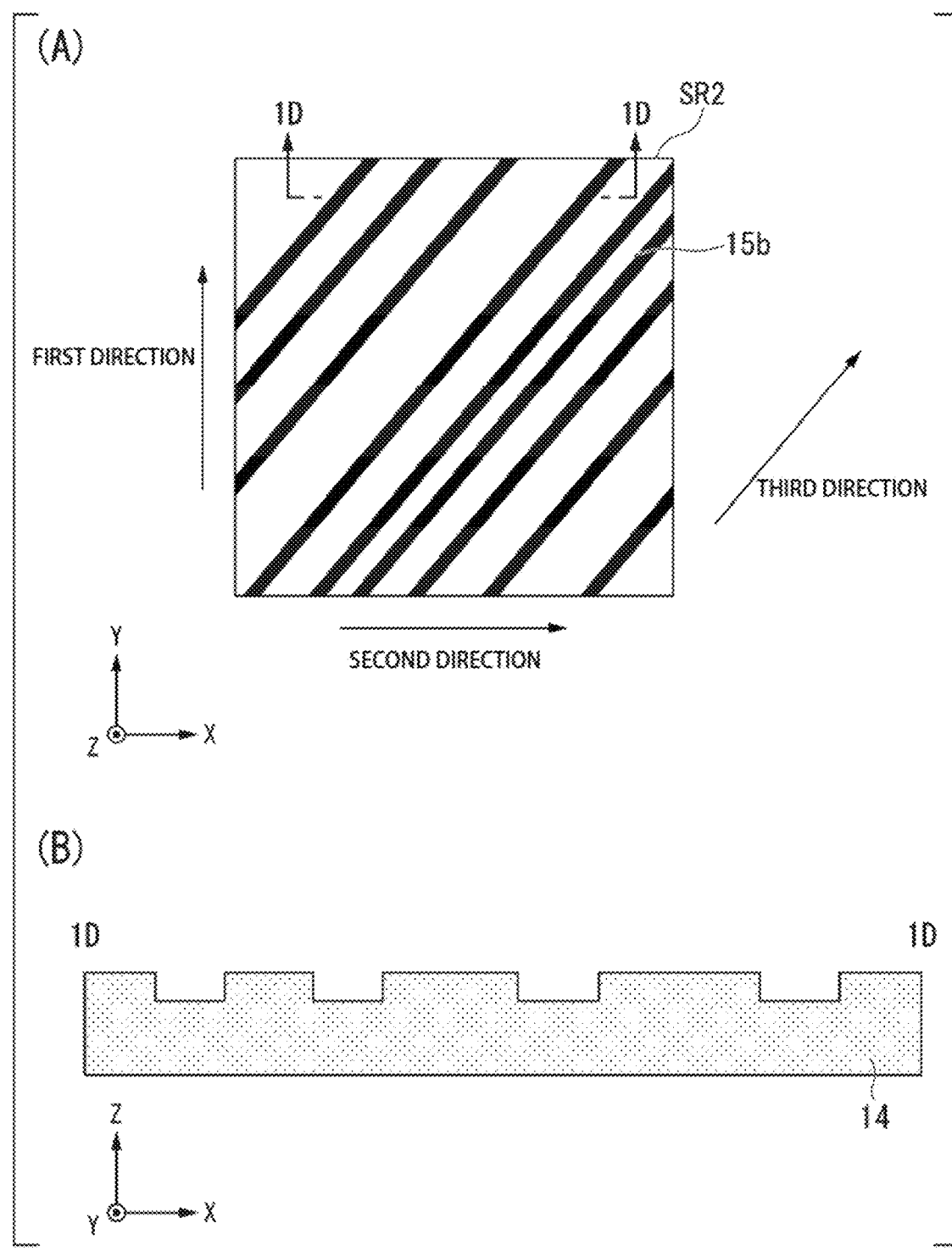
FIG. 6C includes a schematic plan view and a schematic cross-sectional view illustrating another example of the relief structure.

The second relief structure 15b only needs to extend in a direction different from the first direction in which the first relief structure 15a extends. FIG. 6C shows an example in which the concavities and the convexities extend in the third direction different from the first direction. The third direction is different by 30 degrees or more from the first direction. The second relief structure 15b extending in a direction with a larger angle difference from the first direction achieves a higher effect of preventing unauthorized use of the transfer foil 11, and the second relief structure 15b most preferably extends in a direction with an angle difference of 90 degrees from the first direction (extends in the second direction).

Figure 6D:
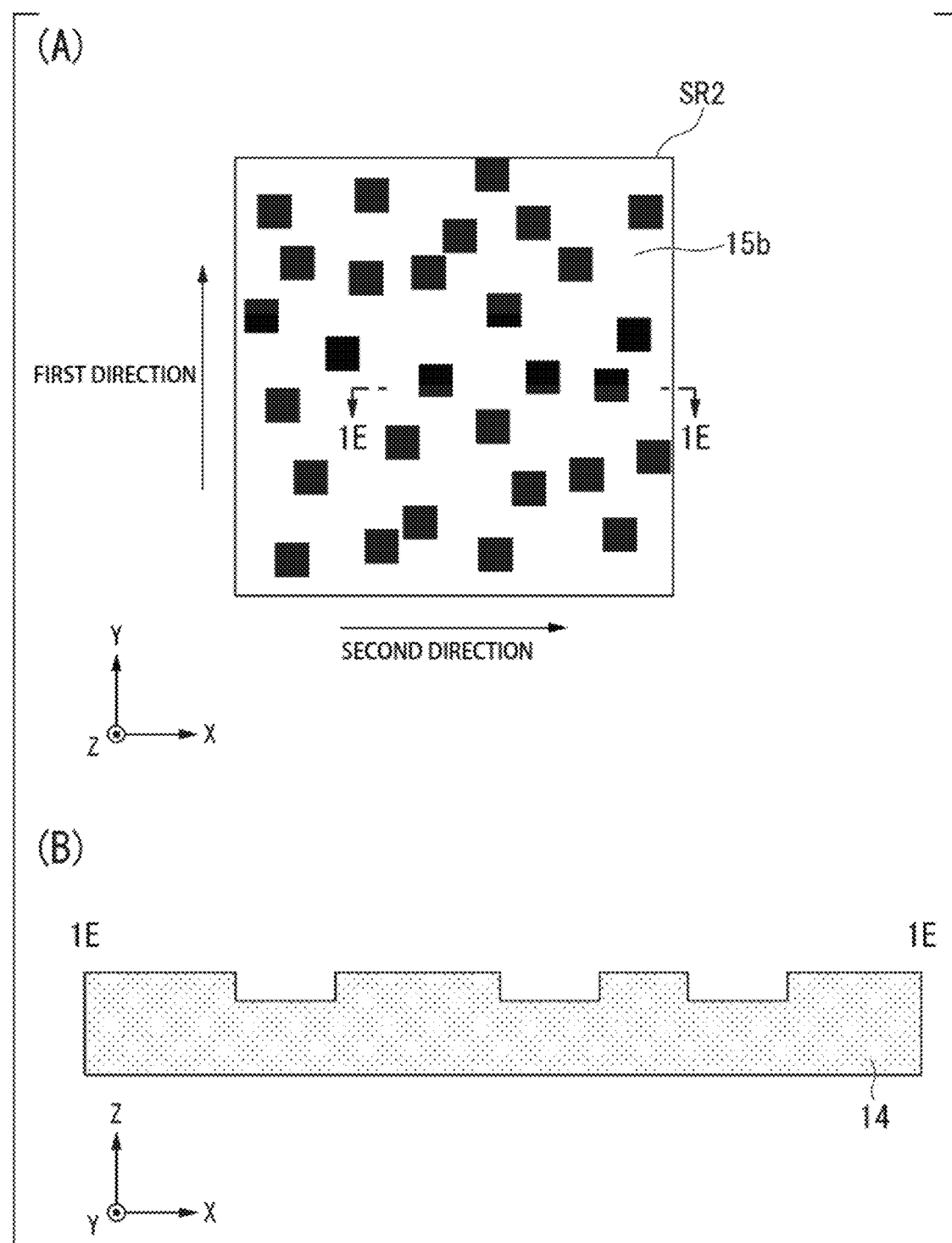
FIG. 6D includes a schematic plan view and a schematic cross-sectional view illustrating another example of the relief structure.

As shown in FIG. 6D, the second relief structure 15b may be configured such that the plurality of concavities are irregularly arranged. FIG. 6D shows an example in which the concavities have a square outer shape in plan view, but the present invention is not limited to this. The outer shape of the concavities may be a rectangular shape, a circular shape, or the like in plan view. The irregular arrangement of the concavities can prevent diffracted light. The concavities may have the same shape. The concavities and the convexities arranged in the second direction may be arranged so that specific regions in each of which the concavities and the convexities are alternately arranged at irregular intervals are arranged at a constant period.

The period of adjacent concavities is preferably 0.2 µm or more. The depth of the concavities may be set to a predetermined value in the range of 0.05 µm to 5 µm, or may not necessarily be set to a constant value. In the structure shown in FIG. 6D, by varying the depth of the concavities, the second relief structure 15b can exhibit a different optical effect, particularly a different hue. In a certain region, when the concavities have a constant depth, a specific color can be displayed, and when the concavities have a random depth, white can be displayed.

Figure 6E:
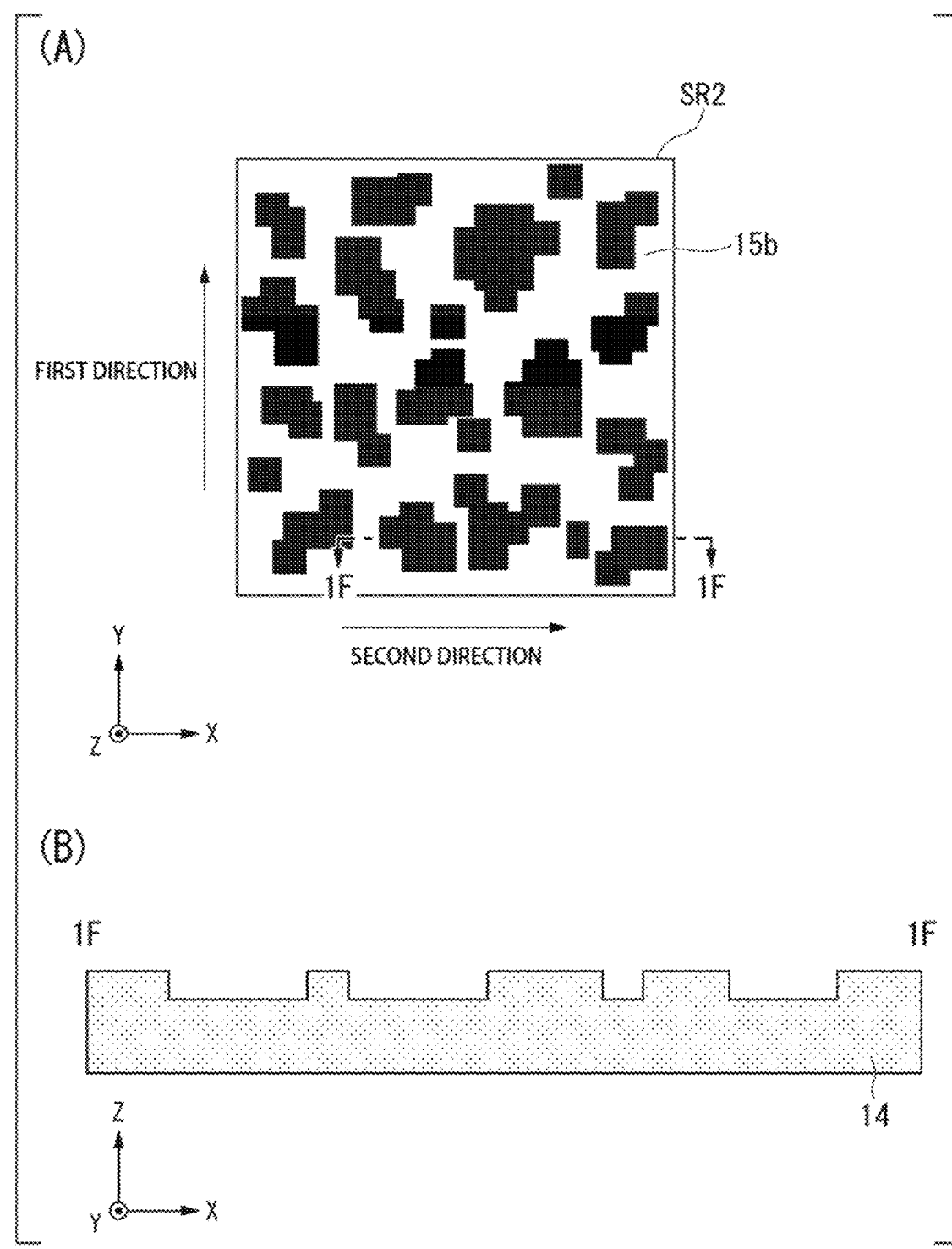
FIG. 6E includes a schematic plan view and a schematic cross-sectional view illustrating another example of the relief structure.

In the structure shown in FIG. 6E, the concavities composed of one or a combination of a plurality of squares or rectangles in plan view are randomly arranged. As shown in FIG. 6E, the plurality of squares or rectangles may not necessarily have a constant size, and the plurality of squares or rectangles may partially overlap with each other. The depth of the concavities may be 0.05 µm to 1 µm, and variation in the depth of all the concavities is preferably 0.05 µm or less.

Figure 6F:
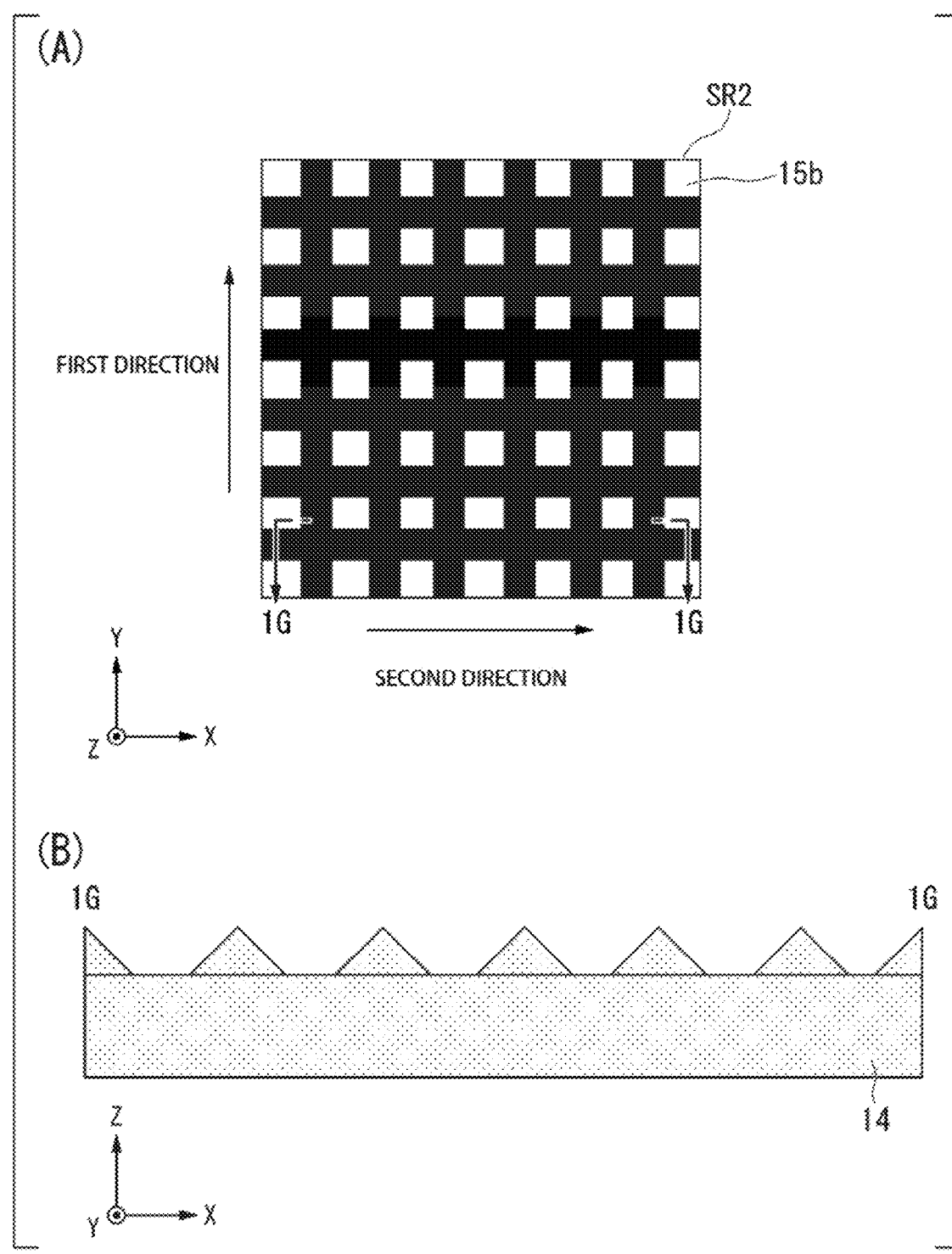
FIG. 6F includes a schematic plan view and a schematic cross-sectional view illustrating another example of the relief structure.

In the structure shown in FIG. 6F (A), the relief structure 15b is a cross grating in which the concavities extending in the first direction intersect with the concavities extending in the second direction in plan view. As shown in the cross-sectional view in FIG. 6F (B) taken along line 1G-1G of FIG. 6F (A), the relief structure 15b is a structure in which the convexities are provided at constant intervals. This example shows the cross-sectional view in the second direction, but the relief structure 15b has the same shape in the cross-sectional view in the first direction, and the convexities having a quadrangular pyramid shape or a conical shape with no corners are provided at constant intervals. FIG. 6F shows an example in which the convexities have a rectangular bottom and a pyramid shape, but the present invention is not limited to this. The convexities may have a circular bottom or a polygonal bottom, and may have a columnar shape or a bell shape. The period of the concavities and the convexities may be 0.1 µm to 2 µm, and in particular, when the relief structure 15b is a subwavelength structure, the relief structure 15b functions as a moth-eye structure.

(Effects of Laminate)

Figure 7A:
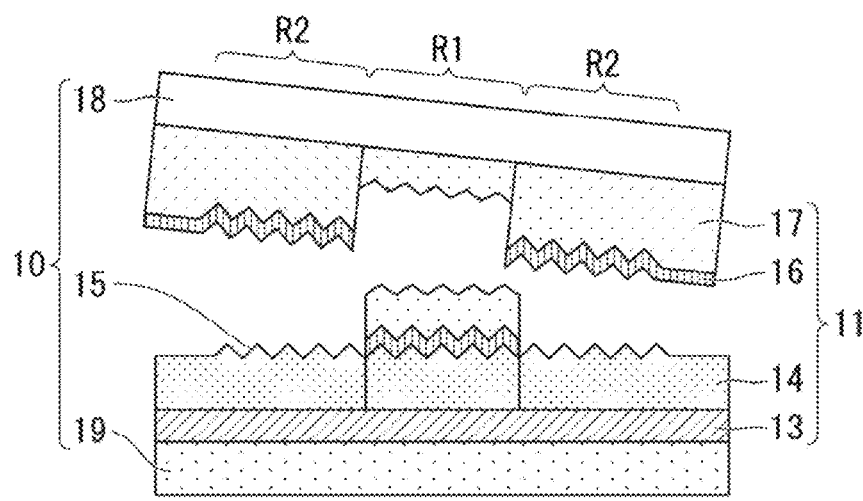
FIG. 7A is a schematic cross-sectional view illustrating one example of a state in which the laminate is separated.
Figure 7B:
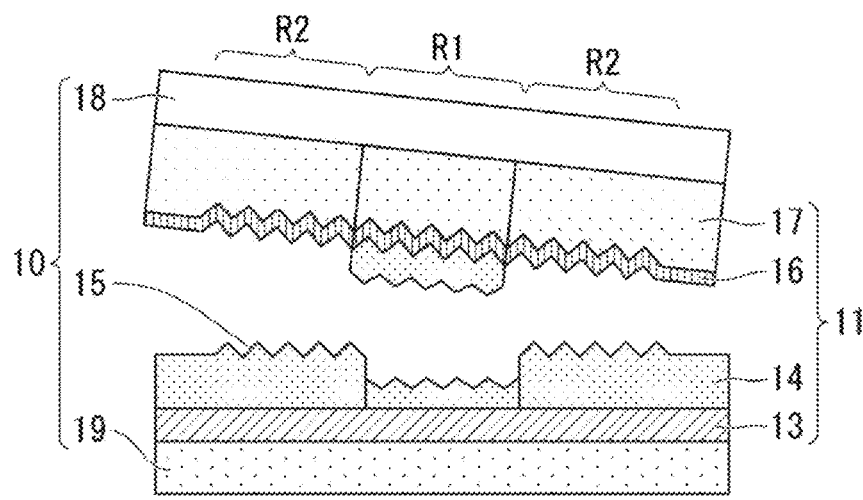
FIG. 7B is a schematic cross-sectional view illustrating another example of the state in which the laminate is separated.

Effects of the laminate 10 will be described below with reference to FIGS. 7A and 7B. FIGS. 7A and 7B are a schematic cross-sectional view showing a state in which the transfer foil 11 is separated. When the laminate 10 is damaged to extract the transfer foil 11 by unauthorized means, the transfer foil 11 is separated due to the occurrence of delamination between layers having a low interfacial adhesion strength or cohesive failure in a layer having a low breaking strength in the laminate 10. In the following description, it is assumed that the interfacial adhesion strength between the patch substrate 13 and the information recording sheet 19 and the interfacial adhesion strength between the adhesive layer 17 and the protective sheet 18 are higher than the interfacial adhesion strength between the protective sheet 18 and the information recording sheet 19. FIG. 7 shows an example in which the adhesive layer 17 is in contact with the protective sheet 18 and the patch substrate 13 is in contact with the information recording sheet 19, but as shown in FIG. 2, the transfer foil 11 may have a configuration obtained by turning the configuration in FIG. 7 upside down.

When extraction of the transfer foil 11 from the laminate 10 is attempted, first, the protective sheet 18 and the information recording sheet 19 are separated. At this time, in the region including the transfer foil 11, separation occurs between layers having the lowest interfacial adhesion strength or in a layer having the lowest breaking strength in the transfer foil 11. As described above, in the first embodiment, the surface of the relief forming layer 14 in contact with the reflective layer 16 has different properties (the presence or absence of a functional group and/or a rough surface, the content of the functional group and/or the degree of the rough surface) in the island regions R1 and in the sea region R2. This causes the adhesion, i.e., the interfacial adhesion strength, between the relief forming layer 14 and the reflective layer 16 to be different between the island regions R1 and the sea region R2. As described above, in general, many resins have low surface wettability, and have low adhesion to other materials when not subjected to any treatment. Thus, the interface between the relief forming layer 14 and the reflective layer 16 in the sea region R2 has the lowest interfacial adhesion strength in the transfer foil 11, and separation is more likely to occur at this interface. On the other hand, as described above, in the island regions R1, the wettability and the anchor effect are improved by corona treatment, plasma treatment, or the like, and the adhesion between the relief forming layer 14 and the reflective layer 16 is high. Thus, in the island regions R1, cohesive failure in the adhesive layer 17 as shown in FIG. 7A or cohesive failure in the relief forming layer 14 as shown in FIG. 7B can occur. Different layers are separated depending on the relationship in magnitude of the interfacial adhesion strength and the breaking strength of the layers, and delamination between the relief forming layer 14 and the patch substrate 13 or cohesive failure in the patch substrate 13 can occur.

As shown in FIGS. 7A and 7B, a part of the separated transfer foil 11 remains on the protective sheet 18 side, and the other part of the separated transfer foil 11 remains on the information recording sheet 19 side. For unauthorized reuse of the transfer foil 11, the transfer foil 11 together with the protective sheet 18 may be extracted and embedded in a counterfeit card. Thus, a separated transfer foil 11 that includes the relief structure 15 maintaining the shape thereof and remains on the protective sheet 18 side is least preferable, and it is preferable that at least part of the shape of the relief structure 15 be damaged as shown in FIG. 7A.

As shown in FIG. 7B, in the transfer foil 11 remaining on the protective sheet 18 side, the shape of the reflective layer 16 equivalent to the shape of the relief structure 15 is maintained throughout the island regions R1 and the sea region R2. Thus, it is theoretically possible to reproduce the optical effect of the relief structure 15 by applying a resin to the surface. However, as described above, the island regions R1 are regions having sides or a diameter of 20 μm to 300 μm, and are provided together with the sea region R2 in a large area of the transfer foil 11 as shown in FIG. 3. Therefore, a large number of uneven surfaces are formed in which separation or fracture of the island region R1 and the sea region R2 occurs, as shown in FIG. 7B.

When a resin is applied to the surface having fine concavities and convexities with a size of several tens to several hundreds of micrometers, the resin tends to fail to completely fill fine portions at the bottom, or tends to contain air bubbles. As a result, a portion that is not filled with the resin causes, for example, a phenomenon in which the optical effect is not reproduced or light incident on the transfer foil 11 is scattered. Even when the transfer foil 11 is reused, the optical effect of the transfer foil 11 as a whole is significantly reduced, and thus the reused transfer foil is easily determined to be a counterfeit.

The minute island regions R1 and the sea region R2 provided in the transfer foil 11 allow variation in the interfacial adhesion strength between specific layers (between the relief forming layer 14 and the reflective layer 16 in the first embodiment). Therefore, when separation of the transfer foil 11 is attempted, the force applied to specific layers (the relief forming layer 14 and the reflective layer 16 in the example of the first embodiment) is different between the island regions R1 and the sea region R2, and the island regions R1 and the sea region R2 adjacent to each other are affected by each other; thus, the force causing separation or breakage is not uniform in the island regions R1 and the sea region R2. As a result, in the sea region R2 in FIGS. 7A and 7B, spots in which the relief forming layer 14 is locally included on the protective sheet 18 side and spots in which the reflective layer 16 is locally included on the information recording sheet 19 side are alternately occur. Thus, the separated surfaces of the transfer foil 11 are roughened, and the transfer foil 11 does not have the same optical effect as before separation.

Second Embodiment

An embodiment of the present invention will be described below as the second embodiment with reference to FIGS. 8 to 10.

Figure 8:
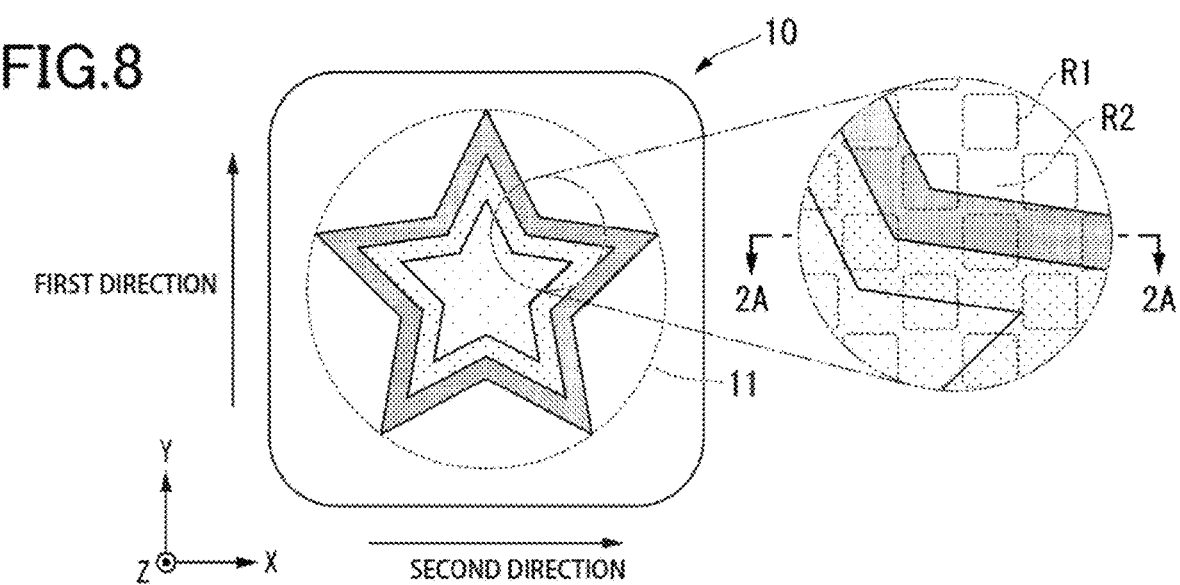
FIG. 8 is a schematic plan view illustrating a configuration of a transfer foil of the present invention.

FIG. 8 is a schematic plan view illustrating the laminate 10 according to the second embodiment. The laminate 10 of the second embodiment has the same configuration as in the first embodiment. The laminate 10 of the second embodiment is the same as that of the first embodiment in the layer configuration and in that the interfacial adhesion strength is different between the island regions R1 and the sea region R2. However, in the laminate 10 of the second embodiment, the difference in the interfacial adhesion strength occurs between layers different from the layers between which the difference in the interfacial adhesion strength occurs in the laminate 10 of the first embodiment. In the first embodiment, the interfacial adhesion strength between the relief forming layer 14 and the reflective layer 16 is different between the island regions R1 and the sea region R2, but in the second embodiment, the interfacial adhesion strength between the reflective layer 16 and the adhesive layer 17 is different between the island regions R1 and the sea region R2.

Known mechanisms of adhesion between an adhesive and an adherend (a material to be adhered) include three types of mechanisms, i.e., mechanical adhesion, chemical adhesion, and physical adhesion. Features of each of the three types of adhesion mechanisms will be described below.

Mechanical adhesion is adhesion that occurs when an adhesive is applied to an adherend having a large number of small holes on the surface, and the adhesive enters the holes and is solidified to be unremovable and bonded to the adherend. Mechanical adhesion is referred to as an anchoring effect, an anchor effect, or a fastener effect. The porous material may be paper, wood, or fibers, or may be a metal having a surface subjected to etching or chemical conversion treatment.

Chemical adhesion is adhesion that occurs due to a chemical bond between a functional group on an adherend surface and a functional group of an adhesive. A chemical bond is known as a primary bond, and corresponds to a covalent bond in which the highest bonding strength is expected, or an ionic bond.

Physical adhesion is adhesion that occurs due to an intermolecular force generated by electrical attraction between molecules having a polarity. A physical bond is also referred to as a secondary bond, and a higher polarity leads to a higher bonding strength. Examples of an intermolecular force include a hydrogen bond and the van der Waals force. A hydrogen bond is a force of attraction between an atom having high electronegativity and a hydrogen atom having a high polarity, and is generally larger than the van der Waals force. The van der Waals force includes three types of forces, i.e., an orientation force (a force generated by deviation in charge between polar molecules), an induction force (a force generated by induction of a dipole in a non-polar molecule by a polar molecule), and a dispersion force (a force generated by instantaneous deviation in charge between all molecules). These forces are obtained when the molecules on an adherend surface are very close to the molecules of an adhesive, and it is said that the molecules are required to be placed at a distance of 3 to 5 Å or less in order to obtain a strong intermolecular force. In general, adhesives have high viscosity, and when an adhesive is merely applied to the surface of an adherend material, the adhesive cannot enter the inside of fine concavities and convexities on the surface. Thus, for example, pressure is applied or the temperature is increased during application of the adhesive, or an adhesive diluted with a solvent is applied as a primer to reduce the depth of the convexities and concavities. Other than this, an intermolecular force can be obtained by increasing the affinity, i.e., wettability, of the adhesive and the adherend material.

It is known that not only one of the above three types of adhesion mechanisms but a combination of these adhesion mechanisms is applied in actual adhesion. Of these, in particular, physical adhesion has a significant influence.

The physical adhesion strength in the island regions R1 and the sea region R2 according to the second embodiment will be described below.

(Island Region and Sea Region)

Figure 9:
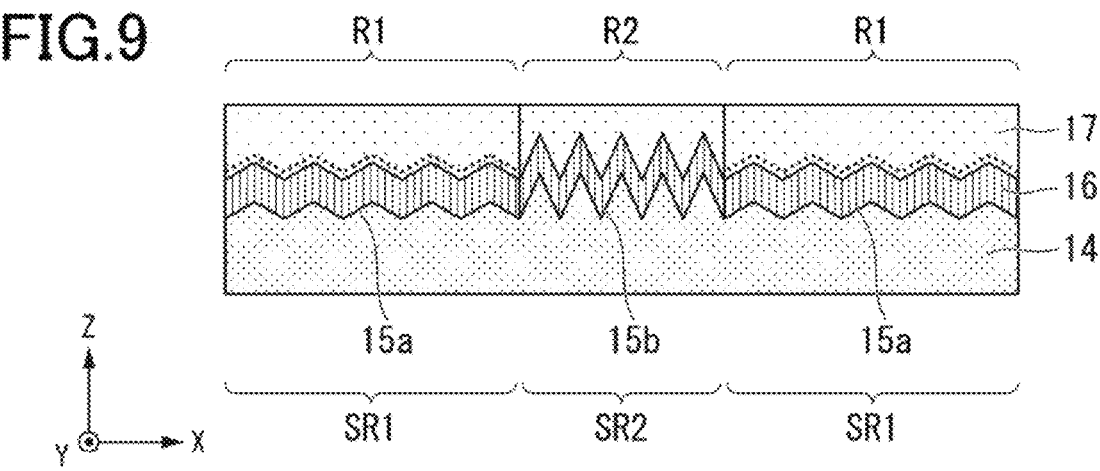
FIG. 9 is a cross-sectional view illustrating a configuration of the laminate taken along line 2A-2A of FIG. 8.

FIG. 9 is a partial cross-sectional view taken along line 2A-2A of FIG. 8, and shows the reflective layer 16 and the adhesive layer 17 corresponding to the island regions R1 and the sea region R2. The wettability of the reflective layer 16 and the adhesive layer 17 are different between the island regions R1 and the sea region R2. FIG. 9 schematically shows the difference in the wettability by the presence or absence of a broken line provided at the interface between the reflective layer 16 and the adhesive layer 17. As described above, the wettability contributes to an intermolecular force, and thus the difference in the wettability causes a difference in adhesion strength. In the second embodiment, the wettability of the reflective layer 16 and the adhesive layer 17 in the island regions R1 is higher than in the sea region R2. Factors that determine the wettability of a solid and a liquid will be described below.

Figure 10A:
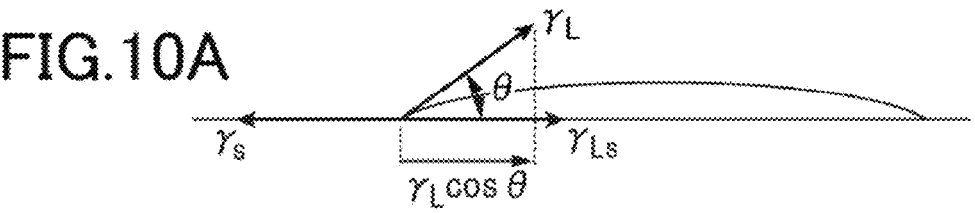
FIG. 10A is a schematic diagram illustrating a contact angle.
Figure 10B:
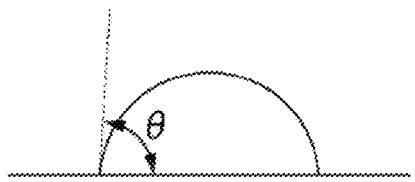
FIG. 10B is a schematic diagram illustrating a contact angle.
Figure 10C:
FIG. 10C is a schematic diagram illustrating a contact angle.

FIGS. 10A to 10C are a schematic cross-sectional view illustrating a shape of a liquid dropped on a solid surface. As shown in FIG. 10A, when a solid surface is in contact with a liquid and a gas, a surface tension γS of the solid (referred to as "surface free energy") and a surface tension γL of the liquid, and an interfacial tension γLS between the solid and the liquid are generated at a boundary at which the three phases are in contact with each other. The wettability is determined by a balance between these tensions, and the relationship is known as the Young-Laplace equation shown below.

$$\gamma_S = \gamma_L \cos\theta + \gamma_{LS} \quad [\text{Math. 1}]$$

θ represents a contact angle, which is an angle formed by the surface of a solid and the surface of a liquid dropped on the solid surface. In general, a lower surface tension γL and a higher surface free energy γS are said to lead to higher wettability. However, as shown in the above formula, it is affected by not only the wettability of each of the liquid and the solid but also the affinity between the liquid and the solid, i.e., the interfacial tension γLS between the liquid and the solid.

Surface tension and surface free energy are composed of the sum of the components of an intermolecular force, i.e., a dispersion component, a polar component, an induction component, and a hydrogen bonding component, which are components of four forces, i.e., a dispersion force, an orientation force, an induction force, and a hydrogen bonding force. Of these, the influence of the induction component is very small and can be ignored, and the hydrogen bonding component is often combined with the polar component. As the ratio of the dispersion component and the polar component of a solid is closer to the ratio of the dispersion component and the polar component of a liquid, the interfacial tension γLS between the solid and the liquid becomes lower (the affinity becomes higher).

The wettability of a solid and a liquid can be quantitatively determined by a contact angle θ shown in FIGS. 10A to 10C. FIGS. 10A to 10C show three examples having different contact angles θ. In the range of 0 to 180°, as the contact angle θ is closer to 0°, the wettability becomes higher, and as the contact angle θ is closer to 180°, the wettability becomes lower. That is, in the example shown in FIG. 10A, the wettability is the highest, and a droplet spreads on a solid. On the other hand, in the example shown in FIG. 10C, the wettability is the lowest, and a droplet does not spread on the solid and maintains its original shape. In the example shown in FIG. 10B, a droplet spreads on the solid to an extent intermediate between the example in FIG. 10A and the example in FIG. 10C. When the surface of a solid is easily wetted by water, the solid has hydrophilicity. On the other hand, when the surface of a solid is repellent to water, the solid has water repellency.

A material having a contact angle θ less than 90° can be defined as a material having hydrophilicity, and a material having a contact angle θ equal to or greater than 90° can be defined as a material having water repellency. Furthermore, a material having a contact angle θ less than 10° can be defined as a material having superhydrophilicity, and a material having a contact angle θ equal to or greater than 150° can be defined as a material having super water repellency. For example, glass and metal oxide materials have a contact angle θ less than 90°, carbon and silica materials have a contact angle θ equal to 90°, and Teflon (registered trademark) and fluorine materials have a contact angle θ greater than 90°.

Math. 1 can be modified to Math. 2.

$$\cos\theta = \frac{\gamma_s - \gamma_{LS}}{\gamma_L} \quad [\text{Math. 2}]$$

Math. 2 suggests that the wettability is increased, i.e., the contact angle θ becomes closer to 0°, by reducing the surface tension γL of a liquid or by increasing the surface free energy γS of a solid. The surface tension of a liquid can be reduced by adding a surfactant to the liquid. The surface free energy γS of a solid can be increased by chemically or physically modifying the solid surface to increase the wettability. In the second embodiment, surface modification of a local portion of the reflective layer 16 will be described as an example.

Physical modification of a solid surface specifically refers to roughening of the surface, and is treatment required, together with chemical hydrophilization, for the solid surface to have superhydrophilicity or super water repellency. The Wenzel model and the Cassie-Baxter model are known as models representing a relationship between fine concavities and convexities on a surface and wettability. The former assumes that a droplet enters the concavities on the solid surface to wet the entire solid surface. This model considers that the concavities and convexities increase the surface area of the interface between the solid and the droplet to r times, and is expressed by Math. 3 below. Ow represents an apparent contact angle on the surface with convexities and concavities.

$$\cos\theta_w = r\cos\theta = \frac{r(\gamma_s - \gamma_{LS})}{\gamma_L} \quad [\text{Math. 3}]$$

In Math. 3, r is less than 1; thus, by roughening, a surface having hydrophilicity becomes more hydrophilic, and a surface having water repellency becomes more water repellent.

On the other hand, the Cassie-Baxter model assumes that not a droplet but air enters the concavities on the solid surface. Although not specifically described here, the Cassie-Baxter model is based on the theory that the concavities and convexities on the solid surface reduce the actual contact area of the droplet with the solid surface and this leads to a larger contact angle of the solid surface with the droplet than that of the solid surface having no concavities and convexities. This model considers that the concavities and convexities are effective to cause the solid surface to have water repellency.

One of the above models is applied depending on the size of a droplet, concavities and convexities on the solid surface, and the wettability of a material. It has been reported that the Wenzel model is dominant when the size or weight of a droplet is increased to increase the pressure entering concavities.

The contact angle, which is an indicator for evaluating the hydrophilicity and the water repellency described above, can be measured by static contact angle measurement and dynamic contact angle measurement. The static contact angle measurement is a method of determining only a contact angle. Examples of the static contact angle measurement include a droplet method, which is commonly used, and a V-r method and a microdroplet method using a micro contact angle meter, which are used to measure a sample surface having a large area. The dynamic contact angle measurement is a method of determining the movement speed of a droplet, the adhesion of a droplet, and the like. Examples of the dynamic contact angle measurement include a sliding method, an expansion/contraction method, and the Wilhelmy method. Since advanced image analysis techniques using software are available at present, the Young-Laplace method and an ellipse method, which allow more accurate measurement, are commonly used.

A method of causing the surface of the reflective layer 16 to have higher wettability in the island regions R1 than in the sea region R2 will be described below. As described above, the wettability of a solid surface can be changed by chemical or physical modification. The following description will discuss, as an example, the case where the reflective layer 16 composed of silicon oxide is subjected to chemical modification. Silicon oxide silanol groups, covering the surface with hydroxyl groups (≡Si—OH), and has hydrophilicity. Due to the hydroxyl group on the silicon oxide, a hydrogen bond, which is the strongest intermolecular force, is formed between a hydroxyl group (—OH), water (H—O—H), oxygen (O), nitrogen (N), a carboxyl group (—COOH), a carbonyl group (C=O), and the like of the adhesive, allowing strong bonding. By substituting the hydroxyl group on the hydrophilic silica surface with methylsilane or the like, the surface can become hydrophobic. Examples of a surface treatment agent for causing the surface to be hydrophobic include polydimethylsiloxane, methylchlorosilane, and hexamethyldisilazane. When the surface of the reflective layer 16 in the sea region R2 is subjected to selective hydrophobic treatment while the hydrophilicity of the reflective layer 16 in the island regions R1 is maintained, the wettability (contact angle) can be different between the island regions R1 and the sea region R2.

The reflective layer 16 may be composed of titanium dioxide ($TiO_2$). Titanium dioxide is easily wetted by oil (oleophilic) and is not easily wetted by water (hydrophobic). However, titanium dioxide is known to become hydrophilic by irradiation with ultraviolet light in the presence of oxygen, and is used as a photocatalyst in various fields. The mechanism for this is considered to be that a positive hole generated by ultraviolet irradiation of the titanium dioxide surface breaks the chemical bond (Ti—O—Ti) between the titanium atom and the oxygen atom, and the oxygen atom reacts with water to form a hydroxyl group. The titanium dioxide surface becomes superhydrophilic immediately after light irradiation. However, when ultraviolet irradiation is stopped and the titanium dioxide surface is allowed to stand in a dark place, the titanium dioxide surface gradually returns to the original surface state and loses the hydrophilicity. In the case where the reflective layer 16 is composed of titanium dioxide, when the reflective layer 16 is formed, and then only the island regions R1 are irradiated with ultraviolet light while the sea region R2 is physically covered, the island regions R1 can become hydrophilic and the sea region R2 can become hydrophobic. In this case, the adhesive layer 17 is required to be applied to the reflective layer 16 before the reflective layer 16 loses the hydrophilicity as described above.

When the reflective layer 16 is composed of aluminum, the metal surface is covered with an oxide layer, and thus water or other contaminants are adsorbed on the oxide layer. The reflective layer 16 in this state does not have sufficient adhesion; thus, the reflective layer 16 is preferably subjected to surface treatment. The surface treatment may be performed by (1) removal of contaminants using an organic solvent or by ultraviolet irradiation, (2) formation of an oxide film suitable for adhesion by treatment using an acid, an alkali, or the like, and (3) application of a silane coupling agent. When the reflective layer 16 only in the island regions R1 described in the first embodiment is subjected to such surface treatment, the reflective layer 16 can have higher wettability in the island regions R1 than in the sea region R2.

(Relief Structure)

The relief structure 15 will be described below.

The relief structure is the same as that of the first embodiment described with reference to FIG. 6A to 6F, and thus description thereof will be omitted. However, the relief structure of the second embodiment differs from that of the first embodiment in that the first relief region SR1 is disposed to overlap with the island regions R1 and the second relief region SR2 is disposed to overlap with the sea region R2.

When the laminate 10 is damaged to extract the transfer foil 11 by unauthorized means, the transfer foil 11 is separated due to the occurrence of delamination between layers having a low interfacial adhesion strength or cohesive failure in a layer having a low breaking strength in the laminate 10. In the following description, it is assumed that the interfacial adhesion strength between the patch substrate 13 and the information recording sheet 19 and the interfacial adhesion strength between the adhesive layer 17 and the protective sheet 18 are higher than the interfacial adhesion strength between the protective sheet 18 and the information recording sheet 19.

The relief structure 15 of the second embodiment also has the effect obtained by the fine concavities and convexities contributing to the wettability and further to the adhesion strength described above. However, when the chemical bonding state between layers in contact with each other is the same, a force against the force applied to separate the layers is expected to be different between a structure that is parallel to the direction in which the force is applied to separate the layers and a structure that is not parallel to the direction in which the force is applied to separate the layers. This means that the anchor effect of the relief structure 15 is varied.

In the second embodiment, the first relief structure 15a having a shape in which lines are arranged in a single direction is disposed in the island regions R1 in which the wettability and the interfacial adhesion strength of the reflective layer 16 and the adhesive layer 17 are higher than in the sea region R2. Thus, particularly when separation of the transfer foil 11 from the laminate 10 in the first direction is attempted, in the island regions R1, the transfer foil 11 is more likely to be separated at the interface between the relief forming layer 14 and the reflective layer 16 at which the adhesion strength, i.e., the anchor effect, of the first relief structure 15a is low. On the other hand, in the sea region R2, due to the anchor effect of the second relief structure 15b, the interfacial adhesion strength between the relief forming layer 14 and the reflective layer 16 is higher than in the island regions R having the first relief structure 15a; thus, the transfer foil 11 is more likely to be separated between the reflective layer 16 and the adhesive layer 17 at which the interfacial adhesion strength is low.

When the transfer foil 11 is separated, in the configuration in which the adhesive layer 17 is in contact with the protective sheet 18 (see FIG. 2A), the relief forming layer 14 remains on the information recording sheet 19 side, and in the configuration in which the adhesive layer 17 is in contact with the information recording sheet 19 (see FIG. 2B), the relief forming layer 14 remains on the protective sheet 18 side. In the former case, for unauthorized reuse of the separated transfer foil 11, the relief forming layer 14 is required to be separated from the information recording sheet 19. However, the total thickness of the relief forming layer 14 together with the patch substrate 13 is several micrometers, which is significantly smaller than the thickness of the information recording sheet 19 (thickness: 50 μm to 800 μm). This makes it difficult to separate the relief forming layer 14 from the information recording sheet 19 without damaging the relief structure 15, thus making reuse of the transfer foil 11 difficult. On the other hand, in the latter case, the relief structure 15 remains on the protective sheet 18 side, and this may allow unauthorized reuse of the transfer foil 11 depending on the surface state of the relief structure 15. Specifically, when the transfer foil 11 is neatly separated at the interface between the relief forming layer 14 and the reflective layer 16 in the island regions R1 and at the interface between the reflective layer 16 and the adhesive layer 17 in the sea region R2, even though the reflective layer 16 is not included in the island regions R1 and is included in the sea region R2 on the separated surface, the shape of the relief structure 15 is maintained on the surface, and this may allow use of the transfer foil 11 for another purpose.

As described in the first embodiment, the island regions R1 are minute regions having sides or a diameter of 20 μm to 300 μm, and are scattered in the sea region R2 in a large area of the transfer foil 11 as shown in FIG. 8. When separation of the transfer foil 11 is attempted, the force applied to specific layers (the reflective layer 16 and the adhesive layer 17 in the description of the second embodiment) is different between the island regions R1 and the sea region R2, and the island regions R1 and the sea region R2 adjacent to each other are affected by each other to some extent; thus, the force causing separation or breakage is not uniform in the island regions R1 and the sea region R2. As a result, in practice, the reflective layer 16 is locally included on the protective sheet 18 side and the adhesive layer 17 is locally included on the information recording sheet 19 side. Thus, the separated surfaces of the transfer foil 11 are roughened, and the transfer foil 11 does not have the same optical effect as before separation.

Even if the relief structure 15 is neatly maintained on the separated surface, the reflective layer 16 is not included in the island regions R1 and is included in the sea region R2 on the separated surface. Thus, when the separated transfer foil 11 together with the protective sheet 18 is used as it is to create a counterfeit card, the counterfeit card does not exhibit the optical effect of the island regions R1 in which the reflective layer 16 is lost. Therefore, the card is easily determined to be a counterfeit from the appearance. Even when a new reflective layer is formed on the relief structure 15 side of the separated transfer foil 11 to reproduce the optical effect of the island regions R1, the thickness of the layers as the reflective layer is different between the island regions R1 in which the reflective layer 16 is lost and the sea region R2 in which the reflective layer 16 remains. This causes, for example, an uneven optical effect or lower brightness, and makes it difficult to completely reproduce the original state. In particular, when the reflective layer 16 is composed of a light transmissive material, if the material of the original reflective layer 16 and the material of the new reflective layer do not have the same refractive index, practically two layers occur as the reflective layer in the sea region R2, and due to the occurrence of multilayer film interference, the sea region R2 exhibits an optical effect different from that of the island regions R1. This causes a change such as display of a color different from the color displayed by the reflective layer as a single layer, or lower brightness.

In the second embodiment, the interfacial adhesion strength between the reflective layer 16 and the adhesive layer 17 is different between the island regions R1 and the sea region R2. Thus, even when the transfer foil 11 is extracted from the laminate 10 and unauthorized reuse of the transfer foil 11 is attempted, the original optical effect cannot be reproduced. Therefore, the transfer foil 11 serves as a deterrent to such an act, or even when the transfer foil 11 is reused, the reused transfer foil is easily determined to be a counterfeit.

Third Embodiment (Laminate)

An embodiment of the present invention will be described below as the third embodiment with reference to FIGS. 11 to 13.

Figure 11:
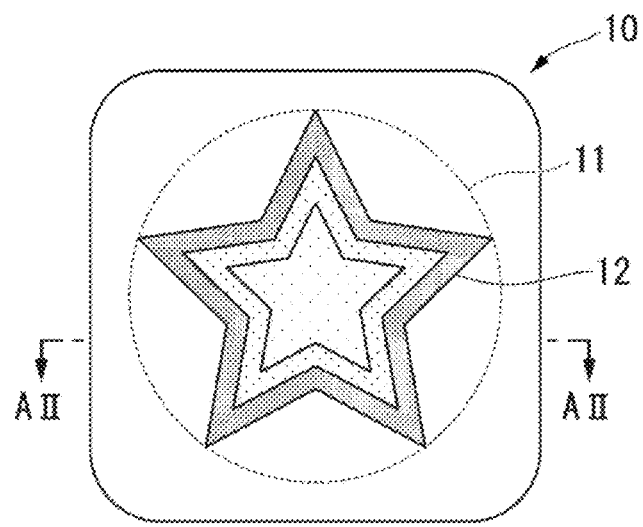
FIG. 11 is a schematic plan view illustrating a laminate of the present invention.
Figure 12A:
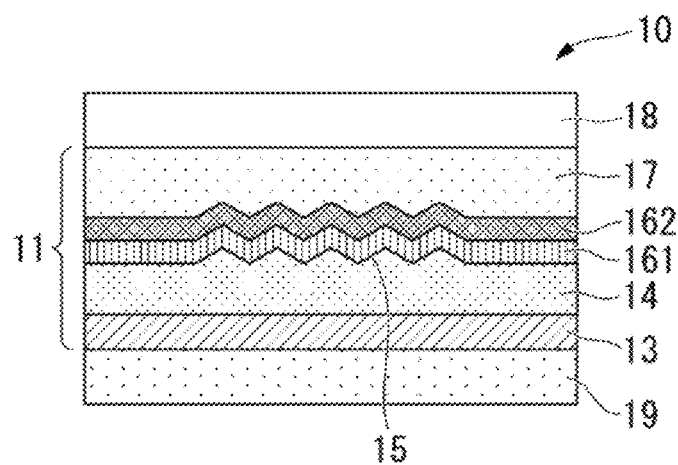
FIG. 12A is a cross-sectional view illustrating one example of a configuration of the laminate taken along the line AII-AII of FIG. 11.
Figure 12B:
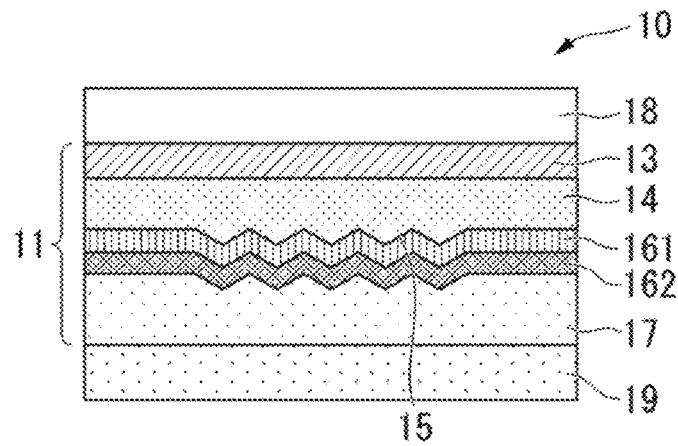
FIG. 12B is a cross-sectional view illustrating another example of the configuration of the laminate.

FIG. 11 is a schematic plan view illustrating the laminate 10 of the third embodiment. As in the first and second embodiments, the laminate 10 includes the transfer foil 11 that displays the image 12. FIG. 12 is a cross-sectional view taken along line AII-AII of FIG. 11. In the laminate 10, the patch substrate 13, the relief forming layer 14, a first reflective layer 161, a second reflective layer 162, and the adhesive layer 17 are sequentially laminated. The relief structure 15 is provided on the surface of the relief forming layer 14. The first reflective layer 161 has a concavo-convex shape conforming to the relief structure 15, and the second reflective layer 162 has a concavo-convex shape conforming to the first reflective layer 161. The transfer foil 11 includes at least the above layers in the order described above, and may include other layers between these layers. The transfer foil 11 is laminated and enclosed by a protective sheet 18 and an information recording sheet 19 so as not to be exposed to the outside of the laminate 10. FIGS. 12A and 12B show layer configurations of the transfer foil 11 enclosed in the laminate 10, and FIG. 12B shows the layer configuration of the transfer foil 11 obtained by reversing the layer configuration of the transfer foil 11 shown in FIG. 12A. The transfer foil 11 may have either the configuration shown in FIG. 12A or the configuration shown in FIG. 12B. In the case of the configuration shown in FIG. 12A, the transfer foil 11 is transferred to the protective sheet 18 via the adhesive layer 17, and then laminated. On the other hand, in the case of the configuration shown in FIG. 12B, the transfer foil 11 is transferred to the information recording sheet 19 via the adhesive layer 17, and then laminated.

(Island Region and Sea Region)

A first region S1, a second region S2, and the relief structure 15 that constitute the laminate 10 will be described below. FIG. 13 is a plan view showing a configuration of the transfer foil 11. The transfer foil 11 has the first region S1 and the second region S2. FIG. 13 shows an example in which the first region S1 and the second region S2 extend over the entire surface of the transfer foil, but the first region S1 and the second region S2 may be provided on a part of the transfer foil 11.

Figure 13:
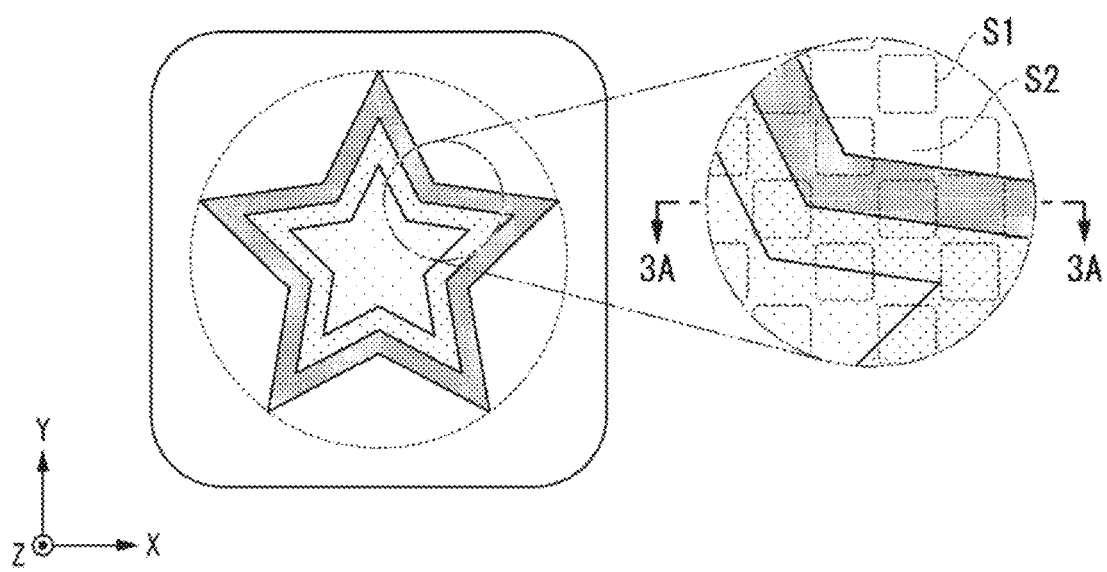
FIG. 13 is a schematic plan view illustrating a configuration of a transfer foil of the present invention.
Figure 14:
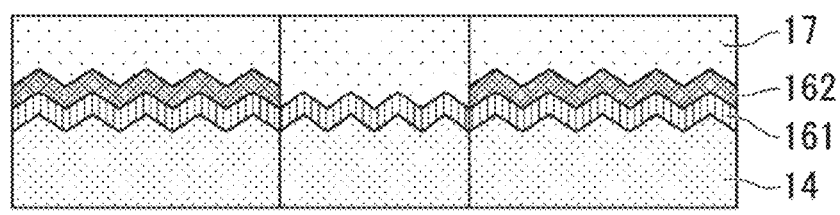
FIG. 14 is a cross-sectional view illustrating one example of a configuration of the laminate taken along line 3A-3A of FIG. 13.

FIG. 14 is a partial cross-sectional view taken along line 3A-3A of FIG. 13, and shows a state of the relief forming layer 14, the first reflective layer 161, the second reflective layer 162, and the adhesive layer 17 corresponding to the first region S1 and the second region S2. In the first region S1, two layers, i.e., the first reflective layer 161 and the second reflective layer 162, are laminated, and the second region S2 includes only the first reflective layer 161. In addition, at least one of the first reflective layer 161 and the second reflective layer 162 is composed of a light transmissive material having a higher refractive index than the relief forming layer 14 and the adhesive layer 17 for light with a typical wavelength in the visible light range of, for example, 532 nm. This achieves a higher reflection effect than in the case where both of the first reflective layer 161 and the second reflective layer 162 have a lower refractive index than the relief forming layer 14 and the adhesive layer 17, thus allowing an observer to easily visually recognize the image 12 displayed as the optical effect in both the first region S1 and the second region S2.

In FIG. 14, when T1 represents the interfacial adhesion strength between the first reflective layer 161 and the adhesive layer 17, and T2 represents the interfacial adhesion strength between the second reflective layer 162 and the adhesive layer 17, T1 is different to T2. More specifically, when T1 is higher than T2, the second region S2 corresponds to the island regions R1, and the first region S1 corresponds to the sea region R2. On the other hand, when T1 is lower than T2, the first region S1 corresponds to the island regions R1, and the second region S2 corresponds to the sea region R2. FIGS. 13 and 14 show an example in which Ti is lower than T2, and the first region S1 corresponds to the island regions R1 and the second region S2 corresponds to the sea region R2. However, as described above, the correspondence relationship of the first region S1 and the second region S2 with the island regions R1 and the sea region R2 may be varied depending on the relationship between the interfacial adhesion strengths T1 and T2.

Figure 15:
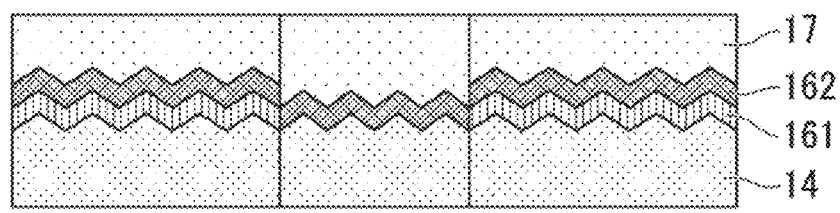
FIG. 15 is a cross-sectional view illustrating another example of the configuration of the laminate.

The configuration of the transfer foil 11 is not limited to the configuration shown in FIG. 14, and may be a configuration shown in FIG. 15. In the example shown in FIG. 15, in the first region S1, the first reflective layer 161 and the second reflective layer 162 are laminated, and the second region S2 includes only the second reflective layer 162 unlike the example shown in FIG. 14. In this case, in both the first region S1 and the second region S2, the second reflective layer 162 is in contact with the adhesive layer 17, but the layer in contact with the relief forming layer 14 is different. More specifically, in the first region S1, the first reflective layer 161 is in contact with the relief forming layer 14, and in the second region S2, the second reflective layer 162 is in contact with the relief forming layer 14. The first reflective layer 161 may not necessarily be composed of a light transmissive material, and may be composed of a metal material. Examples of the metal material include aluminum and silver.

In FIG. 15, T1 differs from T2, where T1 represents the interfacial adhesion strength between the first reflective layer 161 and the relief forming layer 14, and T2 represents the interfacial adhesion strength between the second reflective layer 162 and the relief forming layer 14. When T1 is higher than T2, the second region S2 corresponds to the island regions R1, and the first region S1 corresponds to the sea region R2. On the other hand, when Ti is lower than T2, the first region S1 corresponds to the island regions R1, and the second region S2 corresponds to the sea region R2.

In the configurations shown in FIGS. 14 and 15, the difference in the interfacial adhesion strength occurs at different interfaces in the first region S1 and in the second region S2. However, the difference in the interfacial adhesion strength of the reflective layers 161 and 162 with the adhesive layer 17 between the island regions R1 and the sea region R2 and the difference in the interfacial adhesion strength of the reflective layers 161 and 162 with the relief forming layer 14 between the island regions R1 and the sea region R2 both result from the material of the first reflective layer 161 and the second reflective layer 162. This point will be described below.

(Reflective Layer)

The following three methods are examples of the method of causing a difference in the interfacial adhesion strength between the island regions R1 and the sea region R2, i.e., the properties of the first reflective layer 161 and the second reflective layer 162, as described above. The method is not limited to these three examples, and the mechanism of the method is not particularly limited as long as the reflective layers 161 and 162 achieve a difference in the interfacial adhesion strength. The interfacial adhesion strength of the reflective layers 161 and 162 with the adhesive layer 17 in the configuration shown in FIG. 14 will be described below as an example. In the case of the configuration shown in FIG. 15, the "adhesive layer 17" in the configuration shown in FIG. 14 only needs to be replaced with the "relief forming layer 14".

As an example, a configuration in which the first region S1 corresponds to the sea region R2 and the second region S2 corresponds to the island regions R1 will be described. In the first region S1, the second reflective layer 162 (the first reflective layer 161 in the configuration shown in FIG. 15) is composed of an inorganic compound having water repellency or oil repellency. A water repellent material may be selected when the surface of the adhesive layer 17 in contact with the second reflective layer 162 is hydrophilic, and an oil repellent material may be selected when the surface of the adhesive layer 17 in contact with the second reflective layer 162 is oleophilic. Alternatively, a material having both water and oil repellency may be selected. Furthermore, when the adhesive layer 17 has both hydrophilicity and oleophilicity, a water repellent material or an oil repellent material may be selected, but it is preferable to select a water repellent material or an oil repellent material that causes the interfacial adhesion strength between the second reflective layer 162 and the adhesive layer 17 to be lower. A material having water repellency and/or oil repellency may be a fluorine compound. Examples of the fluorine compound include magnesium fluoride (MgF2). When a material having water repellency and/or oil repellency is used to form the second reflective layer 162, in the first region S1 (the sea region R2), the adhesion, i.e., the interfacial adhesion strength, between the second reflective layer 162 and the adhesive layer 17 is low. On the other hand, in the second region S2 (the island regions R1) including a material having a high affinity with the adhesive layer 17, the interfacial adhesion strength between the first reflective layer 161 and the adhesive layer 17 is higher than in the first region S1. When the first reflective layer 161 and the second reflective layer 162 are formed on the relief forming layer 14 as shown in FIG. 14, the adhesion of the second reflective layer 162 to the first reflective layer 161 may be insufficient, failing to form layers. However, this concern can be eliminated, for example, by forming the first reflective layer 161 and the second reflective layer 162 through continuous vapor deposition under a vacuum environment.

Another example in which the first region S1 corresponds to the island regions R1 and the second region S2 corresponds to the sea region R2 will be described. In this example, the surface of the second reflective layer 162 in contact with the adhesive layer 17 is subjected to surface modification. This can increase the interfacial adhesion strength between the second reflective layer 162 and the adhesive layer 17. Surface modification may be, for example, 1) improvement in the hydrophilicity, removal of an organic material from the object surface, and removal of an oxide film by corona treatment or plasma treatment, 2) addition of a functional group that allows bonding to the adhesive layer 17, 3) roughening to improve the anchor effect, as described in the first and second embodiments. On the other hand, the first reflective layer 161 may be composed of an inorganic compound that causes the interfacial adhesion strength between the first reflective layer 161 and the adhesive layer 17 to be at least lower than the interfacial adhesion strength between the second reflective layer 162 after surface modification and the adhesive layer 17. The factor that causes the low interfacial adhesion strength may be the properties of the material, for example, the wettability with the adhesive layer 17 or a difference in intermolecular force from the adhesive layer 17, or may be an oxide film naturally formed on the surface.

An example in which the first region S1 corresponds to the island regions R1 and the second region S2 corresponds to the sea region R2 will be described below for convenience of description. However, the first region S1 may correspond to the sea region R2 and the second region S2 may correspond to the island regions R1. In the example, the difference in the interfacial adhesion strength of the reflective layers 161 and 162 with the adhesive layer 17 is caused by a difference in the bonding strength of the reflective layers with the adhesive layer 17. Of the adhesion mechanisms described in the second embodiment, in particular, physical adhesion and chemical adhesion are focused on, and the first reflective layer 161 and the second reflective layer 162 are assumed to be different, for example, in the presence or absence or the magnitude of the wettability (or contact angle) with the adhesive layer 17, or the bonding strength (intermolecular force, ionic bonding strength, covalent bond, hydrogen bond) between the two layers. When the adhesive layer 17 is composed of an oleophilic material, by forming the first reflective layer 161 using an oil repellent material and forming the second reflective layer 162 using an oleophilic material, it is possible to cause the interfacial adhesion strength of the reflective layers 161 and 162 with the adhesive layer 17 to be different between the first region S1 and the second region S2. The above properties can be obtained by using a material that allows the first reflective layer 161 to be bonded to the adhesive layer 17 by an ionic bond and allows the second reflective layer 162 to be bonded to the adhesive layer 17 by an intermolecular force.

The method described above can cause the interfacial adhesion strength of the reflective layers 161 and 162 with the adhesive layer 17 to be different between the first region S1 and the second region S2. When unauthorized extraction of the transfer foil 11 from the laminate 10 having the above configuration is attempted, it is assumed that in the island regions R1 in which the interfacial adhesion strength of the reflective layers 161 and 162 with the adhesive layer 17 is high, the transfer foil 11 is separated between the patch substrate 13 and the relief forming layer 14, or cohesive failure occurs in these two layers or the adhesive layer 17. On the other hand, in the sea region R2 in which the interfacial adhesion strength is low, the transfer foil 11 is more likely to be separated between the reflective layer (161 or 162) and the adhesive layer 17. As a result, different layers are separated or damaged in the island regions R1 and in the sea region R2. This can prevent extraction of the transfer foil 11 in which the shape of the relief structure 15 is completely maintained on one of the two separated surfaces, thus preventing reuse of the transfer foil 11.

(Image)

Figure 16:
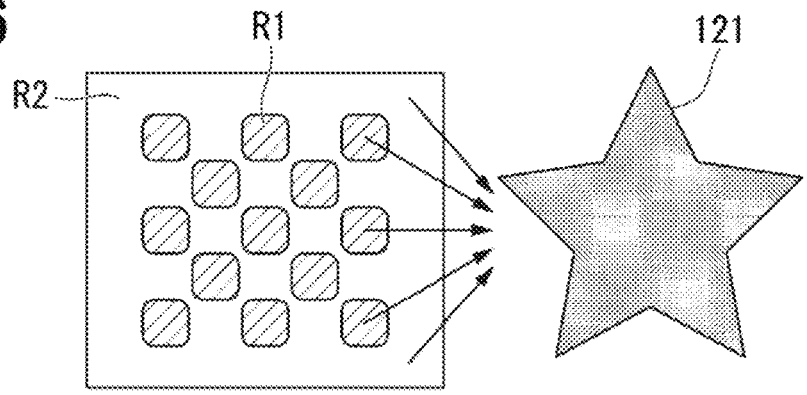
FIG. 16 is a plan view illustrating one example of image display by island regions and a sea region.

A configuration of the image 12 will be described below. The configuration of the image 12 can be applied to any of the first to third embodiments described above. In the transfer foil 11, the image 12 displayed as the optical effect of the relief structure 15 may be one type of motif, or two types of motifs observable at different angles. FIG. 16 shows a state in which when light from a light source is incident on the transfer foil 11, the light is reflected at a specific angle by the relief structure 15 provided in the island regions R1 and the sea region R2 to form a first motif 121. As long as the relief structure 15 forms the first motif 121 at a specific angle, the relief structure 15 may have a uniform design with the same period, height, shape, azimuth, and the like in the entire region including both the island regions R1 and the sea region R2, or may have a design locally different in one or more of the above elements in the first motif 121. In the latter case, the design of the relief structure 15 may be different between the island regions R1 and the sea region R2. In the case of the configuration as shown in FIG. 16, in the embodiments of the present invention, when unauthorized extraction of the transfer foil 11 from the laminate 10 is attempted, different layers are separated or damaged in the island regions R1 and in the sea region R2 as described in the first to third embodiment; thus, the relief structure 15 is not completely maintained in the separated transfer foil 11, and the optical effect (e.g., brightness, color development) of the first motif 121 is reduced, thus preventing the reused transfer foil from having the original visual effect.

Figure 17:
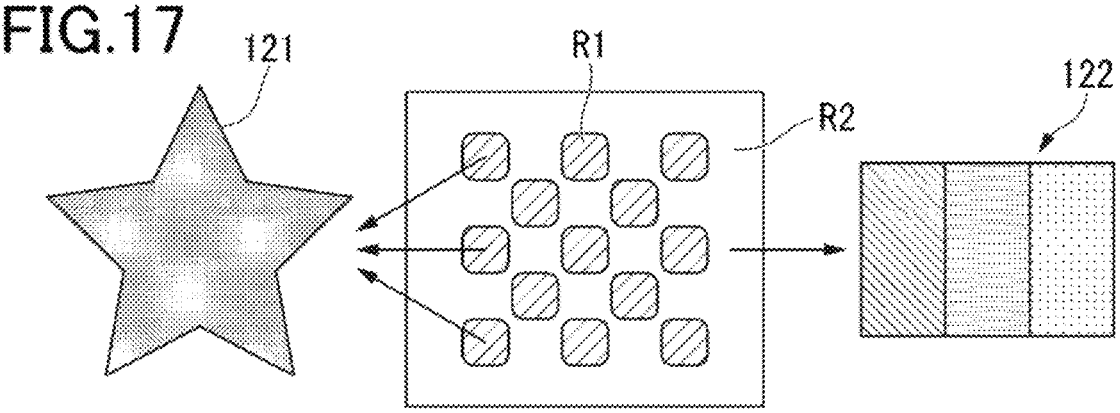
FIG. 17 is a plan view illustrating another example of image display by the island regions and the sea region.

FIG. 17 shows a state in which when light from a light source is incident on the transfer foil 11, the light is reflected at a specific angle α by the first relief structure 15a provided in the island regions R1 to form the first motif 121, and the light is reflected at a specific angle β different from the angle α by the second relief structure 15b provided in the sea region R2 to form a second motif 122. The first relief structure 15a and the second relief structure 15b may not necessarily be disposed in the island regions R1 and the sea region R2, respectively. However, the above configuration is preferable because the optical effect of one of the first motif 121 and the second motif 122 is significantly reduced when extraction of the transfer foil 11 from the laminate 10 is attempted; thus, even if the separated transfer foil 11 is reused, the reused transfer foil is easily determined to be a counterfeit product. The first relief structure 15a and the second relief structure 15b may be selected from the structures as described in FIG. 6, or may be any structures in which the angles α and β of the reflected light are not equal.

The first relief structure 15a and the second relief structure 15b may be a subwavelength grating and a directional scattering structure, respectively. In such a configuration, the first motif 121 may be a chromatic image, and the second motif 122 may be an achromatic image. The subwavelength grating exhibits a chromatic color when the reflective layer 16 has a higher refractive index than the relief forming layer 14 and the adhesive layer 17. The subwavelength grating can display a color in the specular reflection direction according to the period and azimuth of the grating, and the refractive index of the reflective layer 16. Examples of the directional scattering structure include the structure as shown in FIG. 6C. When the grating direction is uniform, an achromatic image having a specific tone value is displayed, and when the grating direction is locally changed according to the shade of the motif, a three-dimensional achromatic image shaded as in a picture is displayed.

The correspondence relationship of the island regions R1 and the sea region R2 with the first relief structure 15a and the second relief structure 15b may be different from the correspondence relationship described above. However, in the case where a subwavelength grating is used as the first relief structure 15a, it is preferable that when the transfer foil 11 is extracted from the laminate 10, the shape of the subwavelength grating be not maintained on the surface of the transfer foil 11 remaining on the protective sheet 18 side because in that case, development of the chromatic color due to the subwavelength grating is lost, improving the effect of preventing unauthorized reuse of the transfer foil 11.

Reduction in color development, i.e., reduction in saturation, is easily visually recognized, and thus the reused transfer foil is easily determined to be a counterfeit. Therefore, in the configuration shown in FIG. 16, the use of a subwavelength grating as the relief structure 15 can reduce color development in the first motif 121 when the transfer foil 11 is extracted, improving the effect of preventing unauthorized use of the transfer foil 11.

Figure 18:
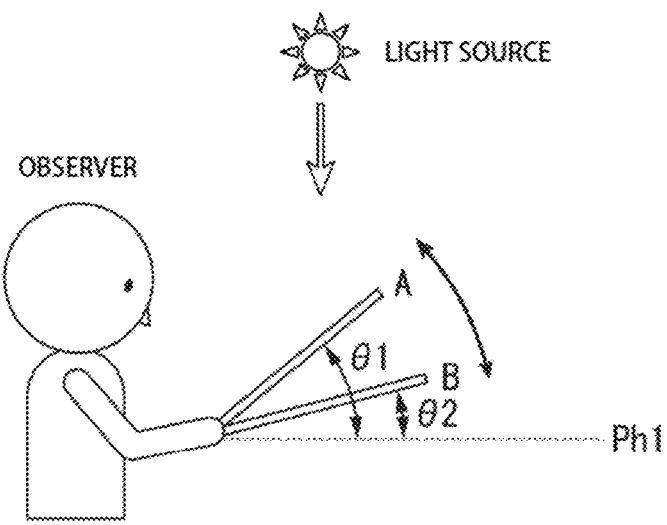
FIG. 18 is a schematic diagram illustrating an example of a method of observing the laminate of the present invention.
Figure 19:
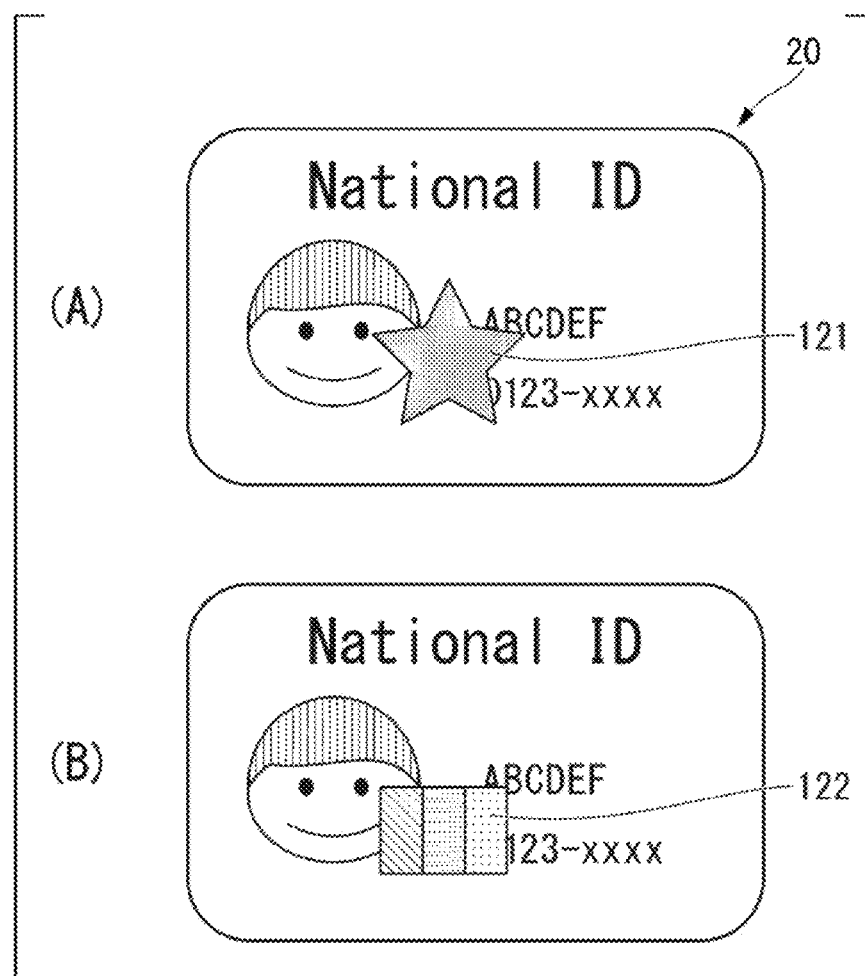
FIG. 19 is a plan view illustrating an example of an appearance of the laminate of the present invention.

FIG. 18 is a schematic view of a state in which a card 20 including the laminate shown in FIGS. 16 and 17 is observed by an observer, and FIG. 19 is a schematic view of an appearance of the card 20 visually recognized during observation. As shown in FIG. 18, the observer observes the card 20 at an angle at which light that is emitted from a light source and is incident and reflected on the card 20 is captured. In the case of the configuration shown in FIG. 16, the first motif 121 is observed in a state A in which the card 20 is tilted at an angle θ1 with respect to a horizontal plane Ph1. On the other hand, in the case of the configuration shown in FIG. 17, the first motif 121 is observed in the state A, and the second motif 122 is observed in a state B in which the card 20 is tilted at an angle θ2 with respect to the horizontal plane Ph1. In the case of the card 20 having the state A and the state B to be observed as in the latter case, the example in FIG. 18 shows the operation of tilting the card 20 back and forth with respect to the observer, but the operation is not limited to this. The state A and the state B may be observed by another operation according to the direction in which the light is reflected by the first relief structure 15a forming the first motif 121 and the second relief structure 15b forming the second motif 122 or the direction in which an intended optical effect is exhibited, and for example, the state B may be observed by rotating the medium by 90 degrees from the state A. In the example shown in FIG. 18, the card 20 is observed under the conditions where light from the light source is incident on the card 20 perpendicularly with respect to the horizontal plane Ph1, but the positional relationship between the light source and the horizontal plane Ph1 is not limited to this, and the card 20 may be observed under the conditions where light from the light source is incident on the card 20 obliquely with respect to the horizontal plane Ph1.

(Card)

Figure 20:
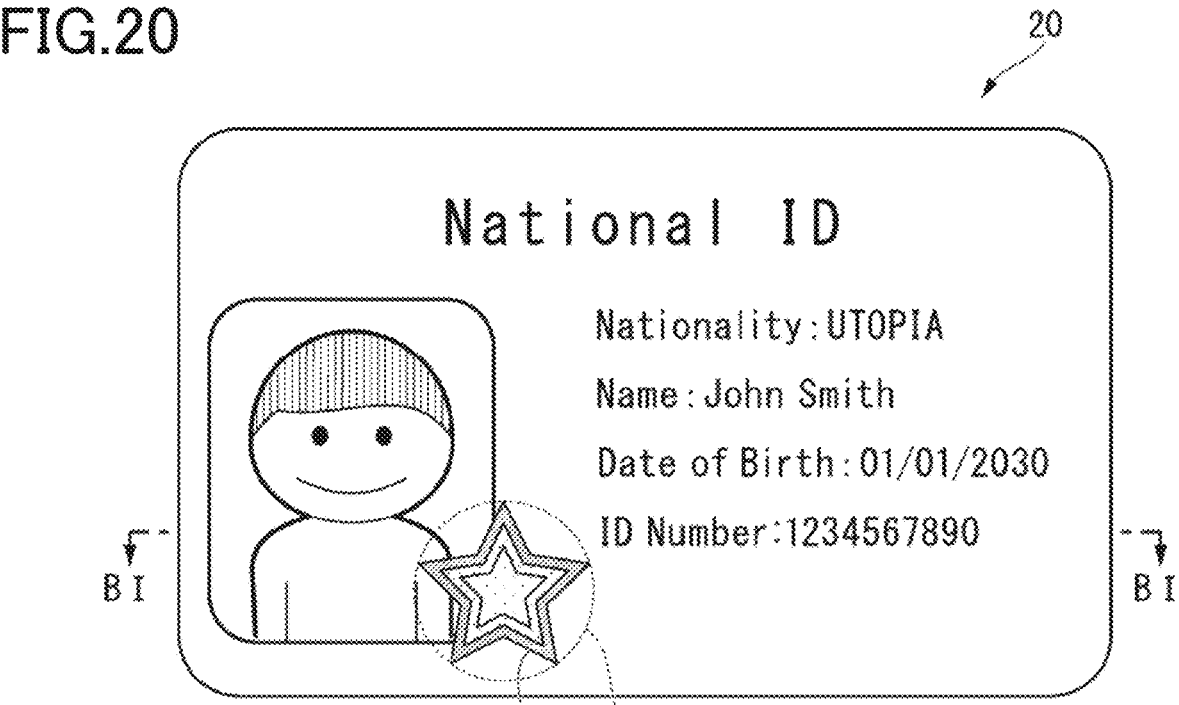
FIG. 20 is a plan view illustrating an example of a card including the laminate of the present invention.

FIG. 20 shows an example of the card 20 in which the transfer foil 11 described in the first to third embodiments is enclosed. The card 20 is described as a medium or personal information medium 20 in Japanese Patent Application No. 2021-095146. FIG. 20 is a schematic view of the card 20. The card 20 is an identification document, an ID card, a driver's license, or the like. A card having the same configuration as the card 20 may be used as a data page of a passport or a visa. The card 20 may be a tag or a gift card. Identification information is recorded in such a card. The identification information is described as personal information in Japanese Patent Applications No. 2020-132592, No. 2021-067112, and No. 2021-095146. The identification information is biometric information, a hash value of a biometric feature value, a name, an ID number, a code, or the like. Examples of biometric information include a facial image and a signature. The hash value of a biometric feature value may be a hash value of feature point data on a face, a fingerprint, an iris, or veins. The code may be a barcode or two dimensional code. The code may be a cipher code. The code may include an error correction code. Examples of the two dimensional code include a QR code (registered trademark). By adhering the transfer foil 11 including the relief structure to the card so that the transfer foil 11 overlaps with at least part of the personal information, tampering with the individual information can be prevented.

Figure 21:
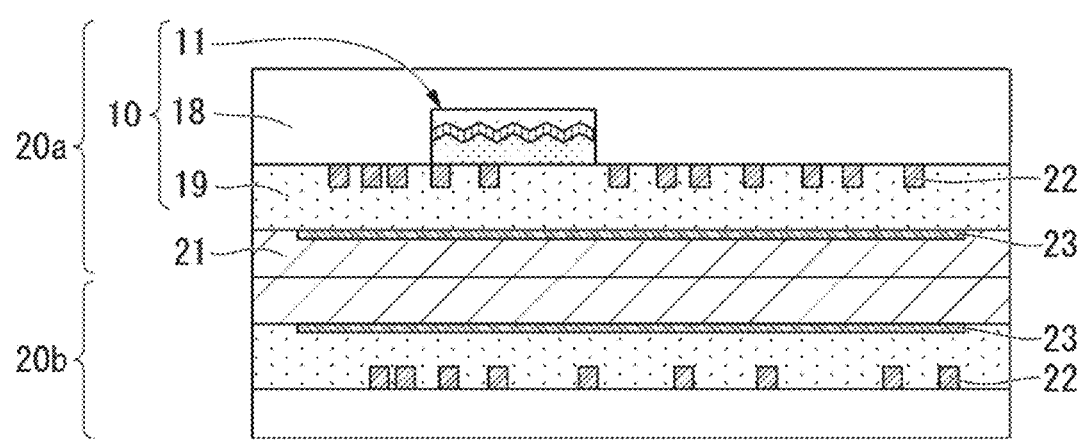
FIG. 21 is a cross-sectional view illustrating a configuration of a card along the line BI-BI of FIG. 20.

FIG. 21 is a cross-sectional view taken along line BI-BI of FIG. 20. As shown in FIG. 21, the card 20 is configured such that a support layer 21 that reinforces the laminate 10 is laminated in contact with the information recording sheet 19 of the laminate 10. The identification information described above can be recorded as a modified zone 22 by irradiating the information recording sheet 19 with a laser beam. The support layer 21 may be in white. A part of or the entire support layer 21 may be in a color other than white.

In the card 20, the support layer 21 may include a printed portion 23 on the surface of the support layer 21 in contact with the information recording sheet 19. The printed portion 23 can be formed by printing with an ink. In the example shown in FIG. 21, the card 20 has a front surface 20a and a rear surface 20b including information displayed by the modified zone 22 and the printed portion 23. In a card in which only the front surface 20a includes information, some or all of the layers of the rear surface 20b may be omitted.

(Material of Laminate)

Materials of the layers will be described below.

The protective sheet 18 is required to have transparency to visible light or observation light. This allows visual recognition or image capturing, from the protective sheet 18 side, of the optical effect of the transfer foil 11 and the identification information recorded in the information recording sheet 19. The material of the protective sheet 18 may be a thermoplastic plastic. The thermoplastic plastic preferably contains polycarbonate or amorphous copolyester as a base material.

The protective sheet 18 preferably has a thickness of 50 μm or more and 800 μm or less. If the thickness of the protective sheet 18 is less than 50 μm, the protective sheet 18 has insufficient physical strength, thus making handling difficult. On the other hand, if the thickness of the protective sheet 18 is more than 800 μm, during processing of the protective sheet 18, thickness variation and bending of the protective sheet 18 have a great influence, thus making the processing difficult.

When the information recording sheet 19 is irradiated with a laser beam having a specific wavelength, the information recording sheet 19 absorbs the laser beam and the material of the information recording sheet 19 is modified. The modification is a phenomenon of one or a combination of foaming, carbonization, and color change of the material. By irradiating the information recording sheet 19 with a laser beam that has an intensity and an irradiation spot size adjusted to a certain range, the material of the information recording sheet 19 is modified, allowing recording of information in the information recording sheet 19. The laser used to record information may be a solid-state laser. Examples of the solid-state laser include a semiconductor laser. The laser may be a pulsed laser. The laser beam may have a single wavelength or multiple wavelengths. The information to be recorded in the information recording sheet 19 may be identification information. The identification information may be personal information or attribute information. Examples of the personal information include the name, date of birth, signature, and portrait of the owner. Examples of the attribute information include gender, nationality, and affiliation. The material of the information recording sheet 19 may be polycarbonate containing an energy absorber that absorbs a laser beam used to record information. In such a case, in the information recording sheet 19, the polycarbonate is modified by heat generated by absorption of a laser beam. The modification may be carbonization or foaming. A specific example of the information recording sheet 19 is SD8B94 of a LEXAN series (registered trademark) manufactured by SABIC.

The material of the information recording sheet 19 may be polyvinyl chloride or amorphous copolyester, other than polycarbonate. Of these, polycarbonate is more likely to allow the information recording sheet 19 to have high durability and achieve high contrast in color development than other materials.

The information recording sheet 19 preferably has a thickness of 50 μm or more and 800 μm or less. If the thickness of the information recording sheet 19 is less than 50 due to the insufficient thickness, the information recording sheet 19 causes insufficient color development, and this leads to poor contrast between a color-developed portion and a non-color-developed portion. On the other hand, if the thickness of the information recording sheet 19 is more than 800 μm, the information recording sheet 19 causes an appearance with poor transparency and enhanced black, and this leads to poor contrast between a modified portion and an unmodified portion.

The relief forming layer 14 may be composed of a thermoplastic resin, a thermosetting resin, or a photocurable resin. Such a synthetic resin may be polyester, polyurethane, polyacrylic ester, acid-modified polyolefin, an ethylene-vinyl acetate copolymer resin material, polyimide, polyethylene, polypropylene, polymethylmethacrylate, polystyrene, polycarbonate, polyamide, polyamide-imide, cyclic polyolefin, melamine, inorganic particles, an epoxy resin, or a cellulose resin, or a mixture, a composite, or a copolymer of these materials. Of the above materials, polymethylmethacrylate, acid-modified polyolefin, and melamine have good formability. The relief forming layer 14 is not limited to a single layer, and may be a multilayer. The relief forming layer 14 as a multilayer may be a laminate of a curable resin and a thermoplastic resin. The thermoplastic resin may contain polymethylmethacrylate or acid-modified polyolefin. Alternatively, the relief forming layer 14 as a multilayer may include thermoplastic resin layers having different physical properties. Alternatively, the relief forming layer 14 may contain an inorganic powder or a polymer powder. By containing a powder in the relief forming layer 14, the interfacial adhesion strength between the relief forming layer 14 and the patch substrate 13 can be controlled. Thus, the relief forming layer 14 may have a curable resin layer on the relief structure 15 side and have a thermoplastic resin layer containing an inorganic powder or a polymer powder on the opposite side. In the laminate 10, the relief forming layer 14 may contain a resin having a higher melting point than polycarbonate.

The material of the protective sheet 18 may contain at least one material from a second group consisting of polyurethane, polymethyl acrylate, polyester, acid-modified polyolefin, and an ethylene-vinyl acetate copolymer resin.

The material of the reflective layer 16 may be a metal or a dielectric material. In the former case, the reflective layer 16 may be an opaque reflective layer, and in the latter case, the reflective layer 16 may be a translucent reflective layer. Examples of the metal include aluminum and silver. The dielectric material may be a metal compound or silicon oxide. The metal compound may be a metal oxide, a metal sulfide, or a metal fluoride. Examples of the metal compound include zinc oxide, titanium oxide, niobium oxide ($NbO_2$), and zinc sulfide. When the reflective layer 16 is composed of two layers, i.e., the first reflective layer 161 and the second reflective layer 162, as in the third embodiment, two types of materials may be selected from the above materials, and for example, silicon dioxide may be selected to form the first reflective layer 161 and titanium dioxide may be selected to form the second reflective layer 162.

When the dielectric material has a refractive index of 2.0 or more for visible light, the refractive index difference between the relief forming layer 14 and the reflective layer 16 is easily obtained, and reflected light generated according to the shape of the relief structure 15 has a high reflectance, thus allowing an observer to easily visually recognize the image 12. The reflective layer 16 may be formed by a deposition method. The deposition method may be one or both of a physical deposition method and a chemical deposition method. The physical deposition method may be vacuum deposition or sputtering. The reflective layer 16 preferably has a thickness of 10 nm or more and 200 nm or less.

As the material of the adhesive layer 17, a material for forming the relief forming layer 14 may be used. In particular, the material of the adhesive layer 17 may contain at least one of polymethylmethacrylate, polyester, cyclic polyolefin, melamine, and an ethylene-vinyl acetate copolymer resin. These materials easily achieve sufficient interfacial adhesion strength between the adhesive layer 17 and a layer containing polycarbonate in contact with the adhesive layer 17. The material for forming the adhesive layer 17 may be a resin having a carbonate bond (—O—CO—O—), a urethane bond (—NH—CO—), or an ester bond (—O—CO—). In the adhesion to polycarbonate, the interfacial adhesion strength tends to be high between polycarbonate and a resin having an ester bond or a urethane bond, which has a structure similar to that of a carbonate bond. When the laminate 10 has the configuration described in the second and third embodiments, the material of the adhesive layer 17 may be selected according to the material properties or the properties after surface modification of the reflective layer 16 so that the interfacial adhesion strength between the reflective layer 16 and the adhesive layer 17 becomes high due to the mechanism as described in the second and third embodiments. In the laminate 10, the adhesive layer 17 may contain a resin having a lower melting point than polycarbonate.

The material for forming the support layer 21 may be a material containing polyvinyl chloride, amorphous copolyester, or polycarbonate, and a white material such as titanium oxide.

The support layer 21 may have a thickness of 200 μm or more and 800 μm or less. When the thickness of the support layer 21 is 200 μm or more, a circuit including a chip, an antenna, a wire, and the like in the card 20 can be hidden from an observer. Identification information may be recorded as digital data in the chip of the circuit in the card 20. The digital data to be recorded may include, as the identification information, the personal information recorded in the information recording sheet 19. The digital data to be recorded may be encrypted. When the thickness of the support layer 21 is 800 μm or less, the support layer 21 has less thickness variation and bending, and this is useful for preventing defects such as warpage during lamination.

The printed portion 23 may be in color. Alternatively, the printed portion 23 may be monochrome. The printed portion 23 may be in black. The printed portion 23 may be provided on the entire surface of the support layer 21, or may be locally provided as a character, a design, a geometric pattern, a number, a signal, a code, or the like. The material for forming the printed portion 23 may be an ink. The ink may be the ink of the embodiment described above. The printed portion 23 may be composed of a functional ink that changes color according to the light illumination angle or the observation angle. Such a functional ink may be the ink of the embodiment described above. The printed portion 23 composed of a functional ink allows the card 20 to have higher resistance to counterfeiting.

The printed portion 23 may be formed by an electrophotographic method using toner. In such a case, the printed portion 23 can be formed by preparing toner in which color particles of graphite, a pigment, or the like are adhered to plastic particles having electrostatic properties, and using static electricity to transfer the toner to an object on which the printed portion 23 is to be printed, followed by fixing the toner by heating.

In the present embodiment, the layers constituting the transfer foil 11 and the protective sheet 18 may transmit light in a part of or the entire infrared light wavelength range to transmit an infrared laser beam. The infrared light wavelength range of light to be transmitted may include the wavelength of an infrared laser. In particular, the infrared light wavelength range of light to be transmitted may include a wavelength of 900 nm or more and 1100 nm or less. This allows transmission of a YAG laser beam. In this case, by irradiating the information recording sheet 19 with an infrared laser beam through the transfer foil 11, the modified zone 22 can be formed on the information recording sheet 19.

(Method of Manufacturing Card)

A method of manufacturing the transfer foil 11 and the card 20 including the transfer foil 11 will be described with reference to FIG. 21. The transfer foil 11 is produced by laminating, on a carrier 24 (not shown), the patch substrate 13, the relief forming layer 14, the reflective layer 16 (the first reflective layer 161 and the second reflective layer 162 in the configuration with two layers as the reflective layer as in the third embodiment), and the adhesive layer 17 in this order. As described above, the reflective layer 16 may be formed by a deposition method. The deposition method may be one or both of a physical deposition method and a chemical deposition method. The physical deposition method may be vacuum deposition or sputtering. Each of the other layers can be formed by applying a coating liquid, followed by drying in an oven.

In the present embodiment, the relief structure 15 is formed on the relief forming layer 14. The relief structure 15 can be obtained by applying a coating film containing a synthetic resin for forming the relief forming layer 14, and then using a stamper (an embossing plate) having the shape of the relief structure 15 to transfer the concavo-convex shape to the coating film.

The embossing plate for transferring the relief structure 15 to the relief forming layer 14 can be obtained by the following method. First, an original plate is obtained by a photolithography process in which a photosensitive resist is applied to one surface of a plate-shaped substrate, and then the photosensitive resist is irradiated with a beam to expose a part of the photosensitive resist, followed by development of the photosensitive resist. Then, the original plate is used to produce a metal stamper by electroplating or the like. The metal stamper is the embossing plate, and serves as a mold for replicating the relief structure 15 on the relief forming layer 14. The metal stamper can also be obtained, for example, by cutting a metal substrate using a lathe. However, when the relief structure 15 has a complicated shape or is a very fine structure in a subwavelength order, cutting processing is difficult and the photolithography process described above is used to produce the metal stamper.

When an appropriate external force (heat, pressure, etc.) is applied from the carrier 24 side to the transfer foil 11 provided with the carrier 24, the adhesive layer 17 is adhered to the information recording sheet 19, and at the same time, the patch substrate 13 is separated from the carrier 24; thus, the transfer foil 11 composed of the patch substrate 13 and the layers under the patch substrate 13 is transferred to the information recording sheet 19. As shown in FIGS. 2A and 2B, the transfer foil 11 may be transferred not to the surface of the information recording sheet 19 but to the surface of the protective sheet 18. In such a case, the positional relationship of the layers is reversed.

The carrier 24 is a layer provided to hold the transfer foil 11 before transfer, and is preferably a plastic film. Specifically, the carrier 24 may be a film of plastic such as PET (polyethylene terephthalate), PEN (polyethylene naphthalate), or PP (polypropylene). However, the carrier 24 is preferably composed of a material that is less likely to be deformed or modified by an external force such as heat or pressure applied when the transfer foil 11 is supported by the carrier 24. In the present embodiment, the carrier 24 preferably has a thickness of 4 μm or more. More preferably, the carrier 24 has a thickness of 12 μm or more and 50 μm or less. If the thickness of the carrier 24 is less than 4 μm, the carrier 24 has insufficient physical strength, thus making handling difficult.

A transfer step can be performed using a metal or resin stamper under the transfer conditions of a stamper surface temperature of approximately 80° C. to 150° C., a stamper contact time of 0.1 seconds to 3 seconds, and a transfer pressure of 100 to 500 kg/cm$^2$. When the temperature, the contact time, and the transfer pressure are set to be equal to or less than the respective upper limits, it is possible to prevent an excessive amount of heat from causing transfer of a portion around the transfer foil 11 to a transfer object to which the transfer foil 11 is transferred or causing deformation of the surface of the transfer object. When the temperature, the contact time, and the transfer pressure are set to be equal to or greater than the respective lower limits, it is possible to prevent insufficient adhesion of the transfer foil 11 to the transfer object from causing incomplete transfer of the transfer foil 11 to the transfer object.

The information recording sheet 19 to which the transfer foil 11 has been transferred is provided with the support layer 21 on the surface of the information recording sheet 19 facing away from the transfer foil 11. At least the printed portion 23 is provided on the surface of the support layer 21. When the top surface and the bottom surface of the laminated layers are covered with the protective sheet 18, followed by application of heat and pressure to the entire layers to adhere all the layers together and enclose the transfer foil 11 between the information recording sheet 19 and the protective sheet 18. In this adhesion step, when the information recording sheet 19 and the protective sheet 18 contain polycarbonate, the temperature of the heat source applying heat to the layers may be set to 170° C. or more and 200° C. or less, and the contact time of the heat source with the layers may be set to 1 minute or more and 30 minutes or less. Thus, the information recording sheet 19 and the protective sheet 18 containing polycarbonate can be reliably adhered to each other. The layers constituting the card 20 are varied depending on whether the card 20 has only the front surface 20a or has both the front surface 20a and the rear surface 20b or whether each of the front surface 20a and the rear surface 20b has the modified zone 22 and the printed portion 23. Thus, the card 20 may not necessarily include all the layers shown in FIG. 21.

When the transfer foil 11 has been transferred to the protective sheet 18 in the transfer step, the protective sheet 18 to which the transfer foil 11 has been transferred may be covered with the information recording sheet 19 in the adhesion step.

When the adhesion step is completed, a card including the integrated layers is formed. An arbitrary portion of the information recording sheet 19 is irradiated with a laser beam via the surface of the card, i.e., the protective sheet 18. Through this irradiation step, the modified zone 22 is formed in the information recording sheet 19. The region to be irradiated with a laser beam is determined depending on information to be displayed by the modified zone 22. The modified zone 22 displays characters or numbers representing personal information such as a name, date of birth, or personal identification number, or an image such as a facial image or a two dimensional code. Through the above steps, the card 20 is formed.

A method of forming the island regions R1 and the sea region R2 of the first to third embodiments in the step of producing the transfer foil 11 will be described below.

Local surface modification of the surface of the relief forming layer 14, i.e., formation of the island regions R1 and the sea region R2 on the surface of the relief forming layer 14, may be performed by surface treatment to the surface of the relief forming layer 14 while the surface of the relief forming layer 14 is physically covered with a mask having a mesh pattern, and this is the simplest method as the manufacturing process. The surface of the relief forming layer 14 may be subjected to surface treatment while a mask layer composed of a resin is provided on the surface of the relief forming layer 14, followed by removal of the mask layer. When the mask layer is composed of a water-soluble resin, the resin can be removed by washing with water, and when the mask layer is composed of a resin having low resistance to acid/alkali, the resin can be removed by washing with an acid/alkaline solution. However, in the latter case, the relief forming layer 14 and the patch substrate 13 are required to be resistant to the acid/alkaline solution to be used.

Local surface modification of the surface of the reflective layer 16, i.e., formation of the island regions R1 and the sea region R2 on the surface of the reflective layer 16, may be performed by surface treatment of the surface of the reflective layer 16 while the surface of the reflective layer 16 is physically covered with a mask having a mesh pattern.

The following three methods may be used to locally form the second reflective layer 162 or to locally remove the second reflective layer 162 as shown in FIG. 14. The first method uses the azimuth of the relief structure 15 and the material properties of the first reflective layer 161 and the second reflective layer 162, and the method described in the known literature below may be referred to. According to Japanese Patent Application No. 2017-521701, in a laminate having a first region having a concavo-convex structure that extends in a first direction or a direction up to 10 degrees left or right from the first direction, and a second region having a concavo-convex structure that extends in a second direction perpendicular to the first direction or a direction up to 65 degrees left or right from the second direction, two types of reflective layers, i.e., a reflective layer composed of a first material and a reflective layer composed of a second material, are vapor deposited in this order on the surface including the concavo-convex structure while being conveyed by a roll-to-roll method. In this patent, the first material is a material having low resistance to an alkaline solution, e.g., aluminum, and the second material is a material having high resistance to an alkaline solution and forming a columnar structure or a gap structure by oblique vapor deposition, e.g., silicon oxide (SiOx). The first material and the second material are vapor phase deposited in this order while the film conveying direction is set to coincide with the first direction. In the first region that is parallel to the film conveying direction, the second material forms a columnar structure or a gap structure, and in the second region that is perpendicular to or is not parallel to the film conveying direction, the second material is deposited along the concavo-convex structure while forming almost no gaps. Due to the difference in the deposition state, when the laminate in which the first material and the second material are deposited is etched using an alkaline solution, the first material and the second material can be removed in the first region and the first material and the second material can remain in the second region.

The above mechanism may be used to form, as the relief structure 15, a grating structure (e.g., a subwavelength grating) extending in the first direction in the second region S2 and a grating structure extending in the second direction perpendicular to the first direction in the first region S1. The first reflective layer 161 is formed on the entire surface of the relief forming layer 14 on which the relief structure 15 is provided, and then the second reflective layer 162 is formed on the entire surface of the first reflective layer 161 facing away from the relief forming layer 14. By using a material (e.g., titanium dioxide) having higher resistance to an acid/alkaline solution than silicon oxide to form the first reflective layer 161 and using silicon oxide to form the second reflective layer 162, when the transfer foil 11 after formation of the second reflective layer 162 is immersed in an acid/alkaline etching solution, in the second region S2 in which the second reflective layer 162 has a large contact area with the etching solution, the second reflective layer 162 can be removed faster than in the first region S1. The speed at which the second reflective layer 162 is to be removed and the balance between the amount of second reflective layer 162 to be removed in the first region S1 and the amount of second reflective layer 162 to be removed in the second region S2 can be controlled by adjusting the concentration or temperature of the etching solution, etching time, or the like.

In this method, the region to be etched can be controlled by adjusting the azimuth of the relief structure 15, and thus the method achieves etching with higher definition and higher accuracy (smaller deviation of the etching position from the second region S2) than the following two methods.

The second method may be a method in which the first reflective layer 161 and the second reflective layer 162 are formed, and then a mask layer resistant to an etching solution is formed in the first region S1, followed by immersion of the transfer foil 11 in the etching solution to remove the second reflective layer 162 only in the second region S2. In this case, the removal of the second reflective layer 162 may be controlled by using, as the etching solution, a solution to which the first reflective layer 161 and the mask layer are resistant and the second reflective layer 162 is not resistant, or by stopping the etching process at the time when the second reflective layer 162 in the second region S2 has been removed, regardless of the properties of the first reflective layer 161. After etching, the mask layer is removed to form the configuration shown in FIG. 14.

The third method may be a method in which the first reflective layer 161 and the second reflective layer 162 are formed, and then the first reflective layer 161 and the second reflective layer 162 are irradiated with a laser beam in a pattern to remove the second reflective layer 162 only in the second region S2. However, this method is effective only when the second reflective layer 162 is composed of a material that can be melted, evaporated, or sublimated by irradiation with a laser beam, and is unsuitable for a light transmissive dielectric material that allows a laser beam to pass through. Thus, this method is suitable, for example, for the transfer foil 11 obtained by using titanium dioxide to form the first reflective layer 161 and using aluminum to form the second reflective layer 162 so that the first region S1 includes a reflective layer composed of a dielectric material and a metal and the second region S2 includes a reflective layer composed of a dielectric material, allowing partial visual recognition of metal reflection during observation.

The following two methods may be used to locally form the first reflective layer 161 or to locally remove the first reflective layer 161 as shown in FIG. 15. The first method may be a method in which the first reflective layer 161 is formed on the surface of the relief forming layer 14, and then a mask layer resistant to an etching solution is formed in the first region S1, followed by removal of the first reflective layer 161 in the second region S2 and removal of the mask layer, and then formation of the second reflective layer 162.

The second method may be a method in which the first reflective layer 161 is formed on the surface of the relief forming layer 14, followed by removal of the first reflective layer 161 only in the second region S2 by irradiation with a laser beam, and then formation of the second reflective layer 162. This method is effective when the first reflective layer 161 is composed of a material that reacts to a laser beam. Thus, this method is suitable for a configuration in which the first reflective layer 161 is composed of a metal material such as aluminum or silver and the second reflective layer 162 is composed of a light transmissive dielectric material.

In order to remove the first reflective layer 161 in a manner with higher definition and higher accuracy than the above two methods, a method using the relief structure 15 described with the configuration shown in FIG. 14 is effective. In order to form both of the first reflective layer 161 and the second reflective layer 162 as a transparent reflective layer, the relief structure 15 is formed so that in the second region S2, the relief structure 15 extends in a direction parallel to the film conveying direction during formation of the reflective layers 161 and 162 by a vapor phase deposition method and that in the first region S1, the relief structure 15 extends in a direction perpendicular to the conveying direction. Next, the first reflective layer 161 is formed using silicon oxide, followed by etching to remove the reflective layer in the second region S2. Then, the second reflective layer 162 is formed to obtain the configuration shown in FIG. 15.

In order to contain a metal material in the reflective layer, as in Japanese Patent Application No. 2017-521701, a method may be used in which a first reflective layer is formed using aluminum and a second reflective layer is formed using silicon oxide, followed by removal of the first reflective layer and the second reflective layer in the second region S2, and then vapor deposition of a light transmissive dielectric material as a third reflective layer. This method can form the first region S1 including a reflective layer having a three-layer structure of a single metal material layer and two dielectric material layers, and the second region S2 including a reflective layer including a single dielectric material layer (not shown). In this case, when the third reflective layer has a high refractive index, the optical effect in the second region S2 is high, thus allowing display of the image 12 with high visibility. Furthermore, the optical effect (e.g., a color value, brightness) in the first region S1 can be varied by controlling the refractive index difference between the second reflective layer and the third reflective layer.

Fourth Embodiment

Figure 22:
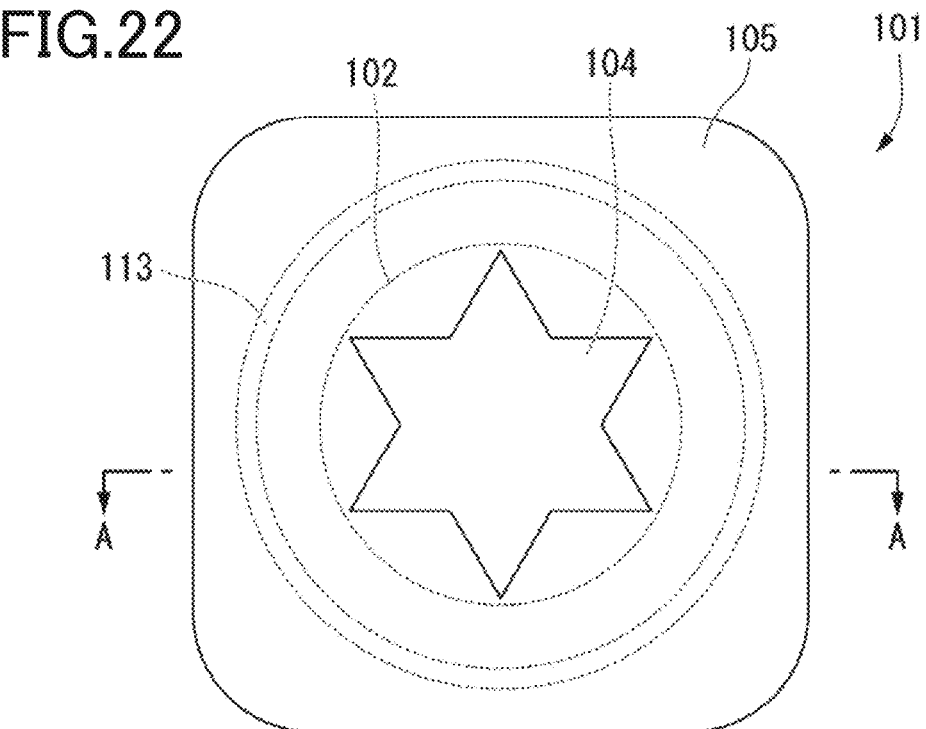
FIG. 22 is a schematic plan view illustrating a configuration of a medium of the present invention.
Figure 23:
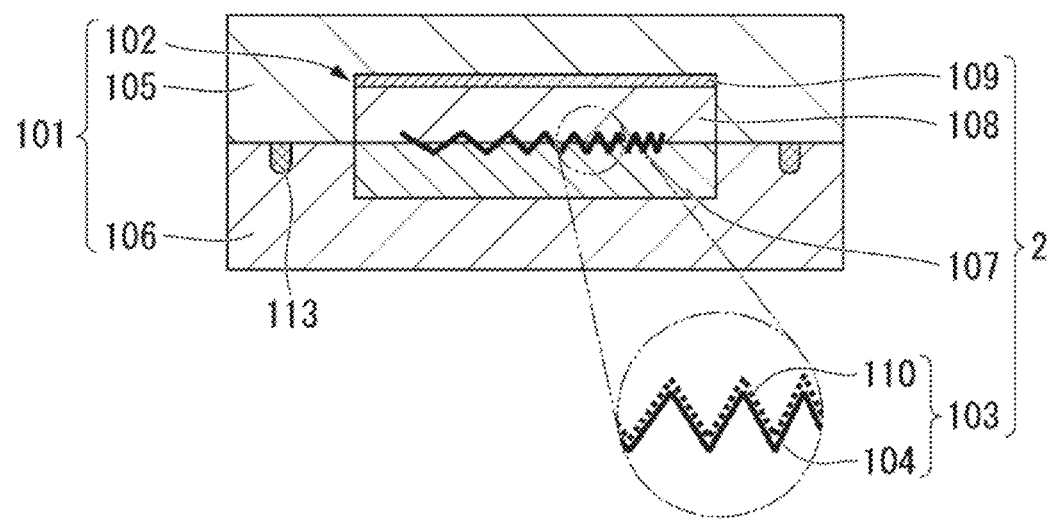
FIG. 23 is a cross-sectional view of the medium taken along line A-A of FIG. 22.
Figure 24:
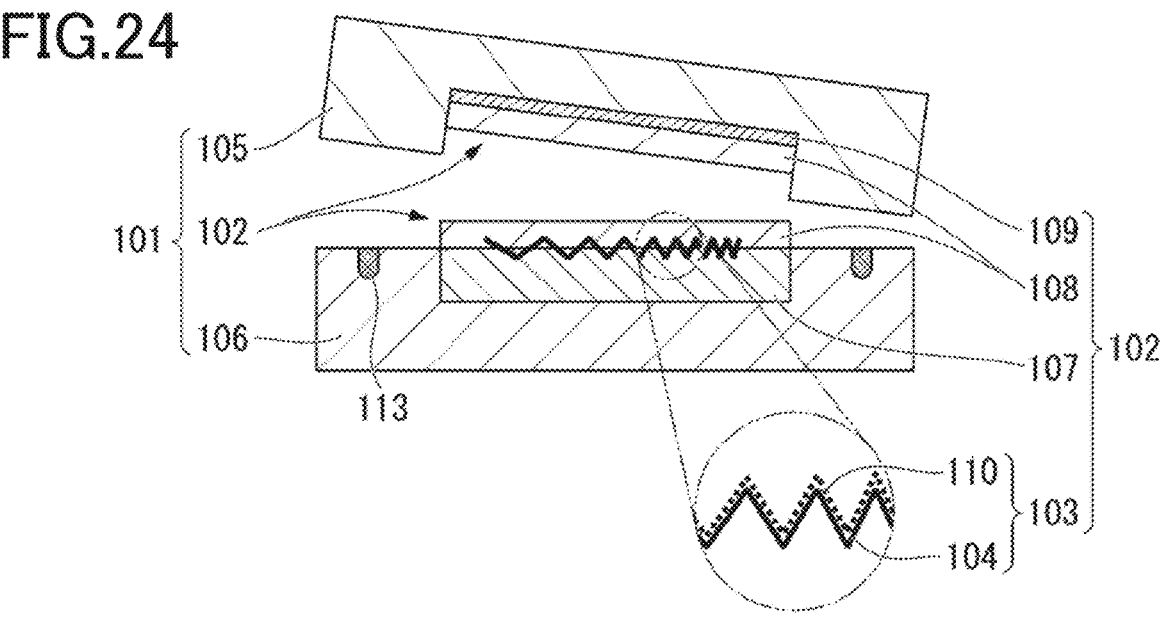
FIG. 24 is a schematic cross-sectional view illustrating a state in which a security patch is separated from a protective sheet in the cross section shown in FIG. 23.

An embodiment of the present invention will be described below as the fourth embodiment with reference to FIGS. 22 to 24. FIG. 22 is a schematic plan view illustrating a configuration of a laminate (medium) 101 of the fourth embodiment of the present invention. FIG. 23 is a cross-sectional view of the laminate 101 taken along line A-A of FIG. 22. FIG. 24 is a schematic cross-sectional view illustrating a state in which the security patch 102 is separated from a protective sheet 105 in the cross section of the laminate 101 shown in FIG. 23. The transfer foil 11 described above may be the security patch 102.

As shown in FIGS. 22 and 23, the laminate 101 of the fourth embodiment includes the protective sheet 105, an information recording sheet 106, the security patch 102, a surface relief 104 having a star shape, and a laser engraving 113. As shown in FIG. 23, the protective sheet 105 and the information recording sheet 106 are adhered to each other at a boundary therebetween. Thus, in the laminate 101, the security patch 102 is sandwiched between the protective sheet 105 and the information recording sheet 106. That is, the security patch 102 is enclosed by the protective sheet 105 and the information recording sheet 106 so as not to be exposed to air outside the laminate 101. The information recording sheet 19 described above may be the information recording sheet 106.

The protective sheet 105 has transparency to visible light, and thus allows the security patch 102 and the surface relief 104 to be directly observed from the protective sheet 105 side. The protective sheet 105 is provided to protect the enclosed security patch 102 and the information recording sheet 106. The protective sheet 105 may be a layer composed of a thermoplastic plastic. The thermoplastic plastic preferably contains a polyvinyl chloride material, an amorphous copolyester material, or a polycarbonate material as a base material.

The protective sheet 105 preferably has a thickness of 50 μm or more and 800 μm or less. If the thickness of the protective sheet 105 is less than 50 the protective sheet 105 has insufficient physical strength, thus making handling difficult. On the other hand, if the thickness of the protective sheet 105 is more than 800 during processing of the protective sheet 105, thickness variation and bending of the protective sheet 105 have a great influence, thus making the processing difficult.

The information recording sheet 106 is composed of a material to be modified by absorption of a laser used to record information. The modification is a phenomenon of one or a combination of foaming, carbonization, and color change of the material. By irradiating the information recording sheet 106 with a laser that has an intensity and an irradiation spot size adjusted to a predetermined value, the material of the information recording sheet 106 is modified, allowing recording of information in the information recording sheet 106. The laser used to record information may be a solid-state laser. The laser may be a pulsed laser. The laser may have a single wavelength or multiple wavelengths. The information to be recorded in the information recording sheet 106 is, for example, identification information. The information recording sheet 106 may be composed of polycarbonate containing an energy absorber that absorbs a laser used to record information. In such a case, in the information recording sheet 106, the polycarbonate is chemically changed and modified by heat generated by absorption of a laser. A specific example of the information recording sheet 106 is SD8B94 of the LEXAN series (registered trademark) manufactured by SABIC. The material used to form the information recording sheet 106 may be polyvinyl chloride or amorphous copolyester, other than a polycarbonate material.

The information recording sheet 106 preferably has a thickness of 50 μm or more and 800 μm or less. If the thickness of the information recording sheet 106 is less than 50 due to the insufficient thickness, the information recording sheet 106 causes insufficient color development, and this leads to poor contrast between a modified zone and an unmodified portion. On the other hand, if the thickness of the information recording sheet 106 is more than 800 μm, the information recording sheet 106 causes an appearance with poor transparency and enhanced black, and this leads to poor contrast between a modified portion and an unmodified portion.

As shown in FIG. 23, in the security patch 102, an adhesive layer 109, the breaking layer 108, and a verification layer 107 are sequentially laminated in a direction from the protective sheet 105 toward the information recording sheet 106, i.e., the thickness direction of the laminate 101, and a relief structure 103 is provided between the breaking layer 108 and the verification layer 107. The relief structure 103 is described as the relief structure layer 103 in Japanese Patent Application No. 2020-132592. Thus, the relief structure 103 can be referred to as the relief structure layer 103. In the security patch 102, the breaking layer 108 and the adhesive layer 109 are in contact with the protective sheet 105. The verification layer 107 is in contact with the information recording sheet 106. The relief structure 103 is composed of the surface relief 104 and a reflective layer 110. As shown in FIG. 23, the relief structure 103 is provided at a boundary between the breaking layer 108 and the verification layer 107. In the fourth embodiment, the protective sheet 105 is adhered to the adhesive layer 109 of the security patch 102 in the thickness direction of the laminate 101. The information recording sheet 106 is adhered to the verification layer 107 provided on the side of the security patch 102 facing away from the adhesive layer 109 in the thickness direction of the laminate 101. In other words, the laminate 101 has a structure in which the protective sheet 105; the adhesive layer 109, the breaking layer 108, the relief structure 103, and the verification layer 107 of the security patch 102; and the information recording sheet 106 are provided in this order in the thickness direction of the laminate 101. The verification layer 107 may be laminated layers of the relief forming layer 14 and the patch substrate 13 described above. The information recording sheet described above may be the information recording sheet 107.

As shown in FIG. 23, the relief structure 103 is composed of the surface relief 104 and the reflective layer 110. The surface relief 104 has a plurality of fine concavities and convexities that have a height difference of 0.1 μm to 10 μm in the thickness direction of the laminate 101 and are arranged at intervals of 0.1 μm to 20 μm in the width direction of the laminate 101 (a direction perpendicular to the thickness direction). The surface relief 104 is composed of one or a combination of a plurality of optical structures such as an optical diffraction structure, a non-reflective structure, an isotropic or anisotropic scattering structure, a lens structure, and a polarization selective reflection structure. The above structure of the surface relief 104 allows detection, by visual observation, a detection device, or the like, of counterfeiting and tampering with the information recorded in the information recording sheet 106. The structure of the surface relief 104 provides a decorative effect to the laminate 101. The surface relief 104 can form a motif and an image of a motif corresponding to the arrangement of the structure. An observer can observe a state in which the motif is displayed. That is, the motif is formed to be visible to the observer. In the motif, information such as authentication information may be recorded. Examples of the motif include a portrait, a landmark motif, an artwork, a natural motif, a calligraphy letter, a text, a mark, a signal, a symbol, a signal, a sign, a code, or a geometric pattern. The code may be a barcode or a two-dimensional code. Examples of the geometric pattern include a guilloche pattern. Examples of the text include a microtext. Examples of the calligraphy letter include letters in Western calligraphy, Islamic calligraphy, Georgian calligraphy, Chinese calligraphy, Japanese calligraphy, Korean calligraphy, Philippine Suyat, Thai calligraphy, Indian Oriya characters, and Nepalese calligraphy.

The reflective layer 110 of the relief structure 103 allows the motif of the surface relief 104 to be easily observed. The reflective layer 110 can increase the visibility of the relief structure 103. The reflective layer 110 achieves a complex visual effect due to the optical properties of the relief structure 103. The reflective layer 110 can be produced by using a material that is easily handled, inexpensive, and can produce a high-gloss opaque film. The reflective layer 110 may be composed of aluminum, or a compound, such as zinc sulfide or titanium dioxide, that has a high refractive index for visible light and is easily processed. The reflective layer 110 may be formed by a deposition method. The deposition method may be one or both of a physical deposition method and a chemical deposition method. The physical deposition method may be vacuum deposition or sputtering. The reflective layer 110 preferably has a thickness of 10 nm or more and 200 nm or less.

The material of the reflective layer 110 may be a metal or a compound. The compound may be a metal compound or silicon oxide. A reflective layer 110 composed of a metal is opaque. A reflective layer 110 composed of a compound may be a translucent reflective layer. The reflective layer 110 may be a single layer or a multilayer. The reflective layer 110 as a multilayer may be formed by laminating a plurality of layers including a metal layer and a dielectric layer composed of a compound. The reflective layer 110 as a multilayer may be formed so that a metal layer covers a part of the surface relief 104 and a compound dielectric layer covers the entire surface relief 104. The reflective layer 110 as a multilayer may be formed so that a metal layer covers a part of the surface relief 104 and a compound dielectric layer covers a part of the surface relief 104. In other words, the reflective layer 110 as a multilayer may be formed so that a metal layer and a compound dielectric layer cover a part of or the entire surface relief 104. When the reflective layer 110 is formed so that one or both of a metal layer and a compound dielectric layer cover a part of the surface relief 104, the separation strength between the reflective layer 110 and a portion of the surface relief 104 that is covered with the metal layer and the compound dielectric layer is different from the separation strength between the reflective layer 110 and a portion of the surface relief 104 that is not covered with the metal layer or the compound dielectric layer. Thus, when the laminate 101 is damaged by unauthorized means, more complex breakage occurs in the breaking layer 108, and this makes it more difficult to improperly extract the security patch 102 and adhere the security patch 102 to another article. A motif can be formed by the outline of the metal layer or/and the compound dielectric layer of the reflective layer 110 formed to cover a part of the surface relief 104. In the motif, information may be recorded. The information to be recorded in the motif may be one or a combination of authentication information and identification information.

The information to be recorded in the reflective layer 110 may be recorded by using a laser beam. A laser used as a laser beam may be a solid-state laser. The solid-state laser may be a semiconductor laser.

The laser may be a pulsed laser. The laser may have a single wavelength or multiple wavelengths. Recording of the information in the reflective layer 110 may be performed by the same process as that of recording of the information in the information recording sheet 106. The identification information recorded as the outline of the metal layer or/and the compound dielectric layer may include part or all of the identification information recorded by modification of the information recording sheet 106. Alternatively, the identification information recorded as the outline of the metal layer or/and the compound dielectric layer may be information obtained by encrypting part or all of the identification information recorded by modification of the information recording sheet 106. When the information in the information recording sheet 106 is recorded as the outline of the metal layer or/and the compound dielectric layer using a laser beam, it is possible to detect tampering with the information recording sheet 106, tampering by adhering the medium to another article, or the like. The shape of the broken breaking layer 108 indicates a trace of the outline of the metal layer or/and the compound dielectric layer, thus allowing detection of tampering.

Examples of the above information include a text, a mark, a signal, a symbol, a signal, a sign, a code, a geometric pattern, and a calligraphy letter. Examples of the symbol include a flag, a shield, a sword, a spear, a crown, a star, the moon, a flower, a leaf, a plant, a bird, a wing, a fish, an arthropod, a mammal, a reptile, an amphibian, a legendary creature, a mythical god, and a mythical goddess. The code is, for example, a barcode or a two-dimensional code. Examples of the geometric pattern include a guilloche pattern. The text may be microtext. Examples of the calligraphy letter include letters in Western calligraphy, Islamic calligraphy, Georgian calligraphy, Chinese calligraphy, Japanese calligraphy, Korean calligraphy, Philippine Suyat, Thai calligraphy, Indian Oriya characters, and Nepalese calligraphy.

The reflective layer 110 having a mixed form obtained by laminating a metal layer and a compound dielectric layer can be formed by the following three methods. The first method is a method in which a soluble resin portion is formed only in a desired part, and then one or both of a metal layer and a dielectric layer are formed, followed by removal of the soluble resin portion and the one or both of the metal layer and the dielectric layer by washing. The soluble resin portion can be formed by printing in a part of the reflective layer 110. Thus, the dielectric layer can be formed in a part of the reflective layer 110. The second method is a method in which an acid-resistant resin portion or an alkali-resistant resin portion is formed on a metal layer in a part of the reflective layer 110, followed by etching of the metal layer using an acid or an alkali. The acid-resistant resin portion or the alkali-resistant resin portion can be formed by printing in a part of the reflective layer 110. This method has high productivity, and allows the metal layer formed in a part of the reflective layer 110 to have a sharp outline. The third method is a method in which a resin material that is dissolved or difficult to dissolve by exposure is applied, followed by exposure through a mask having a desired pattern, and then removal of an unnecessary portion by washing or etching. This method allows the metal layer formed in a part of the reflective layer 110 to have a sharp outline with high definition. The above methods are examples of the method for forming the reflective layer 110 having a mixed form in which a metal layer and a compound dielectric layer are laminated, and the embodiments of the present invention are not limited to these methods. Various known techniques may be used as appropriate as long as such a technique enables formation of the reflective layer 110 having a mixed form in which a metal layer and a compound dielectric layer are laminated.

As shown in FIG. 23, the verification layer 107 is in contact with the breaking layer 108 directly or via the reflective layer 110 in the thickness direction of the laminate 101, and the verification layer 107 is also in contact with the information recording sheet 106. In the fourth embodiment, the verification layer 107 of the security patch 102 is preferably adhered to each of the information recording sheet 106 and the protective sheet 105 with a high adhesion strength. The adhesion strength between the security patch 102 and the information recording sheet 106 and the adhesion strength between the security patch 102 and the protective sheet 105 are each preferably higher than 50 N/25 mm.

In the fourth embodiment, in the case where the adhesion strength between the security patch 102 and the information recording sheet 106 is higher than 50 N/25 mm width, when the relief structure 103 is extracted by unauthorized means, separation between the security patch 102 and the information recording sheet 106 is easily prevented, reducing the possibility of reuse of the tampered relief structure 103.

In the fourth embodiment, in the security patch 102, the surface relief 104 can be formed and protected by the breaking layer 108 in contact with the protective sheet 105 and the verification layer 107 in contact with the information recording sheet 106. In the fourth embodiment, the verification layer 107, the breaking layer 108, and the adhesive layer 109 are provided to control the adhesion strength of the security patch 102 with the protective sheet 105 and the information recording sheet 106.

The material for forming the above components may be polyester, polyurethane, polyacrylic ester, acid-modified polyolefin, an ethylene-vinyl acetate copolymer resin, polymethylmethacrylate, cyclic polyolefin, melamine, inorganic particles, an epoxy resin, a cellulose resin, or the like. The material for forming the above components may be an ultraviolet curable resin whose precursor is a monomer, an oligomer, a polymer, or the like having an ethylenically unsaturated bond or an ethylenically unsaturated group. Examples of the monomer include 1,6-hexanediol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Examples of the oligomer include epoxy acrylate, urethane acrylate, and polyester acrylate.

In the fourth embodiment, the breaking layer 108 preferably has a breaking strength of 15 N/25 mm or more and less than 45 N/25 mm in a 90-degree peel adhesion strength test, and the adhesion strength between the security patch 102 and the information recording sheet 106 and the adhesion strength between the security patch 102 and the protective sheet 105 are preferably higher than the breaking strength of the breaking layer 108 by 5 N/25 mm or more. In such a case, when unauthorized extraction of the security patch 102 is attempted, breakage occurs in the breaking layer 108 or in the vicinity of the surface relief 104, thus preventing unauthorized use of the security patch 102. The adhesion between the reflective layer 110 provided on the surface relief 104 and the resin of the breaking layer 108 is low, and the adhesion tends to be not uniform due to variation in the concavities and convexities of the surface relief 104 and the surface state of the reflective layer 110. Thus, during breakage, stress is more likely to be concentrated in the vicinity of the surface relief 104, and breakage occurs in the vicinity of the surface relief 104 as with breakage in the breaking layer 108. In this case, breakage may not necessarily occur in the breaking layer 108, and may be occur in the verification layer 107 as long as breakage occur in the vicinity of the surface relief 104. Furthermore, breakage preferably occurs in both the breaking layer 108 and the verification layer 107. In such a case, the surface relief 104 is reliably damaged. If the breaking strength of the breaking layer 108 is 45 N/25 mm or more, and the adhesion strength between the security patch 102 and the information recording sheet 106 and the adhesion strength between the security patch 102 and the protective sheet 105 are higher than the breaking strength of the breaking layer 108 by 5 N/25 mm or more, breakage is more likely to occur not in the vicinity of the surface relief 104 but in the adhesive layer 109 and the verification layer 107. When breakage occurs in the adhesive layer 109, the remaining portion of the adhesive layer 109 may be used to replicate the shape of the surface relief 104. When breakage occurs in the verification layer 107, the verification layer 107 may be extracted together with the protective sheet 105 in an unauthorized manner and reused in a tampered card or the like. On the other hand, if the breaking strength of the breaking layer 108 is less than 15 N/25 mm, in a step of forming the security patch 102 on a surface of the protective sheet 105 by transfer (described later), due to inappropriate transfer, transfer failure is more likely to occur. In the fourth embodiment, the adhesion strength between the security patch 102 and the information recording sheet 106 and the adhesion strength between the security patch 102 and the protective sheet 105 are preferably higher than the breaking strength of the breaking layer 108 by 5 N/25 mm or more and are five times or less the breaking strength of the breaking layer 108.

In the fourth embodiment, the breaking layer 108 contains a transparent resin and a filler composed of particles having an average particle size of 1 µm or less. In the breaking layer 108, if the average particle size of the filler is more than 1 µm, light with which the laminate 101 is irradiated may be scattered by the filler, hindering reading of the information stored in the relief structure 103. The average particle size of the filler may be 10 nm or more. When the average particle size of the filler is 10 nm or more, defects due to aggregation of the filler are less likely to occur.

The filler of the breaking layer 108 is provided to prevent reuse of the verification layer 107 extracted from the laminate 101 damaged by unauthorized means as described later. By providing the filler in the breaking layer 108, the breaking strength of the breaking layer 108 can be controlled. The content of the filler in the breaking layer 108 may be in the range of 10% or more and 50% or less. When the content of the filler in the breaking layer 108 is in this range, the breaking strength is easily controlled.

Figure 28A:
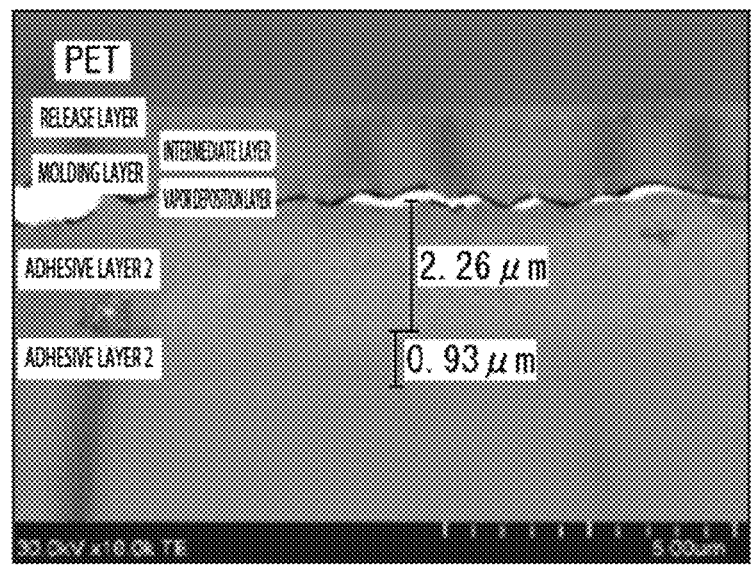
FIG. 28A is a cross-sectional photograph showing a configuration of the medium according to an embodiment of the present invention.
Figure 28B:
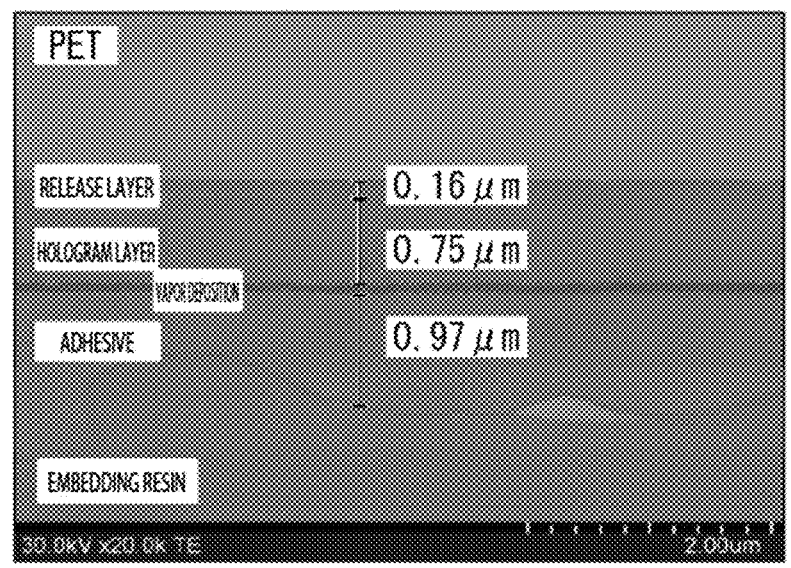
FIG. 28B is a cross-sectional photograph showing a configuration of the medium according to an embodiment of the present invention.

In the fourth embodiment, the filler may be a silica filler. When a resin containing a silica filler is used to form the security patch 102, in a coating film step, the security patch 102 may be formed so that the silica filler is appropriately unevenly distributed in the breaking layer 108. As in a photograph obtained using a scanning electron microscope (SEM) shown in FIG. 28A, when the silica filler is appropriately unevenly distributed in the breaking layer 108, during extraction of the verification layer 107 by unauthorized means, irregular cohesive failure occurs in the breaking layer 108, and this causes an irregular broken surface of the breaking layer 108. More specifically, in a state as in the SEM photograph shown in FIG. 28A, the adhesive layer 109 is configured such that a large amount of silica filler is contained in a portion of the adhesive layer 109 (an adhesive layer 1 in FIG. 28A) and that a small amount of silica filler or no silica filler is contained in the other portion of the adhesive layer 109 (an adhesive layer 2 in FIG. 28A). In this configuration, an irregular broken surface formed during breakage of the breaking layer 108 can prevent reading of the information stored in the relief structure 103. Furthermore, unauthorized reuse of the verification layer 107 is also prevented. On the other hand, as in an SEM photograph shown in FIG. 28B, in a state in which the adhesive layer 109 contains no silica filler, no irregular broken surface formed on the breaking layer 108 can be observed. The silica filler may have a regular shape as a constant shape, or an irregular shape. The regular shape of the filler may be a spherical shape, a needle shape, or a flat shape.

In the security patch 102, each of the adhesive layer 109 in contact with the protective sheet 105 and the verification layer 107 in contact with the information recording sheet 106 may contain a filler different from the filler contained in the breaking layer 108. By providing the filler in these components of the security patch 102, it is possible to prevent the occurrence of burrs caused by separation of an undesired portion in the step of forming the security patch 102 on the surface of the protective sheet 105 by transfer (described later). The material and shape of the filler contained in the adhesive layer 109 and the verification layer 107 may be different from those of the filler contained in the breaking layer 108. The difference in properties between the filler contained in the adhesive layer 109 and the verification layer 107 and the filler contained in the breaking layer 108 allows more reliable breakage of the breaking layer 108.

In the fourth embodiment, a silica filler is described as an example of the filler contained in the breaking layer 108, but the filler contained in the breaking layer 108 is not limited to this. The filler may be one or a mixture of an organic filler and an inorganic filler. The filler may be a mixture of particles having different average particle sizes, or may contain particles having different shapes. The filler may be composed of an organic material such as a polyethylene powder or acrylonitrile fine particles. As with the filler contained in the breaking layer 108, the filler contained in the adhesive layer 109 and the verification layer 107 may be one or a mixture of an organic filler and an inorganic filler.

In the security patch 102, the adhesive layer 109, the breaking layer 108, and the verification layer 107 may not necessarily be a single layer, and may have a multilayer structure including an intermediate layer and the like.

FIG. 24 is a schematic cross-sectional view illustrating a state in which the security patch 102 is separated from the protective sheet 105 in the cross section shown in FIG. 23. As shown in FIG. 24, when the laminate 101 of the fourth embodiment is damaged to extract by unauthorized means the verification layer 107 enclosed in the security patch 102, cohesive failure occurs in the breaking layer 108 having a low breaking strength (a strength of 15 N/25 mm or more and less than 45 N/25 mm) or in the vicinity of the surface relief 104. In this case, a portion of the broken breaking layer 108, the verification layer 107, and the relief structure 103 that is enclosed by the portion of the broken breaking layer 108 and the verification layer 107 remain integrally adhered to the information recording sheet 106. In the fourth embodiment, the security patch 102 has a significantly smaller thickness than the information recording sheet 106, and this makes it difficult to separate the security patch 102 from the information recording sheet 106 having a thickness of 50 μm to 800 μm without damaging the relief structure 103 of the security patch 102. Thus, even when the laminate 101 is damaged by unauthorized means as shown in FIG. 24, it is possible to prevent reuse of the verification layer 107 in which the information is recorded in which it is separated from the security patch 102 and the information recording sheet 106.

In conventional unauthorized tampering with personal information of a card including a relief structure in which the personal information is stored, the verification layer 107 is completely separated and extracted from a portion of a genuine product displaying personal information, and the extracted verification layer is adhered onto a portion of a card displaying the tampered personal information. A measure for preventing such tampering may be a card configured such that a laser color developing material and a relief structure in which personal information is written are firmly adhered and cannot be separated. In general, when the verification layer 107 is extracted from the card by unauthorized means, a security patch enclosing the relief structure starts to be separated from an interface having a low adhesion strength, or starts to be broken from a portion having a low breaking strength.

In the laminate 101 of the fourth embodiment, the breaking strength of the breaking layer 108 is 15 N/25 mm or more and less than 45 N/25 mm. Thus, as described above, when the laminate 101 is damaged, cohesive failure occurs in the breaking layer 108 or in the vicinity of the surface relief 104. Furthermore, in the laminate 101 of the fourth embodiment, the adhesion strength between the security patch 102 and the information recording sheet 106 and the adhesion strength between the security patch 102 and the protective sheet 105 are preferably higher than the breaking strength of the breaking layer 108 by 5 N/25 mm or more and are five times or less the breaking strength of the breaking layer 108. In such a case, when extraction of the security patch 102 from the laminate 101 is attempted, breakage occurs in the breaking layer 108 or in the vicinity of the surface relief 104 of the security patch 102. Furthermore, the breaking layer 108 of the laminate 101 described as the fourth embodiment contains a transparent resin and a filler composed of particles having an average particle size of 1 μm or less. Thus, even when the breaking layer 108 is damaged, it is difficult to extract, from the broken surface, the information stored in the relief structure 103 of the security patch 102. That is, the laminate 101 of the fourth embodiment can eliminate the possibility that the adhesive structure may be damaged at the interface between the security patch and the protective sheet (protective material) and that the adhesive structure may be damaged at the interface between the security patch and the information recording sheet (laser color developing material) as in a conventional laminate.

Fifth Embodiment

Figure 25:
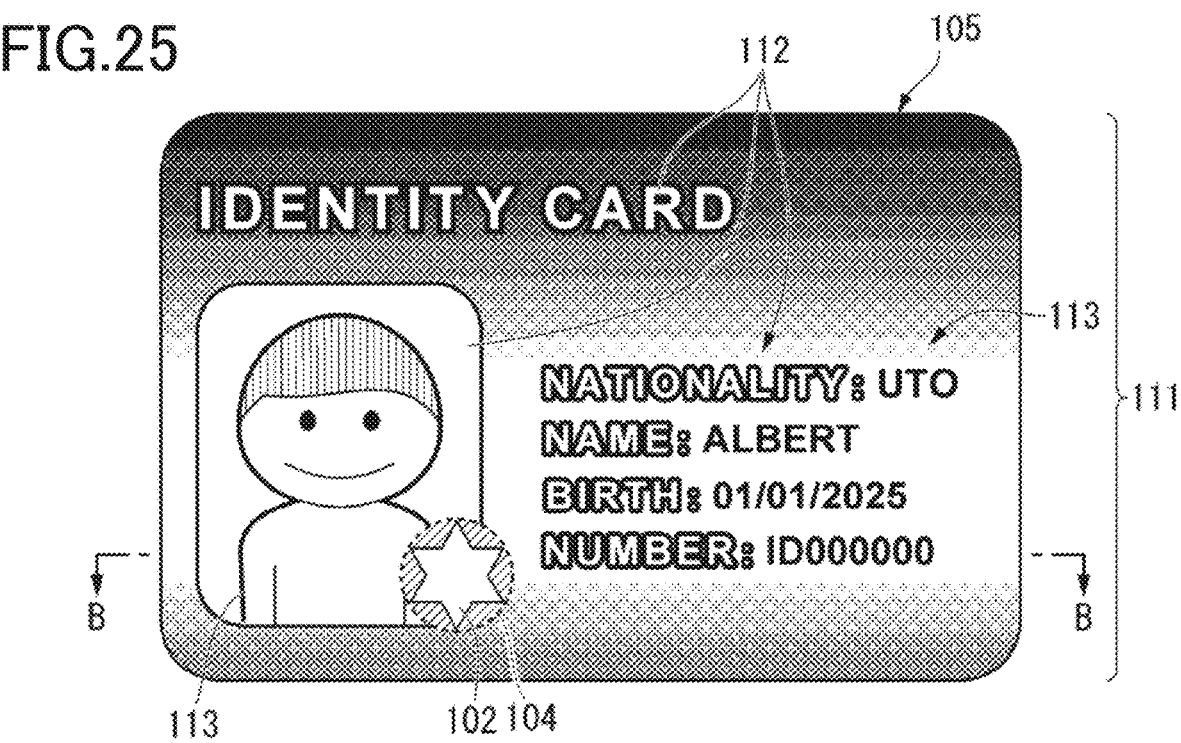
FIG. 25 is a schematic plan view illustrating a configuration of a card of the present invention.
Figure 26:
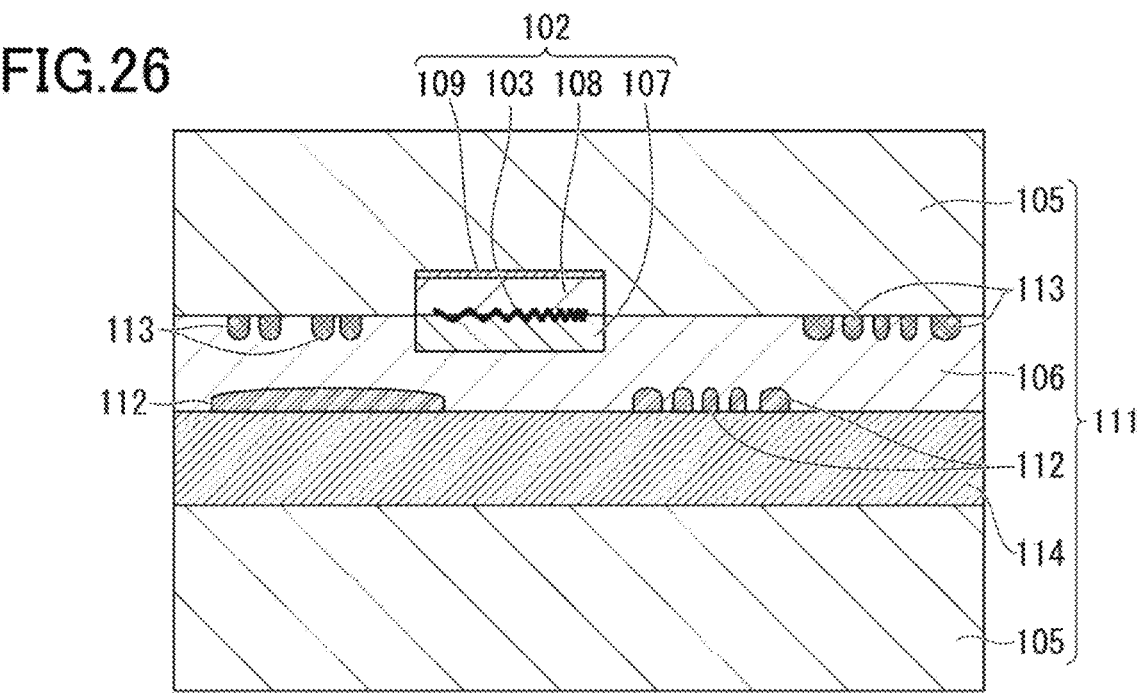
FIG. 26 is a cross-sectional view of the card taken along line B-B of FIG. 25.

Details of a card of an embodiment of the present invention will be described below as the fifth embodiment with reference to FIGS. 25 and 26. FIG. 25 is a schematic plan view illustrating a configuration of a card 111. A card having the same configuration as the card 111 may be used as a data page of a passport or a visa. FIG. 26 is a cross-sectional view of the card 111 taken along line B-B of FIG. 25.

As shown in FIG. 26, in the card 111 described in the fifth embodiment, the protective sheet 105, the information recording sheet 106, a white material layer 114, and the protective sheet 105 that have a card shape are provided in this order in the thickness direction of the card 111. The card 111 of the fifth embodiment is different from the laminate 101 of the fourth embodiment in that the white material layer 114 and the protective sheet 105 are further sequentially provided at a position closer to the rear side than the information recording sheet 106 is in the thickness direction of the card 111. As in the laminate 101 described in the fourth embodiment, in the security patch 102, the adhesive layer 109, the broken layer 108, and the certification layer 107 are laminated in this order in a direction from the protective sheet 105 toward the information recording sheet 106, i.e., the thickness direction of the card 111, and the relief structure 103 is provided between the fracture layer 108 and the certification layer 107. The security patch 102 has the same configuration as in the fourth embodiment, and thus detailed description thereof will be omitted.

In the card 111, in addition to the relief structure 103 of the security patch 102, a printing layer 112 and the laser engraving 113 are provided to record information. As shown in FIG. 26, the security patch 102 and the laser engraving 113 are provided in a boundary portion formed by adhering the protective sheet 105 to the information recording sheet 106. On the other hand, the printing layer 112 is provided in a boundary portion formed by adhering the information recording sheet 106 to the white material layer 114. That is, in the card 111 of the fifth embodiment, the security patch 102 and the laser engraving 113 are enclosed by the protective sheet 105 and the information recording sheet 106. On the other hand, the printing layer 112 is enclosed by the information recording sheet 106 and the white material layer 114. As shown in FIG. 25, in the card 111 of the fifth embodiment, the protective sheet 105 and the information recording sheet 106 have optical transparency to at least visible light so that the laser engraving 113 and the printing layer 112 can be confirmed by visual observation or machine recognition. The information recording sheet 106 may be translucent.

In the card 111, the printing layer 112 is provided in a desired color on the entire surface or in a pattern such as characters and designs in order to provide information to be given. The printing layer 112 may be composed of an ink. Printing of the printing layer 112 can affect a breakage state of the breaking layer 108. The ink used to form the printing layer 112 may be an offset ink, a letterpress ink, a gravure ink, or the like depending on the printing method. The ink may be a resin ink, an oil-based ink, or a water-based ink depending on the difference in composition. Furthermore, the ink may be an oxidative polymerization type ink, a penetration drying type ink, an evaporation drying type ink, or an ultraviolet curable ink depending on the difference in drying method. The printing layer 112 may be composed of a functional ink that changes color according to the light illumination angle or the observation angle. Such a functional ink may be an optically variable ink, a color-shifting ink, or a pearl ink. The printing layer 112 composed of such a functional ink allows the card 111 to have higher resistance to counterfeiting.

The printing layer 112 may be formed by an electrophotographic method using toner. In such a case, the printing layer 112 can be formed by preparing toner in which color particles of graphite, a pigment, or the like are adhered to plastic particles having electrostatic properties, and using static electricity to transfer the toner to an object on which the printing layer 112 is to be printed, followed by fixing the toner by heating.

The white material layer 114 is formed to provide white opacity to the card 111. White opacity is provided to allow the printing layer 112 and the laser engraving 113 to be easily observed, and to hide a component for storing information such as an IC chip. The white material layer 114 is preferably composed of a material containing a polyvinyl chloride material, an amorphous copolyester material, or a polycarbonate material, and a white material such as titanium oxide.

The white material layer 114 preferably has a thickness of 200 μm or more and 800 μm or less. If the thickness of the white material layer 114 is less than 200 μm, the white material layer 114 has insufficient white opacity, and this makes it difficult to achieve desired performance. On the other hand, if the thickness of the white material layer 114 is more than 800 μm, during processing of the white material layer 114, thickness variation and bending of the white material layer 114 have a great influence, thus making the processing difficult, which is not preferable.

When the card 111 according to the present invention is damaged by unauthorized means to extract the security patch 102 including the relief structure 103, cohesive failure occurs in the breaking layer 108 having a low breaking strength or in the vicinity of the surface relief 104. Thus, the relief structure 103 remains adhered to the information recording sheet 106. In the card 111 of the fifth embodiment, the printing layer 112 and the laser engraving 113 in which the information is recorded are provided on the information recording sheet 106 side; thus, for tampering and unauthorized use of the information recorded in the card 111, the security patch 102 is required to be separated from the information recording sheet 106. However, as in the laminate 101 according to the fourth embodiment, it is significantly difficult to separate the security patch 102 from the information recording sheet 106 having a large thickness while maintaining the relief structure 103 in the security patch 102 having a small thickness. On the other hand, in the protective sheet 105 separated from the security patch 102, no information is recorded or only incomplete information remains, and thus there is no risk of unauthorized reuse of the protective sheet 105.

Sixth Embodiment

Figure 27A:
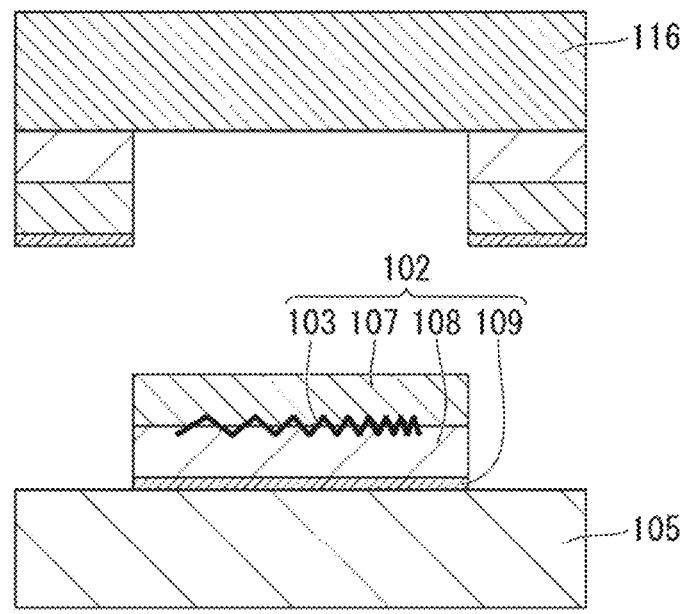
FIG. 27A is a diagram illustrating a method of producing a medium of the present invention.
Figure 27B:
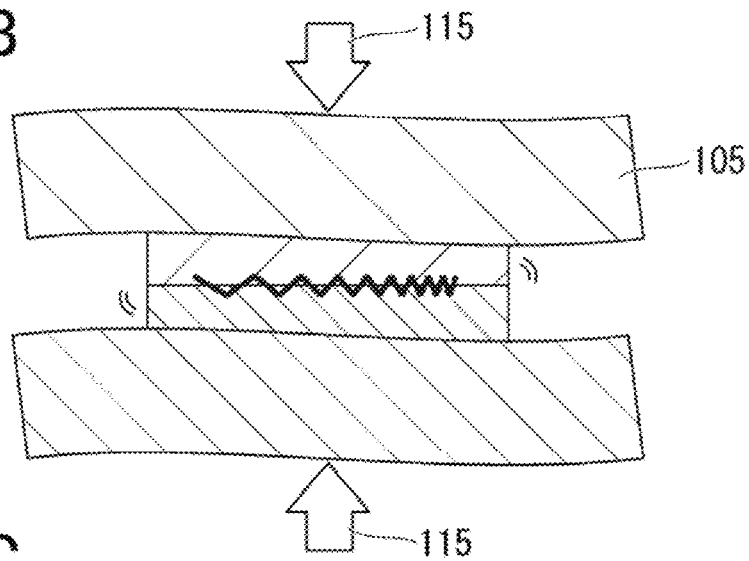
FIG. 27B is a diagram illustrating the method of producing the medium of the present invention.
Figure 27C:
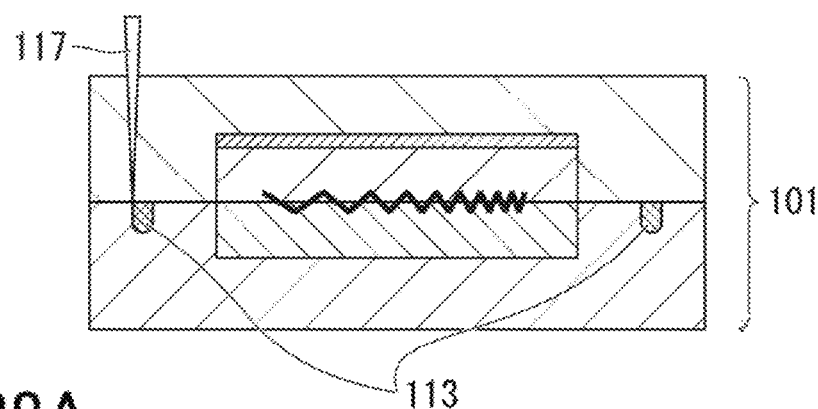
FIG. 27C is a diagram illustrating the method of producing the medium of the present invention.

A method of producing the laminate 101 of the fourth embodiment and the card 111 of the fifth embodiment will be described below with reference to FIGS. 27A to 27C. FIGS. 27A to 27C are schematic cross-sectional views illustrating the method of producing the laminate 101 of the fourth embodiment of the present invention.

FIG. 27A shows the step of forming the security patch 102 on the surface of the protective sheet 105 by transfer. More specifically, when an appropriate external force (heat, pressure, etc.) 115 is applied from a carrier 116 side to the security patch 102 held by the carrier 116, the adhesive layer 109 of the security patch 102 is adhered to the protective sheet 105, and a part of the security patch 102 is separated from the carrier 116 and transferred to the protective sheet 105 surface side. FIG. 27A shows the step of transferring the security patch 102 to the surface of the protective sheet 105, but in the sixth embodiment, the security patch 102 may be transferred to the surface of the information recording sheet 106.

The step of transferring the security patch 102 to the surface of the protective sheet 105 is preferably performed using a metal or resin stamper under the transfer conditions of a stamper surface temperature of approximately 80° C. to 150° C., a stamper contact time of 0.1 seconds to 3 seconds, and a transfer pressure of 100 to 500 Kg/cm$^2$. If the temperature, time, or pressure exceeds the values in the above conditions, an excessive amount of heat may cause transfer of an unintended portion of the security patch 102. Furthermore, an excessive amount of heat may cause unintended thermal deformation on the surface of the protective sheet 105 that is a transfer object to which the security patch 102 is transferred. On the other hand, if the temperature, time, or pressure is less than the values in the above conditions, the security patch 102 may not be appropriately adhered and transferred to the protective sheet 105. Thus, in order to prevent partial or complete transfer failure in the transfer step, appropriate transfer conditions are required to be selected as appropriate. The security patch 102 according to the above embodiments of the present invention can be successfully transferred to the surface of the protective sheet 105 under the transfer conditions described above.

The carrier 116 is provided to hold the security patch 102 before transfer. The carrier 116 is preferably a plastic film. More specifically, the carrier 116 may be a film of plastic such as PET (polyethylene terephthalate), PEN (polyethylene naphthalate), or PP (polypropylene). However, the carrier 116 is preferably composed of a material that is less likely to be deformed or modified by the external force 115 such as heat or pressure applied when the security patch 102 is supported by the carrier 116. Depending on the usage or purpose, the carrier 116 may be composed of paper, synthetic paper, plastic multilayer paper, resin-impregnated paper, or the like. In the sixth embodiment, the carrier 116 preferably has a thickness of 4 µm or more. More preferably, the carrier 116 has a thickness of 12 µm or more and 50 µm or less. If the thickness of the carrier 116 is less than 4 µm, the carrier 116 has insufficient physical strength, thus making handling difficult.

Although not shown in FIGS. 27A to 27C, the security patch 102 does not need to be directly in contact with the carrier 116, and an intermediate layer may be added between the carrier 116 and the security patch 102. In such a case, by adjusting the conditions such as the thickness or material of the intermediate layer, the amount of force applied to separate the security patch 102 from the carrier 116 can be controlled.

FIG. 27B shows a step of applying the appropriate external force 115 to adhere, to the information recording sheet 106, the layers produced by transferring the security patch 102 to the protective sheet 105 in the step shown in FIG. 27A. As shown in FIG. 27B, the protective sheet 105, the security patch 102, and the information recording sheet 106 are adhered together so that the security patch 102 is sandwiched between the protective sheet 105 and the information recording sheet 106.

In the step shown in FIG. 27B, in order for the protective sheet 105, the security patch 102, and the information recording sheet 106 to be sufficiently adhered together, an amount of heat enough to at least soften and deform these components is required.

The amount of heat applied to adhere together the protective sheet 105, the security patch 102, and the information recording sheet 106 in the adhesion step shown in FIG. 27B is sufficiently large as compared with the amount of heat applied in the transfer step shown in FIG. 27A. More specifically, when these components are composed of a material containing polycarbonate, softening and deformation of the polycarbonate require a time of approximately 1 minute to 30 minutes and an amount of heat at a heat source temperature of 170° C. to 200° C. The laminate 101 according to the embodiments of the present invention is not damaged under these conditions in the adhesion step, and successfully functions after the adhesion step.

In the sixth embodiment, FIG. 27B shows the laminate including only the security patch 102, the protective sheet 105, and the information recording sheet 106. However, the card 111 according to the fifth embodiment of the present invention shown in FIGS. 25 to 26 may be produced by further laminating, for example, the white material layer 114 provided with the printing layer 112 on the information recording sheet 106 side, followed by application of the external force 115 to adhere the components together. In the sixth embodiment, when the security patch 102 is transferred to the information recording sheet 106, the external force 115 may be applied to the protective sheet 105 so that the security patch 102 is sandwiched between the protective sheet 105 and the information recording sheet 106 to which the security patch 102 has been transferred. When the adhesion step shown in FIG. 27B is completed, as shown in FIG. 27C, the security patch 102 is enclosed by the protective sheet 105 and the information recording sheet 106 so that the security patch 102, the protective sheet 105, and the information recording sheet 106 are integrated together.

Next, in a step shown in FIG. 27C, the laser engraving 113 is formed by irradiating the information recording sheet 106 with a laser beam 117. Thus, the laminate 101 according to the fourth embodiment of the present invention can be formed. Although not shown, the card 111 according to the fifth embodiment of the present invention can be formed by the same method.

In the sixth embodiment, the adhesion strength between the security patch 102, the protective sheet 105, and the information recording sheet 106 may be adjusted to be higher than 50 N/25 mm. Thus, when only the relief structure 103 is extracted by unauthorized means, cohesive failure occurs in the breaking layer 108 or in the vicinity of the surface relief 104 in the security patch 102 including the relief structure 103, and this makes it difficult to reuse the relief structure 103 tampered with by unauthorized means.

Seventh Embodiment

Figure 29:
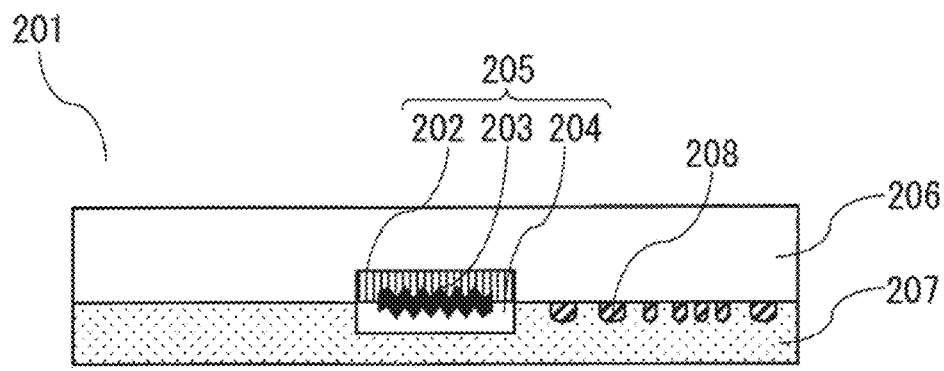
FIG. 29 is a schematic cross-sectional view of a card information recording sheet of the present invention.

A card information recording sheet and a card including the card information recording sheet of an embodiment of the present invention will be described below as the seventh embodiment with reference to FIGS. 29 and 30. FIG. 29 is a schematic cross-sectional view of a card information recording sheet 201 of the present invention. A protective sheet 206 is laminated on an information recording sheet 207, and a security patch 205 is enclosed between the information recording sheet 207 and the protective sheet 206. The information recording sheet 19 described above may be the information recording sheet 206. The relief structure layer 103 described later may be the relief forming layer 14. The protective sheet 206 described later may be a protective substrate layer 18. The information recording sheets 106 and 207 described later may be the information recording sheet 19.

The information recording sheet 207 is composed of a material to be modified by absorption of a laser beam that has a specific wavelength and is used to record information. The modification is direct modification by a laser beam or indirect modification by heat generated by absorption of a laser beam, and is a phenomenon of one or a combination of foaming, carbonization, color change, and the like of the material. By irradiating the information recording sheet 207 with a laser beam that has an intensity and an irradiation spot size adjusted to a predetermined value, the material of the information recording sheet 207 is modified and the color of a portion of the information recording sheet 207 is changed, allowing recording of information in the portion of the information recording sheet 207 as a modified zone 208.

The laser used to record information may be a solid-state laser. The laser may be a pulsed laser or a continuous laser. The laser may have a single wavelength or multiple wavelengths. The laser may be an Nd-YAG wavelength conversion ultraviolet laser (wavelength: 380 nm), a fiber laser (wavelength: 1064 nm), or a YAG laser (wavelength: 1064 nm).

The information to be recorded in the information recording sheet 207 may be identification information. A laser recording material for forming the information recording sheet 207 may be a polycarbonate material containing an energy absorber that absorbs a laser beam used to record information. Such a material is modified when the polycarbonate is chemically changed by heat generated by absorption of a laser beam. A specific example of the laser recording material is SD8B94 of the LEXAN series (registered trademark) manufactured by SABIC.

The information recording sheet 207 has a matrix phase composed of polycarbonate as a heat-resistant base material, and a dispersed phase composed of a polyester resin that is more easily softened than polycarbonate. Addition of the energy absorber that absorbs a laser used to record information to the polycarbonate allows the polycarbonate to be chemically changed by heat generated by absorption of a laser and change the color. The polyester resin may be an amorphous polyester resin having a glass transition point Tg of −20° C. to 110° C., at which the polyester resin can be adhered to the matrix phase. The use of an amorphous polyester resin achieves higher adhesion to the security patch.

The ratio of the dispersed phase composed of a polyester resin is preferably 5 wt % or more and 30 wt % or less. If the ratio of the dispersed phase is less than 5 wt %, no substantial effect is obtained, and if the ratio of the dispersed phase exceeds 30 wt %, stress generated by bending or the like may cause separation. The domain of the dispersed phase preferably has an average particle size of 0.1 µm or more and 10 µm or less.

When the polycarbonate resin of the matrix phase is modified by laser irradiation, the adhesion to the polyester resin of the dispersed phase is reduced. Thus, when the laser engraving layer is separated for tampering, the information recording sheet is damaged, preventing tampering. On the other hand, the portion at which the security patch 205 is provided is not irradiated with a laser and the adhesion to the information recording sheet is unchanged, and this makes it difficult to separate the security patch 205 from the information recording sheet.

The information recording sheet 207 preferably has a thickness of 50 µm or more and 800 µm or less. If the thickness of the information recording sheet 207 is less than 50 the information recording sheet 207 causes insufficient color development of the laser engraving, and this leads to poor contrast between a modified zone and an unmodified portion. On the other hand, if the thickness of the information recording sheet 207 is more than 800 the information recording sheet 207 causes an appearance with poor transparency and enhanced black, and this leads to poor contrast between a modified zone and an unmodified portion.

The protective sheet 206 only needs to have transparency to visible light so that the security patch 205 and the modified zone 208 provided under the protective sheet 206 can be confirmed with the naked eye. The protective sheet 206 may be a transparent sheet composed of a thermoplastic plastic such as a polycarbonate sheet. The protective sheet 206 preferably has a thickness of 50 µm or more and 800 µm or less. If the thickness of the protective sheet 206 is less than 50 the protective sheet 206 has insufficient physical strength. If the thickness of the protective sheet 206 is more than 800 during processing of the protective sheet 206, thickness variation and bending of the protective sheet 206 have a great influence, thus making the processing difficult.

In the security patch 205, for example, a patch substrate 204, a relief forming layer 203, and a breaking layer 202 may be laminated. On the patch substrate 204, the relief forming layer 203 composed of a diffraction grating or a hologram is provided, and the breaking layer 202 is laminated on the relief forming layer 203. A metal thin film, or an oxide thin film having a high refractive index may be laminated on the relief forming layer 203 to increase the visibility of the relief. The breaking layer 202 may be composed of, for example, an adhesive, and only needs to have an effect of damaging the relief forming layer 203 during tampering, for example, during extraction of the security patch.

The relief forming layer 203 may be composed of a thermoplastic resin, a thermosetting resin, or a photocurable resin. As a synthetic resin for forming the relief forming layer 203, a synthetic resin for forming the relief forming layer 14 according to the above embodiment may be used. The relief forming layer 203 is not limited to a single layer, and may be a multilayer. The relief forming layer 203 as a multilayer may be a laminate of a curable resin and a thermoplastic resin. The thermoplastic resin may contain polymethylmethacrylate or an acid-modified polyolefin. Alternatively, the relief forming layer 203 as a multilayer may include thermoplastic resin layers having different physical properties. Alternatively, the relief forming layer 203 may contain an inorganic powder or a polymer powder. By containing a powder in the relief forming layer 203, the interfacial adhesion strength between the relief forming layer 203 and the patch substrate 204 can be controlled. Thus, the relief forming layer 203 may have a curable resin layer on the relief structure side and have a thermoplastic resin layer containing an inorganic powder or a polymer powder on the opposite side. The relief forming layer 203 may contain a resin having a higher melting point than the protective sheet.

The relief forming layer 203 has either or both of concavities and convexities. As a laminated optical structure, the relief forming layer 203 has optical properties such as diffraction properties, light reflection preventing properties, isotropic or anisotropic light scattering properties, refraction properties, polarization/wavelength selective reflection properties, transmission properties, and light reflection preventing properties. For example, the relief structure has light diffraction properties when the relief structure includes a lacquer layer provided with a region having a diffraction-grating structure with a pitch of 0.5 µm or more and 2 µm or less and a depth of 0.05 µm or more and 0.5 µm or less. The relief forming layer 203 has light reflection preventing properties, polarization/wavelength selective reflection properties, transmission properties, and light reflection preventing properties when the relief forming layer 203 includes a moth-eye structure or a deep grating structure with a pitch of 0.1 µm or more and 0.5 µm or less and a depth of 0.25 µm or more and 0.75 µm or less. The relief structure has isotropic or anisotropic light scattering properties when the relief forming layer 203 includes a region having a non-periodic linear or dotted repetitive structure with an average pitch of 0.5 µm or more and 3 µm or less and a depth of 0.05 µm or more and 0.5 µm or less. The relief forming layer 203 has refraction properties when the relief forming layer 203 includes a region having a structure with an average pitch of more than 3 µm and a depth of more than 0.5 and the relief forming layer 203 has a refractive index different from that of the adjacent layer.

The optical properties of the relief forming layer 203 can be perceived and detected by visual observation or machine detection. The optical properties of the relief forming layer 203 can improve the effect of preventing counterfeiting and tampering, and improve the designability. The optical effect of the relief structure allows display of an image that can be visually recognized by an observer. Examples of the image include a portrait, a landmark motif, a natural motif, a calligraphy letter, a geometric pattern, a character, a number, a signal, a sign, a symbol, an emblem, a coat of arms, a code, and a combination thereof. Examples of the symbol may be those described in the above embodiment.

The material of the protective sheet 202 may contain at least one material from a second group consisting of polyurethane, polymethyl acrylate, polyester, acid-modified polyolefin, and an ethylene-vinyl acetate copolymer resin.

A reflective layer may be provided between the breaking layer 202 and the relief forming layer 203. The material of the reflective layer may be a metal or a dielectric material. In the former case, the reflective layer may be an opaque reflective layer, and in the latter case, the reflective layer may be a translucent reflective layer. Examples of the metal include aluminum and silver. The dielectric material may be a metal compound, silicon oxide, or the like. The metal compound may be a metal oxide, a metal sulfide, or a metal fluoride. Examples of the metal compound include zinc oxide, titanium oxide, niobium oxide ($NbO_2$), and zinc sulfide. When the reflective layer is composed of two layers, i.e., the first reflective layer and the second reflective layer, two types of materials may be selected from the above materials, and for example, silicon dioxide may be selected to form the first reflective layer and titanium dioxide may be selected to form the second reflective layer.

When the dielectric material has a refractive index of 2.0 or more for visible light, the refractive index difference between the relief forming layer 203 and the reflective layer is easily obtained, and reflected light generated according to the shape of the relief structure has a high reflectance, thus allowing an observer to visually recognize the image easily. The reflective layer may be formed by a deposition method. The deposition method may be one or both of a physical deposition method and a chemical deposition method. The physical deposition method may be vacuum deposition or sputtering. The reflective layer preferably has a thickness of 10 nm or more and 200 nm or less.

As the material of the patch substrate 204, a material for forming the relief forming layer 203 may be used. In particular, the material of the adhesive layer 17 may contain at least one of polymethylmethacrylate, polyester, cyclic polyolefin, melamine, and an ethylene-vinyl acetate copolymer resin. By forming an adhesive layer in the patch substrate, these materials easily achieve sufficient interfacial adhesion strength between the patch substrate and a layer containing polycarbonate in contact with the patch substrate. The material for forming the adhesive layer may be a resin having a carbonate bond (—O—CO—O—), a urethane bond (—NH—CO—), or an ester bond (—O—CO—). In the adhesion to polycarbonate, the interfacial adhesion strength tends to be high between polycarbonate and a resin having an ester bond or a urethane bond, which has a structure similar to that of a carbonate bond.

Figure 30:
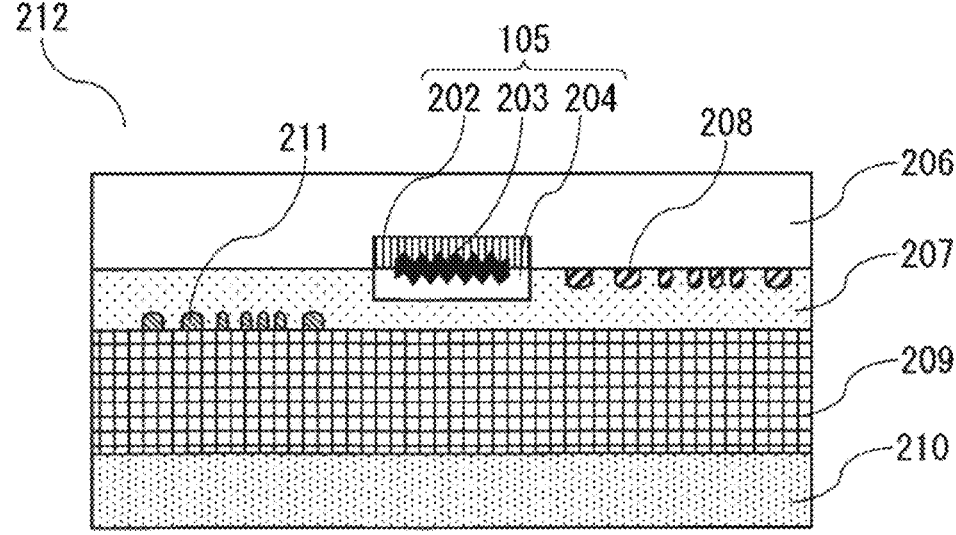
FIG. 30 is a schematic cross-sectional view of a card of the present invention.

FIG. 30 is a schematic cross-sectional view of an example of a card 212 including the card sheet of the present invention. In the card 212, a white material layer 209 provided with a printed part 211, a rear-surface protective film 210, and the card sheet 201 are laminated.

The white material layer 209 is formed to provide white opacity to the card 212. The white opacity is a characteristic for easily observing the printing unit 211 and the modified zone 208 and hiding the configuration for storing information such as an IC chip. The white material layer 209 is preferably composed of, for example, a material containing a polyvinyl chloride material, an amorphous copolyester material, or a polycarbonate material, and an appropriate amount of white material such as titanium oxide.

The white material layer 209 preferably has a thickness of 200 μm or more and 800 μm or less. If the thickness of the white material layer 209 is less than 200 μm, the white material layer 209 has insufficient white opacity, and this makes it difficult to achieve desired performance. If the thickness of the white material layer 209 is more than 800 μm, during processing of the white material layer 209, thickness variation and bending of the white material layer 209 have a great influence, which is not preferable.

The printed part 211 may have an arbitrary color. The printed part 211 may be provided on the entire surface of the white material layer 209, or may be locally provided as a character, a design, a geometric pattern, a number, a signal, a code, or the like. The material for forming the printed part 211 may be an ink. The ink may be an offset ink, a letterpress ink, a gravure ink, or the like depending on the printing method. The ink may be a resin ink, an oil-based ink, or a water-based ink depending on the difference in composition. Furthermore, the ink may be an oxidative polymerization type ink, a penetration drying type ink, an evaporation drying type ink, or an ultraviolet curable ink depending on the difference in drying method. The printed part 211 may be composed of a functional ink that changes color according to the light illumination angle or the observation angle. Such a functional ink may be an optically variable ink, a color-shifting ink, or a pearl ink. The functional ink may have magnetic properties. The printed part 211 composed of such a functional ink allows the card 212 to have higher resistance to counterfeiting.

The rear-surface protective film 210 may be the same component as the protective sheet 206.

The configuration shown in FIG. 29 may be applied to the first to sixth embodiments described above. The information recording sheet 106 described above may be applied instead of the information recording sheet 207, and the protective sheet 105 described above may be applied instead of the protective sheet 206. In such a case, the material for forming the information recording sheet 207 can be applied to the information recording sheet 106. Furthermore, the information recording sheet 19 described above may be applied instead of the information recording sheet 207, and the protective sheet 18 described above may be applied instead of the protective sheet 206. In such a case, the material for forming the information recording sheet 207 can be applied to the information recording sheet 19.

(Manufacturing Method)

The security patch 205 is produced from a transfer foil in which on a carrier film, the patch substrate 204, the relief forming layer 203, the reflective layer, and the breaking layer 202 are laminated in this order. As described above, the reflective layer may be formed by a deposition method. The deposition method may be one or both of a physical deposition method and a chemical deposition method. The physical deposition method may be vacuum deposition or sputtering. Each of the other layers can be formed by applying a coating liquid, followed by drying in an oven.

In the present embodiment, the relief forming layer 203 has concavities and convexities. The concavities and convexities can be obtained by applying a coating film containing a synthetic resin for forming the relief forming layer 203, and then using a stamper (an embossing plate) having the concavities and convexities to transfer the concavo-convex shape to the coating film.

The embossing plate for transferring the concavities and convexities to the relief forming layer 203 can be obtained by the following method. First, an original plate is obtained by a photolithography process in which a photosensitive resist is applied to one surface of a plate-shaped substrate, and then the photosensitive resist is irradiated with a beam to expose a part of the photosensitive resist, followed by development of the photosensitive resist. Then, the original plate is used to produce a metal stamper by electroplating or the like. The metal stamper is the embossing plate, and serves as a mold for replicating the relief. The metal stamper can also be obtained, for example, by cutting a metal substrate using a lathe. However, when the relief has a complicated shape or is a very fine structure in a subwavelength order, cutting processing is difficult and the photolithography process described above is used to produce the metal stamper.

When an appropriate external force (heat, pressure, etc.) is applied from the carrier side to the transfer foil including the security patch on the carrier, the breaking layer is adhered to the protective sheet, and at the same time, the patch substrate 204 is separated from the carrier; thus, the security patch composed of the patch substrate 204 and the layers under the patch substrate 204 is transferred to the protective sheet.

The carrier is a film provided to hold the security patch before transfer, and is preferably a plastic film. Specifically, the carrier 24 may be a film of plastic such as PET (polyethylene terephthalate), PEN (polyethylene naphthalate), or PP (polypropylene). The carrier preferably has a thickness of 4 µm or more. More preferably, the carrier has a thickness of 12 µm or more and 50 µm or less. If the thickness of the carrier is less than 4 µm, the carrier has insufficient physical strength, thus making handling difficult.

A transfer step can be performed using a metal or resin stamper under the transfer conditions of a stamper surface temperature of approximately 80° C. to 150° C., a stamper contact time of 0.1 seconds to 3 seconds, and a transfer pressure of 100 to 500 kg/cm². When the temperature, the contact time, and the transfer pressure are set to be equal to or less than the respective upper limits, it is possible to prevent an excessive amount of heat from causing transfer of a portion around the transfer foil to a transfer object to which the transfer foil is transferred or causing deformation of the surface of the transfer object. When the temperature, the contact time, and the transfer pressure are set to be equal to or greater than the respective lower limits, it is possible to prevent insufficient adhesion of the transfer foil to the transfer object from causing incomplete transfer of the transfer foil to the transfer object.

The information recording sheet 207 to which the security patch 205 composed of the transfer foil has been transferred is provided with the white material layer 209 serving as a support on the surface of the information recording sheet 207 facing away from the security patch 205. At least the printed part 211 is provided on the surface of the white material layer 209. When the top surface and the bottom surface of the laminated layers are covered with the protective sheet 206 and the rear-surface protective film 210, followed by application of heat and pressure to the entire layers to adhere all the layers together and enclose the security patch 205 between the information recording sheet 207 and the protective sheet 206. In this adhesion step, the temperature of the heat source applying heat to the layers may be set to 170° C. or more and 200° C. or less, and the contact time of the heat source with the layers may be set to 1 minute or more and 30 minutes or less. Thus, the information recording sheet 207 and the protective sheet 206 containing polycarbonate can be reliably adhered to each other.

When the adhesion step is completed, a card including the integrated layers is formed. An arbitrary portion of the information recording sheet 207 is irradiated with a laser beam via the surface of the card, i.e., the protective sheet. Through this irradiation step, the modified zone 208 is formed in the information recording sheet 207. The region to be irradiated with a laser beam is determined depending on information to be displayed by the modified zone 208. The modified zone 208 displays, for example, characters or numbers representing personal information such as a name, date of birth, or personal identification number, or an image such as a facial image or a two dimensional code. Through the above steps, the card 212 is formed.

When the material constituting the information recording sheet 207 is applied to the information recording sheet 106 described above, the same effects as in the seventh embodiment can also be obtained in a structure including the information recording sheet 106.

When the material constituting the information recording sheet 207 is applied to the information recording sheet 19 described above, the same effects as in the seventh embodiment can also be obtained in a structure including the information recording sheet 19.

EXAMPLES

The laminate 101 according to the fourth embodiment of the present invention and the card 111 according to the fifth embodiment of the present invention will be further described below by way of examples and comparative examples. The present invention is not limited only to the specific contents of the examples described below. In the following description, the term "part(s)" refers to part(s) by mass and the term "ratio" refers to mass ratio unless otherwise specified.

Example 1

The card 111 of the fifth embodiment shown in FIGS. 25 and 26 was produced according to the steps shown in FIGS. 27A to 27C.

(Laminate with Carrier)

A method of producing a laminate with a carrier will be described below. A PET film having a thickness of 25 µm was used as the carrier 116. One surface of the carrier 116 was coated by gravure printing with an ink A obtained by dissolving the verification layer 107 in contact with the information recording sheet 106 in a solvent. The solvent in the ink A was volatilized and removed so that the verification layer 107 had a thickness of 3 µm. Next, the verification layer 107 was subjected to roll forming processing in which a cylindrical metal plate including a relief structure having concavities and convexities with a predetermined height and pitch was pressed against the verification layer 107 at a press pressure of 2 Kgf/cm², a press temperature of 240° C., and a press speed of 10 m/min.

Next, the reflective layer 110 was laminated by vacuum deposition on one surface of the surface relief 104 formed on the verification layer 107. Then, the reflective layer 110 was coated by gravure printing with an ink B obtained by dissolving the breaking layer 108 in a solvent. The solvent in the ink B was volatilized and removed so that the breaking layer 108 had a thickness of 4 µm. Next, the breaking layer 108 was coated by gravure printing with an ink C obtained by dissolving the adhesive layer 109 in a solvent. The solvent in the ink was volatilized and removed so that the adhesive layer 109 had a thickness of 1 μm. Thus, the security patch 102 with the carrier 116 was produced.

(Carrier 116)

Lumirror 25T60 (manufactured by Toray Industries, Inc.)

(Ink A Obtained by Dissolving the Verification Layer 107 in Contact with the Information Recording Sheet 106 in a Solvent)

| Acrylic resin | 20 parts |
|---|---|
| Cellulose acetate | 20 parts |
| Methyl ethyl ketone | 60 parts |
| (Reflective layer 110) | |
| Zinc sulfide (ZnS) | Thickness: 600 Å |

(Ink B Obtained by Dissolving the Breaking Layer 108 in a Solvent)

| Polyacrylic ester | 20 parts |
|---|---|
| Polyester | 10 parts |
| Silica filler (average particle size: 20 nm) | 30 parts |
| Methyl ethyl ketone | 50 parts |
| Toluene | 50 parts |

(Ink C Obtained by Dissolving the Adhesive Layer 109 in a Solvent)

| Polyacrylic ester | 20 parts |
|---|---|
| Polyester | 10 parts |
| Methyl ethyl ketone | 50 parts |
| Toluene | 50 parts |

As shown in FIG. 27A, the security patch 102 with the carrier 116 produced as above was transferred to the protective sheet 105 (LEXAN SD8B14, thickness: 100 μm, melting point: approximately 190° C. (manufactured by SABIC)) using a hot stamp transfer machine, and the carrier 116 was removed. The transfer conditions were a transfer temperature of 140° C., a pressure of 200 Kg/cm², and a transfer time of 1 second.

Next, the information recording sheet 106 (LEXAN SD8B94, thickness: 100 μm, melting point: approximately 190° C. (SABIC)) and the white material layer 114 (LEXAN SD8B24, thickness: 400 μm, melting point: approximately 190° C. (manufactured by SABIC)) with the laser engraving 113 were adhered to the protective sheet 105 to which the security patch 102 had been transferred, to form a laminate structure shown in FIG. 26. The adhesion conditions were application of heat at a temperature of 190° C. and a pressure of 80 N/cm² for 15 minutes. Thus, the protective sheet 105, the information recording sheet 106, and the white material layer 114 were adhered together. Then, these layers were subjected to punching processing to have a card shape, and the laser engraving 113 was formed using a laser engraving machine (fiber laser type, emission wavelength: 1064 nm) to produce the card 111.

Example 2

The security patch 102 and the card 111 were produced to have the same configuration by the same process as in Example 1 except that in production of the security patch 102, the ink obtained by dissolving the breaking layer 108 in a solvent was replaced with the following ink D.

(Ink D Obtained by Dissolving the Breaking Layer 108 in a Solvent)

| Polyacrylic ester | 20 parts |
|---|---|
| Polyester | 10 parts |
| Silica filler (average particle size: 100 nm) | 10 parts |
| Methyl ethyl ketone | 50 parts |
| Toluene | 50 parts |

Comparative Example 1

The security patch 102 and the card 111 were produced to have the same configuration by the same process as in Example 2 except that in production of the security patch 102, the ink obtained by dissolving the breaking layer 108 in a solvent was replaced with the following ink E, and the ink obtained by dissolving the adhesive layer 109 in a solvent was replaced with the following ink F.

(Ink E Obtained by Dissolving the Breaking Layer 108 in a Solvent)

| Polyacrylic ester | 20 parts |
|---|---|
| Polyester | 10 parts |
| Silica filler (average particle size: 20 nm) | 30 parts |
| Methyl ethyl ketone | 50 parts |
| Toluene | 50 parts |

(Ink F Obtained by Dissolving the Adhesive Layer 109 in a Solvent)

| Melamine (melting point: 345° C.) | 20 parts |
|---|---|
| Cellulose acetate (melting point: 200° C.) | 10 parts |
| Polyester (melting point: 70° C.) | 30 parts |
| Methyl ethyl ketone | 80 parts |

The cards 111 produced in Examples 1 and 2 and Comparative Example 1 were evaluated for the following items. In the cards, the 90° peel adhesion strength between the adhesive layer 109 and the protective sheet 105, the 90° peel adhesion strength between the security patch 102 and the information recording sheet 106, and the 90° peel adhesion strength between the adhesive layer 109 and the breaking layer 108 were measured. Furthermore, the difficulty of unauthorized reuse of the cards 111 was evaluated by determining whether the layers were able to be separated at the boundary surface without damage. Furthermore, it was determined whether the visual effect due to the optical properties of the relief structure 103 was changed in the cards 111.

The results will be described with reference to Table 1.

TABLE 1

| | 90° direction adhesion strength between adhesive layer and protective sheet (N/25 mm width) | 90° direction adhesion strength between security patch and information recording sheet (N/25 mm width) | Breaking strength of breaking layer (N/25 mm width) | Average particle size of filler added to breaking layer | Difficulty of unauthorized reuse | Optical effect change in appearance |
|---|---|---|---|---|---|---|
| Example 1 | 50 or more (Material failure) | 50 or more (Material failure) | 17 (Material failure) | 20 nm | Difficult Good | None Good |
| Example 2 | 50 or more (Material failure) | 50 or more (Material failure) | 42 (Material failure) | 100 nm | Difficult Good | None Good |
| Comparative Example 1 | 50 or more (Material failure) | 4.6 (Interfacial separation) | 42 (Material failure) | 100 nm | Easy Poor | None Good |

As shown in Table 1, in Example 1, the adhesion strength between the adhesive layer 109 and the protective sheet 105 and the adhesion strength between the security patch 102 and the information recording sheet 106 were higher than the breaking strength of the breaking layer 108 by 5 N/25 mm width, and these layers were unable to be separated at the boundary surfaces. The breaking strength of the breaking layer 108 was 17 N/25 mm width, and cohesive failure occurred in the breaking layer 108.

The results showed that in Example 1, separation of the security patch 102 from the card 111 was difficult, thus making unauthorized reuse of the card 111 difficult (indicated as "Good" in Table 1). In the card 111 of Example 1, no change in the visual effect was observed (indicated as "Good" in Table 1).

In Example 2, the adhesion strength between the adhesive layer 109 and the protective sheet 105 and the adhesion strength between the security patch 102 and the information recording sheet 106 were higher than the breaking strength of the breaking layer 108 by 5 N/25 mm width, and these layers were unable to be separated at the boundary surfaces. The breaking strength of the breaking layer 108 was 42 N/25 mm width, and cohesive failure occurred in the breaking layer 108. The results showed that separation of the security patch 102 from the card 111 was difficult, thus making unauthorized reuse of the card 111 difficult (indicated as "Good" in Table 1). In the card 111 of Example 2, no change in the visual effect was observed (indicated as "Good" in Table 1).

In Comparative Example 1, the adhesion strength between the adhesive layer 109 and the protective sheet 105 was higher than the breaking strength of the breaking layer 108 by 5 N/25 mm width, and these layers were unable to be separated at the boundary surface. On the other hand, the adhesion strength between the security patch 102 and the information recording sheet 106 was 4.6 N/25 mm width, and the security patch 102 and the information recording sheet 106 were able to be separated at the boundary surface. The breaking strength of the breaking layer 108 was 42 N/25 mm width, and cohesive failure occurred in the breaking layer 108. The results showed that separation of the security patch 102 from the card 111 was easy, thus making unauthorized reuse of the card 111 easy (indicated as "Poor" in Table 1). In the card 111 of Comparative Example 1, no change in the visual effect was observed (indicated as "Good" in Table 1).

The cards 111 of Examples 1 and 2 and Comparative Example 1 were evaluated overall according to the following two criteria: the difficulty of unauthorized reuse and a change in the visual effect due to the optical properties of the relief structure. That is, only when the card 111 passed (indicated as "Good" in Table 1) both of the two criteria, it was determined that the card 111 passed the overall evaluation. On the other hand, when the card 111 allowed unauthorized reuse or when a change in the visual effect occurred in the card 111, it was determined that the card 111 failed the overall evaluation. Thus, it was determined that the cards 111 of Examples 1 and 2 passed the overall evaluation. On the other hand, it was determined that the card 111 of Comparative Example 1 failed the overall evaluation.

The evaluation results of the card 111 of Examples 1 and 2 and Comparative Example 1 will be discussed. In the laminate 101 according to the fourth embodiment of the present invention and the card 111 according to the fifth embodiment of the present invention, when the adhesion strength between the security patch 102 and the protective sheet 105 and the adhesion strength between the security patch 102 and the information recording sheet 106 are higher than 50 N/25 mm and the breaking strength of the breaking layer 108 is 15 N/25 mm or more and less than 45 N/25 mm, cohesive failure occurs in the breaking layer 108, and this makes it difficult to separate, from the card 111, the security patch 102 including the relief structure 103 in which the information is recorded. Thus, unauthorized reuse of the cards 111 of Examples 1 and 2 was difficult.

On the other hand, in the card 111 of Comparative Example 1, the adhesion strength between the security patch 102 and the information recording sheet 106 was 4.6 N/25 mm width, and the security patch 102 and the information recording sheet 106 were able to be separated at the boundary surface. Thus, there was a possibility of unauthorized reuse of the card 111 of Comparative Example 1. Since the possibility of unauthorized reuse cannot be eliminated, it was determined that the card 111 of Comparative Example 1 failed the overall evaluation.

Next, the card sheet according to the seventh embodiment of the present invention will be further described by way of Example 3 and Comparative Example 2. In the following description, the term "wt part(s)" refers to part(s) by mass unless otherwise specified.

Example 3

As a protective sheet of the card sheet of the present invention, a polycarbonate sheet LEXAN SD8B14 (manufactured by SABIC) of 100 μm was used.

An information recording sheet was prepared as below.

As a polycarbonate resin, a polycarbonate resin having Tg of 140° C., for example, Iupilon (manufactured by Mitsubishi Gas Chemical Company, Inc.) may be used. The amount of polycarbonate resin was 80 wt parts.

As a polyester resin, an amorphous polyester resin having high resistance to heat, for example, Vylon GK-360 (manufactured by Toyobo Co., Ltd.) (number average molecular weight: 16000, glass transition temperature: 56° C., amorphous) may be used. The amount of polyester resin was 10 wt parts.

As a laser light absorbing additive and a laser light absorbing pigment, a composite oxide pigment (e.g., Tomatec color, manufactured by Tomatec Co., Ltd.) was used. The amount of composite oxide pigment was 1 wt part.

As a refraction index modulation additive, an Epostar-based additive (e.g., manufactured by Nippon Shokubai Co., Ltd.) was used. The amount of refraction index modulation additive was 1 wt part. The above materials were dry blended, followed by kneading at a temperature of 180° C. and a speed of 10 m/min to obtain a blended resin pellet. The blended resin was subjected to extrusion molding at 180° C. to obtain a sheet having a thickness of 100 μm.

As a white material layer, a polycarbonate sheet (thickness: 400 μm) containing 5 wt % of titanium oxide as a white pigment was used.

As a security patch, a hologram transfer foil composed of a patch substrate (Lumirror 50 μm, T60T PET film) and a breaking layer (Dianal BR) was used.

The security patch was transferred from the transfer foil to the information recording sheet prepared as above, and then the protective sheet, the information recording sheet, the white material layer, and the protective sheet were stacked, followed by lamination under the conditions of 190° C., 2 Kgf/cm², and 5 minutes to obtain a card.

Then, the card was subjected to laser engraving from the protective sheet side under the following conditions.

Nd-YAG wavelength conversion ultraviolet laser (wavelength: 380 nm)
Output 0.05 W
Scanning interval 40 μm
Other than this, a fiber laser (wavelength: 1064 nm) or a YAG laser (wavelength: 1064 nm) may be applied.

Comparative Example 2

By preparing an information recording sheet using the same materials as in Example 3, a card was produced in the same manner as in Example 3 except that the composition of the information recording sheet was changed to 98% of polycarbonate, 1% of laser light absorbing additive, and 1% of refraction index modulation additive.

In order to extract the security patch from the card subjected to laser engraving, the security patch was separated using a cutter. In Example 3, due to the high adhesion between the security patch and the information recording sheet, the security patch was damaged.

However, in Comparative Example 2, due to the low adhesion, the security patch was neatly separated from the information recording sheet. When the protective sheet and the information recording sheet were separated, in Example 3, the modified zone of the information recording sheet was damaged, but in Comparative Example 2, the protective sheet and the information recording sheet were separated without damaging the modified zone of the information recording sheet.

REFERENCE SIGNS LIST 10, 101 . . . Laminate; 10S . . . Surface; 11 . . . Transfer foil; 12 . . . Image; 121 . . . First motif; 122 . . . Second motif; 13 . . . Patch substrate; 14, 203 . . . Relief forming layer; 15 . . . Relief structure; 15a . . . First relief structure; 15b . . . Second relief structure; 16, 110 . . . Reflective layer; 161 . . . First reflective layer; 162 . . . Second reflective layer; 17, 109 . . . Adhesive layer; 18 . . . Protective sheet; 19 . . . Information recording sheet; 20 . . . Card; 20a . . . Front surface; 20b . . . Rear surface; 21 . . . Support layer; 22 . . . Modified zone; 23 . . . Printed portion; 24 . . . Carrier; 102 . . . Security patch; 103 . . . Relief structure; 104 . . . Surface relief; 105, 206 . . . Protective sheet; 106, 207 . . . Information recording sheet; 107 . . . Verification layer; 108, 202 . . . Breaking layer; 111 . . . Card; 112 . . . Printing layer; 113 . . . Laser engraving; 114, 209 . . . White material layer; 115 . . . External force; 116 . . . Carrier; 117 . . . Laser beam; 201 . . . Card sheet; 204 . . . Patch substrate; 205 . . . Security patch; 208 . . . Modified zone; 210 . . . Rear-surface protective film; 211 . . . Printed part; 212 . . . Card; R1 . . . Island region; R2 . . . Sea region; SR1 . . . First relief region; SR2 . . . Second relief region; S1 . . . First region; S2 . . . Second region; T1, T2 . . . Interfacial adhesion strength.

What is claimed is:

1. A laminate, comprising: in a thickness direction of the laminate,
a transfer foil in which at least a patch substrate, a relief forming layer, a reflective layer, and an adhesive layer are sequentially laminated;
a protective sheet that is provided on a first side of the transfer foil in the thickness direction; and
an information recording sheet that is provided on a second side of the transfer foil facing away from the protective sheet in the thickness direction, wherein
the relief forming layer includes a relief structure having a concavo-convex shape composed of concavities and convexities on at least part of a first surface of the relief forming layer in contact with the reflective layer,
a second surface of the reflective layer in contact with the first surface has a shape corresponding to the concavo-convex shape of the relief structure,
the relief forming layer is composed of one or a combination of a thermoplastic resin, a thermosetting resin, and an ultraviolet curable resin,
the relief structure has a plurality of island regions that are arranged in a predetermined pattern and a sea region on the first surface as viewed in the thickness direction,
in the island regions, the relief forming layer has one or a combination of functional groups including a hydroxyl group, a carboxyl group, and a carbonyl group and a rough surface, and
in the sea region, the relief forming layer has neither the functional groups nor the rough surface, or a content of the functional groups is smaller than in the island regions, or a roughness degree and an area of the rough surface are smaller than in the island regions, wherein a ratio of an area of the island regions to a total area of an entire region including the island regions and the sea region is 50% or more and 80% or less.

2. The laminate of claim 1, wherein
the relief forming layer has
a first relief region having a first relief structure in which each of the concavities and the convexities extends in a first direction along the thickness direction and the concavities and the convexities are alternately arranged in a second direction perpendicular to the first direction, and
a second relief region having a second relief structure that has a directivity in a direction different by at least 30 degrees or more from the first direction as viewed in a direction perpendicular to a plane including the first direction and the second direction or in which the concavities and the convexities are irregularly arranged, and the first relief region is disposed to overlap with the sea region and the second relief region is disposed to overlap with the island regions as viewed in the thickness direction.

3. The laminate of claim 1, wherein
the island regions have the same shape and are regularly arranged, and
a distance between centers of adjacent ones of the island regions is 40 μm or more and 400 μm or less.

4. The laminate of claim 1, wherein
the relief forming layer has
a first relief region having a first relief structure in which each of the concavities and the convexities extends in a first direction along the thickness direction and the concavities and the convexities are alternately arranged in a second direction perpendicular to the first direction, and
a second relief region having a second relief structure that has a directivity in a direction different by at least 30 degrees or more from the first direction as viewed in a direction perpendicular to a plane including the first direction and the second direction or in which the concavities and the convexities are irregularly arranged, and
the first relief region is disposed to overlap with the sea region and the second relief region is disposed to overlap with the island regions as viewed in the thickness direction.

5. A laminate, comprising: in a thickness direction of the laminate,
a transfer foil in which at least a patch substrate, a relief forming layer, a first reflective layer, a second reflective layer, and an adhesive layer are sequentially laminated;
a protective sheet that is provided on a first side of the transfer foil in the thickness direction; and
an information recording sheet that is provided on a second side of the transfer foil facing away from the first side in the thickness direction, wherein
at least one of the first reflective layer and the second reflective layer is composed of a light transmissive material having a higher refractive index than the relief forming layer and the adhesive layer,
the relief forming layer includes a relief structure having a concavo-convex shape composed of concavities and convexities on at least part of a first surface of the relief forming layer in contact with the first reflective layer,
a second surface of the first reflective layer in contact with the first surface has a shape corresponding to the concavo-convex shape of the relief structure,
the first reflective layer has a surface shape corresponding to a surface shape of the second reflective layer at an interface at which the first reflective layer is in contact with the second reflective layer,
the transfer foil has a plurality of regions that are arranged in a predetermined pattern as viewed in the thickness direction and include a first region and a second region,
the first region includes the first reflective layer and the second reflective layer,
the second region includes only the first reflective layer,
an interfacial adhesion strength between the first reflective layer and the adhesive layer is different from an interfacial adhesion strength between the second reflective layer and the adhesive layer, and the first region or the second region, whichever has a relatively high interfacial adhesion strength at an interface with the adhesive layer, is island regions scattered in the other region, and the first region or the second region, whichever has a relatively low interfacial adhesion strength at an interface with the adhesive layer, is a sea region that surrounds the region having a relatively high interfacial adhesion strength at the interface with the adhesive layer.

6. The laminate of claim 5, wherein
an interfacial adhesion strength at an interface between the layers of the transfer foil is lower than an interfacial adhesion strength between the transfer foil and the protective sheet or the information recording sheet, and
an interfacial adhesion strength between the patch substrate and the relief forming layer and a breaking strength of the relief forming layer are lower than an interfacial adhesion strength between the first reflective layer and the second reflective layer and an interfacial adhesion strength between the relief forming layer and the first reflective layer.

7. The laminate of claim 5, wherein
in the island regions, the first reflective layer or the second reflective layer and the adhesive layer both have hydrophilic surface properties, or both have hydrophobic surface properties, and in the sea region, the first reflective layer or the second reflective layer and the adhesive layer have different surface properties, or have the same surface properties as in the island regions, and
a contact angle of a coating liquid of the adhesive layer with the first reflective layer or the second reflective layer is lower in the island regions.

8. The laminate of claim 5, wherein in the island regions, the first reflective layer or the second reflective layer is adhered to the adhesive layer by at least one chemical interaction of an ionic bond, a covalent bond, and a hydrogen bond, and in the sea region, the first reflective layer or the second reflective layer is adhered to the adhesive layer by a physical interaction due to an intermolecular force.

9. The laminate of claim 5, wherein a ratio of an area of the island regions to a total area of an entire region including the island regions and the sea region is 50% or more and 80% or less.

10. The laminate of claim 5, wherein
the island regions have the same shape and are regularly arranged, and
a distance between centers of adjacent ones of the island regions is 40 μm or more and 400 μm or less.

11. A card comprising:
the laminate of claim 5; and
a support layer that is provided on the first side of the transfer foil.

12. A laminate, comprising: in a thickness direction of the laminate,
a transfer foil in which at least a patch substrate, a relief forming layer, a reflective layer, and an adhesive layer are sequentially laminated;
a protective sheet that is provided on a first side of the transfer foil in the thickness direction; and
an information recording sheet that is provided on a second side of the transfer foil facing away from the protective sheet in the thickness direction, wherein
the relief forming layer includes a relief structure having a concavo-convex shape composed of concavities and convexities on at least part of a first surface of the relief forming layer in contact with the reflective layer, a second surface of the reflective layer in contact with the first surface has a shape corresponding to the concavo-convex shape of the relief structure, the relief forming layer is composed of one or a combination of a thermoplastic resin, a thermosetting resin, and an ultraviolet curable resin, the relief structure has a plurality of island regions that are arranged in a predetermined pattern and a sea region on the first surface as viewed in the thickness direction, in the island regions, the relief forming layer has one or a combination of functional groups including a hydroxyl group, a carboxyl group, and a carbonyl group and a rough surface, and in the sea region, the relief forming layer has neither the functional groups nor the rough surface, or a content of the functional groups is smaller than in the island regions, or a roughness degree and an area of the rough surface are smaller than in the island regions, wherein the island regions have the same shape and are regularly arranged, and a distance between centers of adjacent ones of the island regions is 40 μm or more and 400 μm or less.

* * * * *